United States Patent
Benson

(10) Patent No.: US 11,983,886 B2
(45) Date of Patent: May 14, 2024

(54) SYSTEM FOR BACKGROUND AND FLOOR REPLACEMENT IN FULL-LENGTH SUBJECT IMAGES

(71) Applicant: Shutterfly, LLC, Roseville, MN (US)

(72) Inventor: Keith A. Benson, Eden Prairie, MN (US)

(73) Assignee: Shutterfly, LLC, San Jose, CA (US)

( * ) Notice: Subject to any disclaimer, the term of this patent is extended or adjusted under 35 U.S.C. 154(b) by 191 days.

(21) Appl. No.: 17/070,756

(22) Filed: Oct. 14, 2020

(65) Prior Publication Data

US 2022/0114734 A1    Apr. 14, 2022

(51) Int. Cl.
  *G06T 7/194* (2017.01)
  *G06T 7/00* (2017.01)
  *G06T 11/60* (2006.01)

(52) U.S. Cl.
  CPC .............. *G06T 7/194* (2017.01); *G06T 7/97* (2017.01); *G06T 11/60* (2013.01)

(58) Field of Classification Search
  CPC ............ G06T 7/194; G06T 7/97; G06T 11/60
  See application file for complete search history.

(56) References Cited

U.S. PATENT DOCUMENTS

| | | | | |
|---|---|---|---|---|
| 5,331,361 A | * | 7/1994 | Jones | G03B 15/06 362/17 |
| 5,574,511 A | * | 11/1996 | Yang | G03B 17/53 348/590 |
| 6,611,297 B1 | * | 8/2003 | Akashi | H05B 47/10 348/739 |
| 7,834,894 B2 | | 11/2010 | Swanson et al. | |
| 9,025,906 B2 | | 5/2015 | Breckenridge et al. | |
| 9,264,627 B2 | | 2/2016 | Holmes et al. | |
| 9,353,928 B2 | | 5/2016 | Peterson | |

(Continued)

FOREIGN PATENT DOCUMENTS

| | | | | |
|---|---|---|---|---|
| CN | 201532514 U | * | 7/2010 | |
| EP | 1223461 A1 | * | 7/2002 | G07F 17/26 |

(Continued)

OTHER PUBLICATIONS

Shutterfly, LLC; U.S. Appl. No. 16/731,190, System for Assembling Composite Group Image From Individual Subject Images; filed Dec. 31, 2019.

*Primary Examiner* — Yubin Hung
(74) *Attorney, Agent, or Firm* — Merchant & Gould P.C.

(57) ABSTRACT

A system for performing background and floor replacement in full-length subject images is described. A set of three or more images of a subject can be captured under different illumination conditions. For example, at least one of the images is captured while a foot portion of the subject and surrounding floor, including a floor mat on which the subject is positioned, are illuminated by a floor lighting device. The floor mat has a Lambertian surface to reflect light in a particular manner such that a maximum contrast between the floor and the subject is captured in the image. Varying contrast between the background, floor, and subject among the images of the set can be leveraged by an image processing system to generate a background mask and a floor mask that are combined and seamlessly transitioned to yield a compiled mask for use in background and floor replacement.

20 Claims, 34 Drawing Sheets

(56) References Cited

U.S. PATENT DOCUMENTS

| | | | |
|---|---|---|---|
| 9,438,769 B1 * | 9/2016 | Fan | H04N 1/4072 |
| 9,838,661 B2 | 12/2017 | Benson | |
| 10,013,784 B2 | 7/2018 | Breckenridge et al. | |
| 10,110,792 B2 | 10/2018 | Benson | |
| 2008/0226273 A1 * | 9/2008 | Kaku | G06T 7/11 |
| | | | 396/3 |
| 2008/0239087 A1 * | 10/2008 | Numazaki | H04N 23/56 |
| | | | 348/E5.022 |
| 2008/0246777 A1 * | 10/2008 | Swanson | H04N 5/272 |
| | | | 348/E5.029 |
| 2014/0169697 A1 | 6/2014 | Breckenridge et al. | |
| 2016/0316118 A1 * | 10/2016 | Benson | H04N 23/56 |
| 2019/0342481 A1 * | 11/2019 | Sorgius | H05B 47/125 |
| 2020/0320673 A1 | 10/2020 | Benson | |
| 2020/0400818 A1 * | 12/2020 | Horesh | G06T 7/521 |
| 2021/0201518 A1 * | 7/2021 | Benson | G01B 11/25 |
| 2021/0295548 A1 * | 9/2021 | Veiga | G06T 7/73 |
| 2021/0319625 A1 * | 10/2021 | Goodrich | G06F 3/011 |

FOREIGN PATENT DOCUMENTS

| | | | | |
|---|---|---|---|---|
| EP | 1457816 A2 * | 9/2004 | | G03B 15/02 |
| GB | 2544268 A * | 5/2017 | | G01B 11/24 |
| JP | 2004205920 A * | 7/2004 | | |
| JP | 2009058723 A * | 3/2009 | | |
| JP | 2009260776 A * | 11/2009 | | |
| JP | 2010146094 A * | 7/2010 | | |
| WO | WO-2008061070 A2 * | 5/2008 | | G03B 15/02 |

\* cited by examiner

SYSTEM FOR BACKGROUND AND FLOOR REPLACEMENT IN FULL-LENGTH SUBJECT IMAGES

BACKGROUND

Professional photographic images are often obtained in an artificially lighted environment. Example types of images captured in this environment include school portraits, printed publication images, product packaging or marketing images, and athletic or club portraits. It is sometimes desirable to change the background behind the subject of the image, which requires additional processing of the image after its capture.

Existing background replacement systems include image processing techniques that enable definition of the subject from the background in three-quarter length or head and shoulder images of the subject (e.g., images that do not include a foot portion of the subject or the floor on which the subject is standing) to facilitate background replacement. However, for some photographic images, it is desirable to generate a full-length image of the subject for which both the background and floor behind the subject of the image can be changed.

SUMMARY

In general terms, this disclosure is directed to a system for background and floor replacement in full-length subject images. In one possible configuration and by non-limiting example, the system includes a floor lighting device, among other lighting devices, and a floor mat having Lambertian characteristics that is positioned under a subject while images of the subject are captured. During at least one image capture, a foot portion of the subject and surrounding floor, including the floor mat, are illuminated by the floor lighting device. At least two other images are captured, including a background-illuminated image and a subject-illuminated image. These three images can then be processed to generate one or more masks for use in background and floor replacement. For example, the one or more masks can be applied to the subject-illuminated image to extract a full-length subject image, and a new image can be generated using the masks and extracted full-length subject image to insert a new background and floor.

One aspect is a method of illuminating a subject during a photography session. The method includes initiating an illumination sequence for an image capture sequence, including: initiating a first illumination condition while a first image is captured by causing a background lighting system to illuminate a background; initiating a second illumination condition while a second image is captured by causing a subject lighting system to illuminate a subject; and initiating a third illumination condition while a third image is captured by causing a floor lighting device to illuminate a foot portion of the subject and surrounding floor, including a floor mat arranged under the subject.

Another aspect is a photography system that includes a camera that captures a set of images of a subject, a lighting system including a background lighting system, a subject lighting system, and a floor lighting device, a controller to synchronize the camera and the lighting system, and a floor mat positioned under the subject as the set of images are captured by the camera. The controller includes a non-transitory storage medium and one or more processors, the non-transitory storage medium storing instructions that, when executed by the processor, cause the controller to: initiate a first illumination condition during capture of a first image of the set by causing the background lighting system to illuminate a background; initiate a second illumination condition during capture of a second image of the set by causing the subject lighting system to illuminate the subject; and initiate a third illumination condition during capture of a third image of the set by causing a floor lighting device to illuminate a foot portion of the subject and surrounding floor, including the floor mat.

A further aspect is a controller for synchronizing an illumination sequence with an image capture sequence during a photography session. The controller includes a processing device, and a memory storing instructions that, when executed by the processing device, cause the controller to: initiate a first illumination condition during a first image capture by causing a background lighting system to illuminate a background; initiate a second illumination condition during a second image capture by causing a subject lighting system to illuminate a subject; and initiate a third illumination condition during a third image capture by causing a floor lighting device to illuminate a foot portion of the subject and surrounding floor, including a floor mat positioned under the subject.

DETAILED DESCRIPTION

Figure 1:
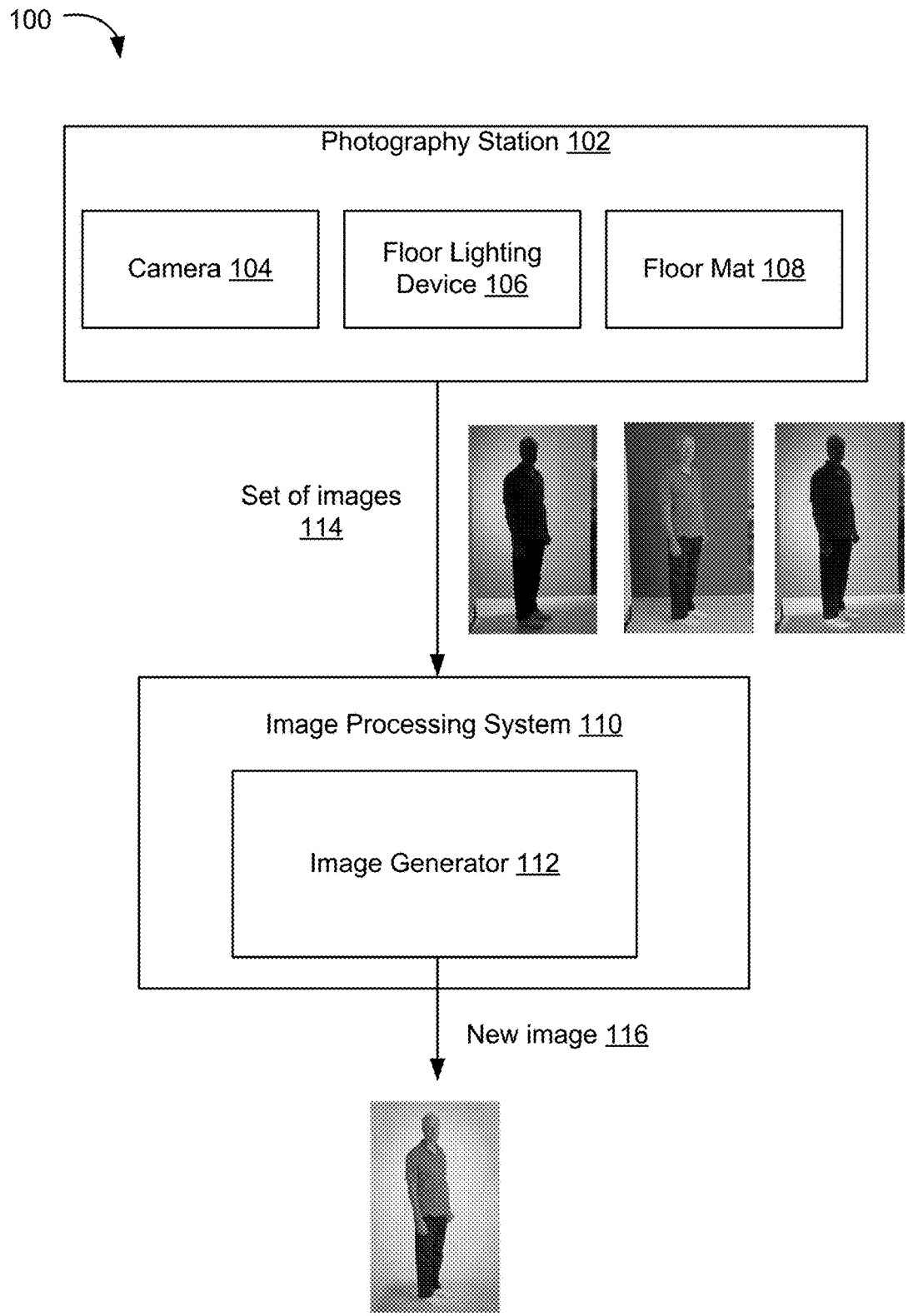
FIG. 1 is a block diagram of an example system for generating a new full-length subject image.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a block diagram of an example system 100 for generating a new full-length subject image. The system 100 can include a photography station 102 and an image processing system 110. In some examples, the photography station 102 includes a camera 104, at least one floor lighting device 106, and a floor mat 108, and the image processing system 110 includes an image generator 112.

In some examples, the photography station 102 is a structure used by a photographer for photographing a subject to capture a digital image of the subject with the camera 104. Example subjects can include humans, animals, plants, and products or other objects. In some examples, the photography station 102 is a professional photography studio where photographers take photographs of subjects. In other examples, the photography station 102 is a mobile photography studio, which is portable so that it can be setup at a remote location, such as in a school, church, or other building or location. In further examples, the photography station 102 can be an outdoor photography station.

In addition to the camera 104, the floor lighting device 106, and the floor mat 108, the photography station 102 can include one or more backgrounds, one or more lights, and one or more other devices to facilitate and control the capturing of the digital image of the subject. An example photography station 102 is shown and described in more detail below with reference to FIG. 2.

The camera 104 is a device that operates to capture a set of images 114 of a subject. For example, the set of images 114 can include at least three images captured by the camera 104 under different lighting or illumination conditions within an image capture sequence, as described in more detail below with reference to FIGS. 9 and 10. In some examples, the camera 104 is a mirrorless digital camera. In other examples, the camera 104 is another type of digital camera capable of capturing at least three images in less than 100 milliseconds. An example of the camera 104 is shown and described in more detail below with reference to FIG. 4.

The floor lighting device 106 is a device that operates to emit light towards the subject at a height just above the floor while an image is captured by the camera 104 such that the light illuminates a foot portion of the subject (e.g., the subject's feet, socks, or footwear) and surrounding floor. For example, the floor lighting device 106 can be illuminated during a third image capture of the image capture sequence. The floor lighting device 106 includes at least one light source that emits the light, as described in detail with reference to FIG. 2. In some examples, the light source is contained within a housing of the floor lighting device 106, and the floor lighting device 106 further includes a light shield to directionally concentrate the light. The floor lighting device 106 can be slightly elevated above the floor and supported by one or more stands to allow the light to be emitted toward the subject at the height just above the floor. An example of the floor lighting device 106 is shown and described in more detail below with reference to FIGS. 2, 3, and 5. In some examples, more than one floor lighting device 106 may be positioned within the photography station 102, as shown and described in more detail below with reference to FIGS. 2 and 3.

Once captured, the set of images 114 can be transferred to the image processing system 110. In some examples, the images are stored as image data in a computer readable medium and the computer readable medium is brought or is transported through a mail delivery system to the image processing system 110. Examples of computer readable media include memory cards (discussed above), a compact disc (CD), a digital versatile disc (DVD), a hard disc of a hard disc drive, or other types of computer readable media. In other examples, the set of images 114 are transferred across a network, such as the Internet (e.g., network), a local area network, or a cable connection, to the image processing system 110.

The image generator 112 of the image processing system 110 then generates a new image 116 using the images from the set of images 114 transferred to the image processing system 110. For example, the image generator 112 can use the set of images 114 to generate a background mask and a floor mask that are applied as separate masks to one of the images from the set of images 114 to enable background and floor replacement within the image to create the new image 116. In another example, the background mask and floor mask can be combined and smoothly transitioned to form a compiled mask, where the compiled mask is a single mask applied to one of the images from the set of images 114 to enable background and floor replacement within the image to create the new image 116.

The above description of system 100 provides examples of some of the possible environments in which a photography station 102 and an image processing system 110 can be implemented. Other embodiments are implemented in yet other systems or environments. Any of the systems described herein can be implemented by one or more devices as additional embodiments.

Figure 2:
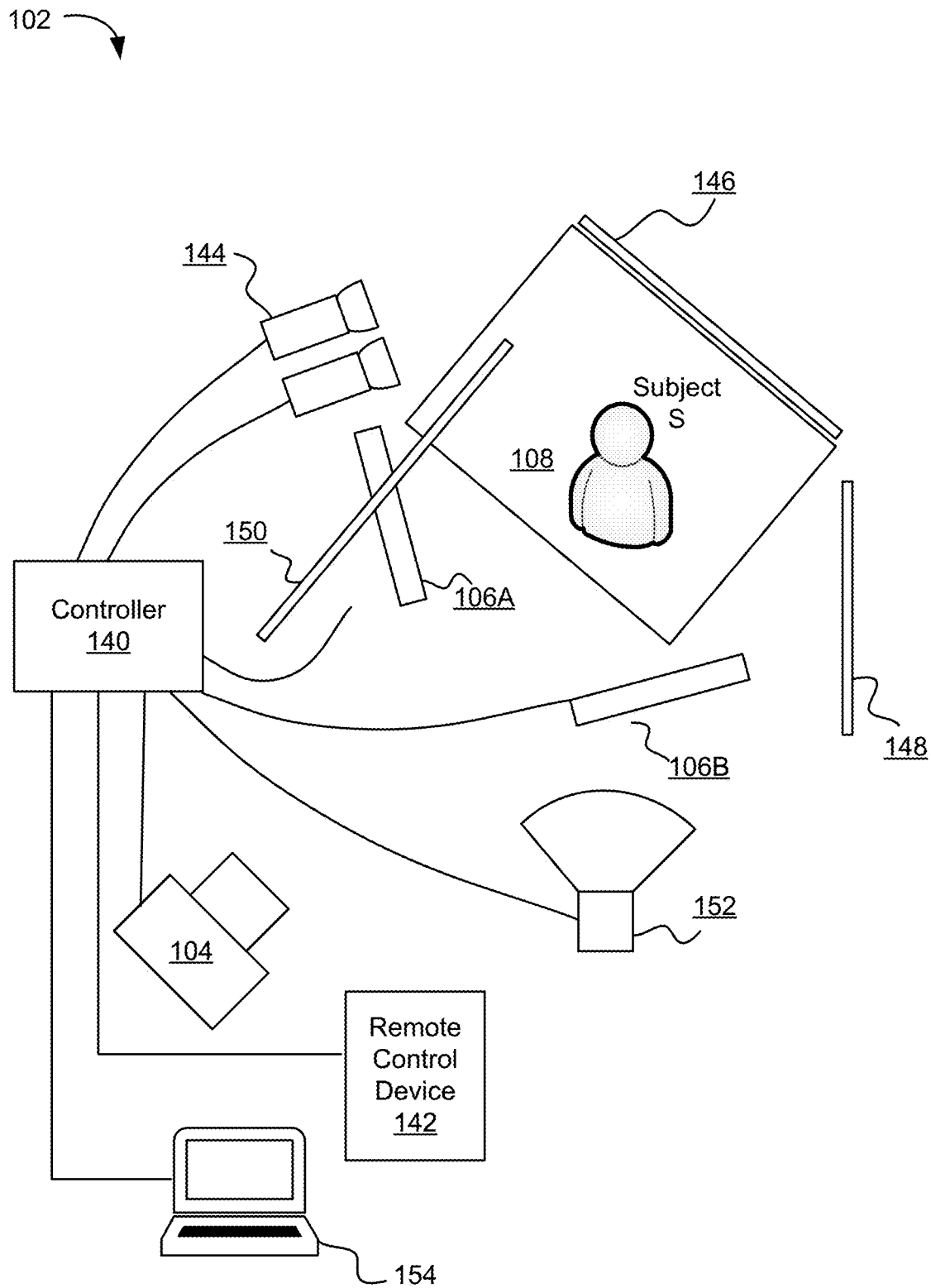
FIG. 2 illustrates an example photography station.

FIG. 2 illustrates an example photography station 102. The photography station can include the camera 104, a first floor lighting device 106A and a second floor lighting device 106B (collectively floor lighting devices 106), a controller 140, a remote control device 142, background lights 144, a background 146, a fill reflector 148, a light block 150, a main light 152, and a remote computing device 154. Other embodiments can include more or fewer components. The angles, sizes and relative positioning between components in FIG. 2 are not meant to be limiting.

A subject S can be positioned in front of the camera 104. The subject S is one or more of, or a combination of, a person, animal, or object. The camera 104 is a digital camera, examples of which are described in more detail below and particularly with reference to FIG. 4. The camera 104 is in wired or wireless communication with controller 140.

As one non-limiting example and as illustrated in FIG. 2, the first floor lighting device 106A and the second floor lighting device 106B are positioned orthogonally to one another. Each of the floor lighting devices 106 include at least one light source. The floor lighting devices 106 can be supported by stands to elevate the floor lighting device 106 to a height just above the floor such that the light source operates to emit light toward a foot portion of the subject (e.g., a subject's feet or footwear, including socks) and surrounding floor. The light source can be any type of light source capable of operating as a strobe light or a flash light. As one example, the light source can be comprised of one or more light emitting diodes (LEDs). A circuit, shown and described in detail with reference to FIG. 6, can drive emission of the light from the light source during the capture of a particular image in the image capture sequence (e.g., during a third image capture).

In some examples, the light source is contained within a housing of the floor lighting devices 106. To control a direction of the light emitted from the light sources, the floor lighting devices 106 can also include a light shield coupled to the housing, for example, as described in more detail with reference to FIGS. 3 and 5.

Although a pair of floor lighting devices 106 (e.g., the first floor lighting device 106A and the second floor lighting device 106B) are shown in FIG. 2, this is a non-limiting configuration. Any other number of floor lighting devices 106 can be implemented (e.g., one device or more than two devices) and arranged in various other configurations.

The floor mat 108 is positioned under the subject S as the set of images of the subject are captured. In some examples, the subject S can be positioned on the floor mat 108 such that, from a perspective of the camera 104, a portion of the floor mat 108 is in front of the subject S and a portion of the floor mat 108 is behind the subject S. Additionally, remaining portions of the floor mat 108 can be to either side of the subject S.

The floor mat 108 has one or more surfaces that are Lambertian surfaces. A Lambertian surface is a flat surface that reflects light based on the cosine of the angle at which the light hits the surface. Accordingly, by positioning the floor lighting devices 106 at a height just above the floor, a maximum contrast between a brightness of the floor and the subject S is able to be achieved when the image is captured while the light is emitted from the light source of the floor lighting devices 106 because many surface areas of the subject S are about 90° with respect to the emitted light. As one example, the floor lighting devices can be positioned at a height above the floor such that the angle created with respect to the floor (and the floor mat 108) is less than a predefined number of degrees to induce Lambertian characteristics of the surface of the floor mat 108 when light is emitted from the floor lighting devices at that angle. In one example, the predefined number of degrees is 15 degrees (e.g., in a range from 0 degrees to 15 degrees). In one example, the predefined number of degrees is 10 degrees (e.g., in a range from 0 degrees to 10 degrees). In another example, the predefined number of degrees is 5 degrees (e.g., in a range from 0 degrees to 5 degrees).

In one example, the floor mat 108 may include a polycarbonate overlaminate, where a surface of the polycarbonate is textured to emulate a Lambertian surface. Polycarbonate is a rigid, durable material that can withstand wear and tear to the floor mat caused overtime by subjects and their shoes as they stand on, jump on, or otherwise exert force on the floor mat. Additionally, the polycarbonate can be easily cleaned to remove dirt, mud, or other substances left behind by subject.

The polycarbonate overlaminate may be a clear overlaminate, whereas a coloring of at least a surface of the floor mat on which the polycarbonate is overlaid and laminated to is selected to be a light, near-white color (e.g., off-white, light mint, etc.) to enhance the mask generation process. For example, the light, near-white color enables the floor mat 108 to be much lighter than the subject within an image captured when the floor lighting devices 106 are illuminating the foot portion of the subject and surrounding floor (and the subject is otherwise not illuminated), which allows more complete generation of a floor mask. Additionally, because the background 146 can also be illuminated at a same time that the floor lighting devices 106 are illuminated during an image capture (and the subject is otherwise not illuminated), as described in detail with reference to FIGS. 9 and 10, the background 146 may similarly be much lighter than the subject, which allows more complete generation of the background mask and facilitates a transition between the background and floor when the background mask and the floor mask are combined to yield the compiled mask.

In another example, the floor mat 108 may include a mat having at least surfaces of the mat that are exposed to the camera 104 painted using a flat paint. The flat paint provides the Lambertian properties. The coloring of the flat paint is selected to be a light, near-white color (e.g., off-white, light mint, etc.) to enhance the mask generation process as described above. The remote control device 142 can be used to initiate the image capture sequence performed by the camera 104. The remote control device 142 is in wired or wireless communication with controller 140. For example, remote control device 142 can communicate with the controller 140 via infrared signal emission, radio frequency, Bluetooth, Wi-Fi, and other wireless communication protocols known in the art. The remote control device 142 can be a separate physical component with one or more buttons, an interface on a smart computing device such as a smart phone or the remote computing device 154, and a button integrated into the camera 104.

The remote computing device 154 can provide a user interface for the photographer to input information. For example, the photographer can use the remote computing device 154 to input information about a photography session such as a job reference number, information about the subject, order information including types of products, quantity and/or size of each type of product, and any requested finishing techniques such as red eye removal, stray hair removal, and blemish removal. Input devices of the remote computing device 154 can include a keyboard, a pointer input device, a microphone, and a touch sensitive display. Additionally, the remote computing device 154 can have a reader for scanning machine-readable codes. For example, in some instances at least a portion of the session information is encoded in a barcode, QR code, or other similar machine-readable code that is scanned by the remote computing device 154. Examples of the remote computing device 154 can include a desktop computer, a laptop computer, a tablet computer, a mobile device (such as a smart phone, an iPod® mobile digital device, or other mobile devices), or other devices configured to process digital instructions.

The controller 140 synchronizes the illumination of the background lights 144, the main light 152, and the light source of the floor lighting devices 106 with the image capture sequence of the camera 104. The background lights 144 can be a component of a background lighting system that operate to illuminate the background 146 during one or more background-illuminated image captures. In some examples, a background lighting system includes at least two background lights 144, where light from one of the background lights 144 is illuminated for the first background-illuminated image capture and light from the other of the background lights 144 is illuminated for the second background-illuminated image capture.

In some examples, the background lighting system includes one or more stands to support and elevate the background lights 144. In addition, the background lighting system can include one or more light modifiers, such as an umbrella or soft box, which diffuses the light from the background lights 144 to provide the desired lighting pattern and distribution. The background lights 144 can be a panel of light emitting diodes, as shown and described in U.S. Pat. No. 9,264,627, issued on Feb. 16, 2016, entitled VIDEO PHOTOGRAPHY SYSTEM, the entirety of which is hereby incorporated by reference. The background lights 144 can also be a fast-recharge monolight.

The light block 150 prevents most or all of the light from the background lights 144 from illuminating the subject S. In some examples, the background lights 144 are oriented substantially orthogonal to the background 146, although other angles can be used. The background lights 144 and the light block 150 can be positioned such that they do not appear in the image of the subject S captured by the camera 104.

The background 146 is an object arranged in line with the subject S and the camera 104 to provide a suitable backdrop for images captured by the camera 104. The background 146 can be a background material or a background structure. The background 146 often has an exterior surface having a neutral color. In examples, the exterior surface has a substantially non-textured dark gray color. However, in other examples the exterior surface is textured, and/or other colors are used.

When the background 146 is a background material, the background 146 can include a frame or stand that supports the background material having the exterior surface. In some examples, the background material is substantially opaque, while in other examples the background material is translucent. As one example, the background lights 144 can directly illuminate a rear surface of the background material, and light from the background lights 144 passes through the translucent background material, so that it is visible on the exterior surface.

In other examples, the background 146 is a separate object that is not a part of the photography station 102. Examples of such a background 146 include a wall, a curtain, a whiteboard, or other structure having an exterior surface that can be illuminated by the background lights 144.

In yet another possible embodiment, the background 146 and the background lights 144 are integrated in a same device. In this example, the background lights 144 are positioned behind the subject S and within the view of the camera 104, such that light generated by the background lights 144 is directly visible by the camera 104 rather than indirectly illuminating the background 146. In some embodiments, the background lighting system also includes a display device, such as a flat panel display. Examples of flat panel displays include LED displays, plasma displays, digital light processing displays, and the like, many of which are commonly used as television or computer displays. Such a display can alternatively be arranged behind the background 146 to illuminate the background 146 from behind.

The fill reflector 148 is a screen, panel, light or a substantially flat surface such as a wall. The fill reflector 148 can have low to medium reflective qualities. Generally, pure reflective surfaces, such as a mirrored surface, are not used as a fill reflector. In some examples, the fill reflector 148 is substantially monochrome and can be a white, off-white or gray color. The fill reflector 148 is a way to provide soft light on the left side of the subject S so that the subject-illuminated image does not show shadowing on the subject. In the example arrangement shown in FIG. 2, the main light 152 is positioned generally to the right of the subject S. In that arrangement, some of the light from the main light 152 reflects off the fill reflector 148 and onto the left side of the subject S.

The main light 152 can be a component of a subject lighting system that operates to provide appropriate foreground illumination of the subject S during a subject-illuminated image capture. The main light 152 can include one or more light sources and additional lighting components, such as a fill lighting system. A variety of different light sources can be used, such as incandescent, fluorescent, high-intensity discharge, and light emitting diode light sources. The controller 140 operates to control the flashing of the main light 152 during the subject-illuminated image capture.

The subject lighting system can include one or more stands to support and elevate the light sources of the main light 152. In addition, the subject lighting system can include one or more light modifiers, such as an umbrella or soft box, which diffuses the light from the light sources of the main light 152 to provide the desired lighting pattern and distribution.

The photography station 102 may also include one or more additional components. As one example, the photography station 102 may include a reflective lighting system. An example reflecting lighting system is described in U.S. Pat. No. 9,353,928 issued on May 31, 2016, and titled REFLECTIVE LIGHTING SYSTEM, the entirety of which is hereby incorporated by reference. In one example arrangement, the reflective lighting system is arranged behind the subject S and primarily hidden from the camera 104 by the background 146. In this arrangement, the reflective lighting system acts as an edge light, and more specifically as a hair light to illuminate edge features, such as a top of the subject's head.

As another example, the photography station 102 may further include a fiducial marking device having one or more light sources that emit collimated light to form fiducial markers on the subject S while an image is captured by the camera (e.g., a fiducially-marked image). An example fiducial marking device is described in U.S. patent application Ser. No. 16/731,190, filed on Dec. 31, 2019, and titled SYSTEM FOR ASSEMBLING COMPOSITE GROUP IMAGE FROM INDIVIDUAL SUBJECT IMAGES, the entirety of which is hereby incorporated by reference. In some examples, the location of the fiducial markers formed on the subject S are used to determine pixel density of an image (e.g., affected by zoom factors applied by the camera 104) and a reference height of a subject. Such information can be useful for image processing techniques, including scaling, to generate an appropriately scaled individual subject photograph (e.g., where subject is appropriately scaled to any props in the photograph) or a group composite image that accurately represents the subjects of the group relative to one another.

Figure 3:
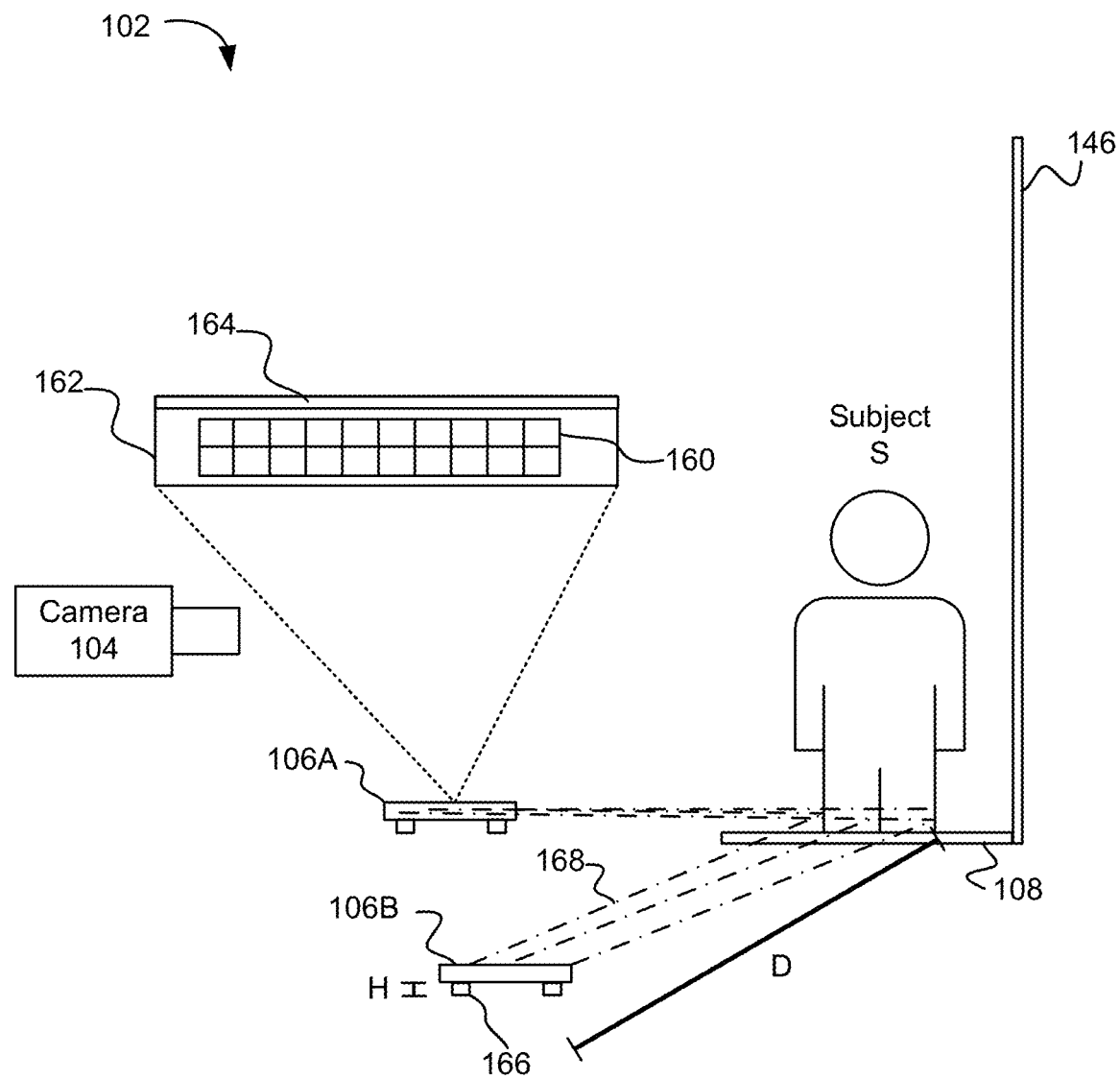
FIG. 3 illustrates a side perspective of the camera and floor lighting devices within the example photography station of FIG. 2.

FIG. 3 illustrates an example side perspective of the camera 104 and the floor lighting devices 106 (e.g., the first floor lighting device 106A and the second floor lighting device 106B) within the example photography station 102 shown and described with reference to FIG. 2. Each of the floor lighting devices 106 may include a light source 160, a housing 162 to retain the light source 160, and a light shield 164 coupled to the housing 162 to control a direction of light emitted from the light source 160.

The light source 160 can include an LED or other similar light source capable of operating as a strobe light or a flash light. In one example and as illustrated in FIG. 3, the light source 160 comprises a plurality of LEDS arranged in one or more horizontal arrays. For example, the light source 160 includes more than one horizontal array, each array may be positioned or arranged parallel to one another (e.g., forming rows of horizontal arrays). The light source 160 emits light 168 toward the subject.

A circuit of the floor lighting devices 106 can drive the emission of the light 168 from the light source 160. The floor lighting devices 106 are in wired or wireless communication with the controller 140. In some examples, the controller 140 communicates directly with the circuit to synchronize the emission with a particular image capture (e.g., a third image capture) of an image capture sequence performed by the camera 104, as described in more detail with reference to FIGS. 9 and 10.

The housing 162 can be a structure that retains the light source 160. In some examples, the structure can be comprised of aluminum or other metal. Additionally, the light shield 164 can be mounted, attached, or otherwise coupled to the housing 162 or alternatively, to the light source 160 itself. The light shield 164 concentrates the light emitted from the light source 160 in the horizontal direction and greatly reduces light intensity above a predetermined height from the floor (e.g., above about 1 foot from the floor).

The floor lighting devices 106 are positioned at a particular distance D away from the subject S and can be supported by one or more stands 166 to elevate the floor lighting devices 106 to a particular height H above the floor. In some examples, the height H is just above a height of the floor such that light 168 emitted by the light source 160 is directed toward the foot portion of the subject and surrounding floor. As one example, the floor lighting devices 106 can be positioned at a height H above the floor such that the angle created with respect to the floor (and the floor mat 108 on which the subject S is positioned during image capture) is less than a predefined number of degrees to induce Lambertian characteristics of the surface of the floor mat 108 when the light 168 is emitted from the floor lighting devices 106 at that angle. This positioning maximizes contrast between a brightness of the floor and the subject S in an image captured by the camera 104 when the light source 160 is emitting the light 168. In some examples, this contrast is further maximized because the subject S is otherwise not illuminated (e.g., the subject lighting system is not illuminating the subject S) when the light source 160 is emitting the light 168 during the image capture, as described in more detail with reference to FIGS. 9 and 10. The set of images 114 are captured by the camera 104, where a different lighting or illumination condition is initiated for each image capture. Varying levels of local contrast between the subject, the background, and the floor resulting from the different lighting or illumination conditions in each of the images of the set may then be leveraged by the image processing system 110 to generate a background mask and a floor mask that can be applied as separate mask or can alternatively be combined and smoothly transitioned to create a compiled mask, as described in more detail with reference to FIGS. 11-31. A new image 116 can then be generated using the background mask and the floor mask (or the compiled mask) and at least one of the images from the set of images 114, as described in more detail with reference to FIGS. 32-34.

Figure 4:
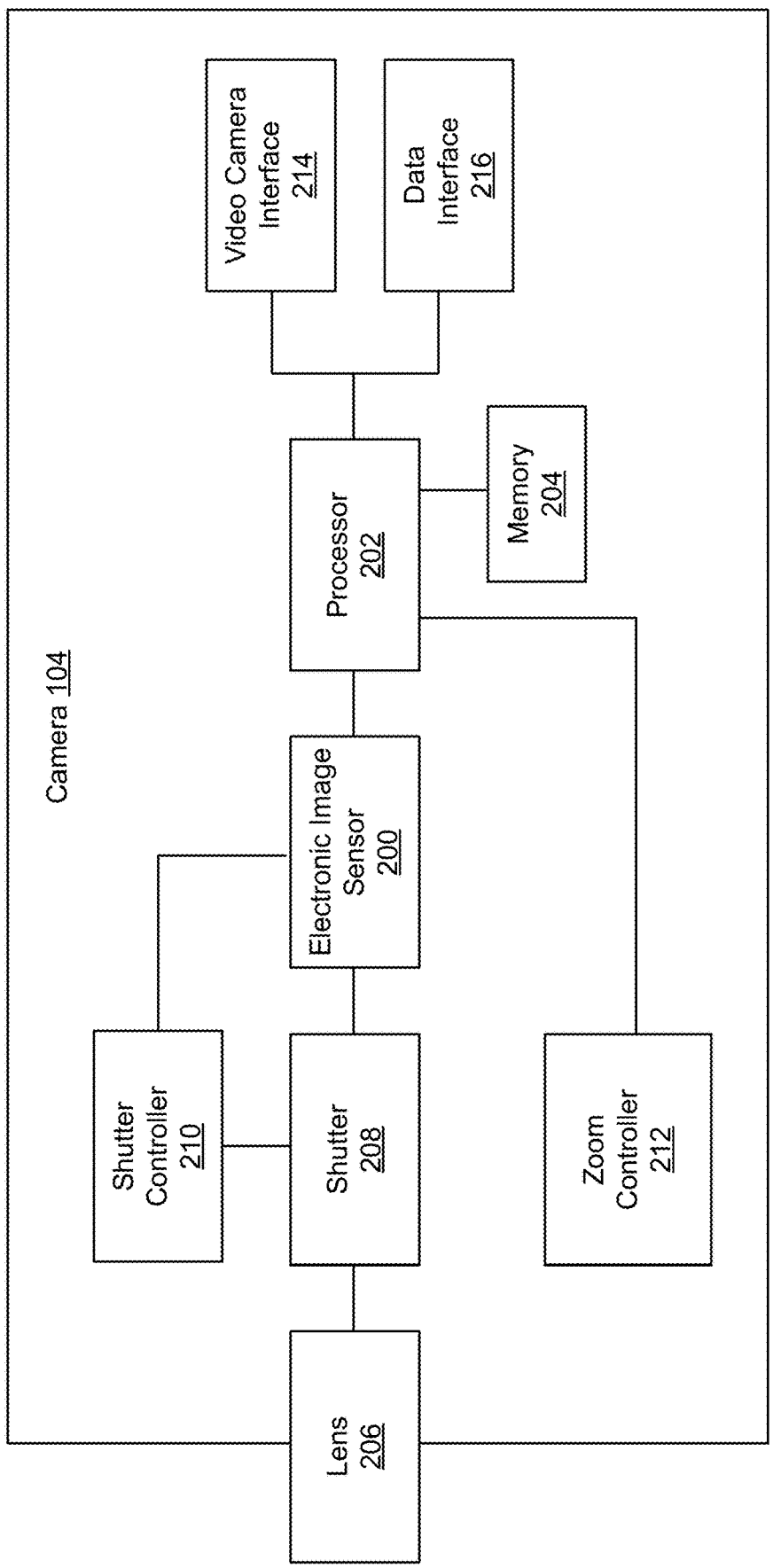
FIG. 4 is a schematic block diagram of a camera.

FIG. 4 is a schematic block diagram of the camera 104. The camera 104 can be a mirrorless digital camera including at least an electronic image sensor 200 for converting an optical image to an electric signal, a processor 202 for controlling the operation of the camera 104, and memory 204 for storing the electric signal in the form of digital image data. A commercially available example of a mirrorless camera is the Panasonic GH5 available from Panasonic Corporation.

An example of electronic image sensor 200 is a charge-coupled device (CCD). Another example of electronic image sensor 200 is a complementary metal-oxide-semiconductor (CMOS) active-pixel sensor. Electronic image sensor 200 receives light from a subject and background and converts the received light into electrical signals. The signals are converted into a voltage, which is then sampled, digitized, and stored as digital image data in the memory 204.

The memory 204 can include various different forms of computer readable storage media, such as random access memory. In some examples, the memory 204 includes a memory card. A wide variety of memory cards are available for use in various embodiments. Examples include: a CompactFlash (CF) memory card (including type I or type II), a Secure Digital (SD) memory card, a mini Secure Digital (mini SD) memory card, a micro Secure Digital (microSD) memory card, a smart media (SM/SMC) card, a Multimedia Card (MMC), an xD-Picture Card (xD), a memory stick (MS) including any of the variations of memory sticks, an NT card, and a USB memory stick (such as a flash-type memory stick). Other embodiments include other types of memory, such as those described herein, or yet other types of memory.

A lens 206 is located in front of a shutter 208 and is selected to provide the appropriate photographic characteristics of light transmission, depth of focus, etc. The shutter 208 can be mechanical, electrical, or both. In some embodiments, the lens 206 is selected between 50 and 250 mm, with the image taken at an f-stop generally in the range of f16 to f22; in the range of f4 to f16; or in the range of f4 to f22. This provides a zone focus for the image. It also generally eliminates concerns regarding ambient light. However, it will be appreciated that any number of lenses, focusing, and f-stops may be employed in connection with the present invention.

To initiate an image capture sequence, an image capture button on the remote control device 142 is preferably used. In some examples, the remote control device 142 is connected to the controller 140, which generates a shutter release signal that is communicated to a shutter controller 210 of the camera 104. However, other methods and devices can be used to initiate the image capture. For example, a button, switch or other device might be included on the controller 140 or connected to the camera 104. Still further, a computing device, such as the remote computing device 154 or the image processing system 110, is used in some embodiments to initiate the process.

A zoom controller 212 is also provided in some examples to mechanically adjust the lens 206 to cause the camera 104 to zoom in and out on a subject. The remote control device 142 can include zoom in and out buttons, and signals from the remote control device 142 are communicated to the controller 140, which communicates the request to the zoom controller 212. In some examples, the zoom controller 212 includes a motor that adjusts lens 206 accordingly.

The camera 104 can further include a video camera interface 214 and a data interface 216. The video camera interface 214 can communicate live video data from the camera 104 to the controller 140 (or remote computing device 154) in some embodiments. In some embodiments, the video camera interface 214 communicates live video data from the camera 104 to the remote computing device 154 or a digital display on the camera 104.

The data interface 216 is a data communication interface that sends and receives digital data to communicate with another device, such as controller 140 or the image processing system 110. For example, the data interface 216 can receive image capture messages from the controller 140 that instruct the camera 104 to capture one or more digital images. The data interface 216 can also transfer captured digital images, such as the images of the set of images 114 from the memory 204 to another device, such as the controller 140 or the image processing system 110. Examples of the video camera interface 214 and the data interface 216 include USB interfaces. In some examples, the video camera interface 214 and the data interface 216 are a same interface, while in other examples, they are separate interfaces.

Figure 5:
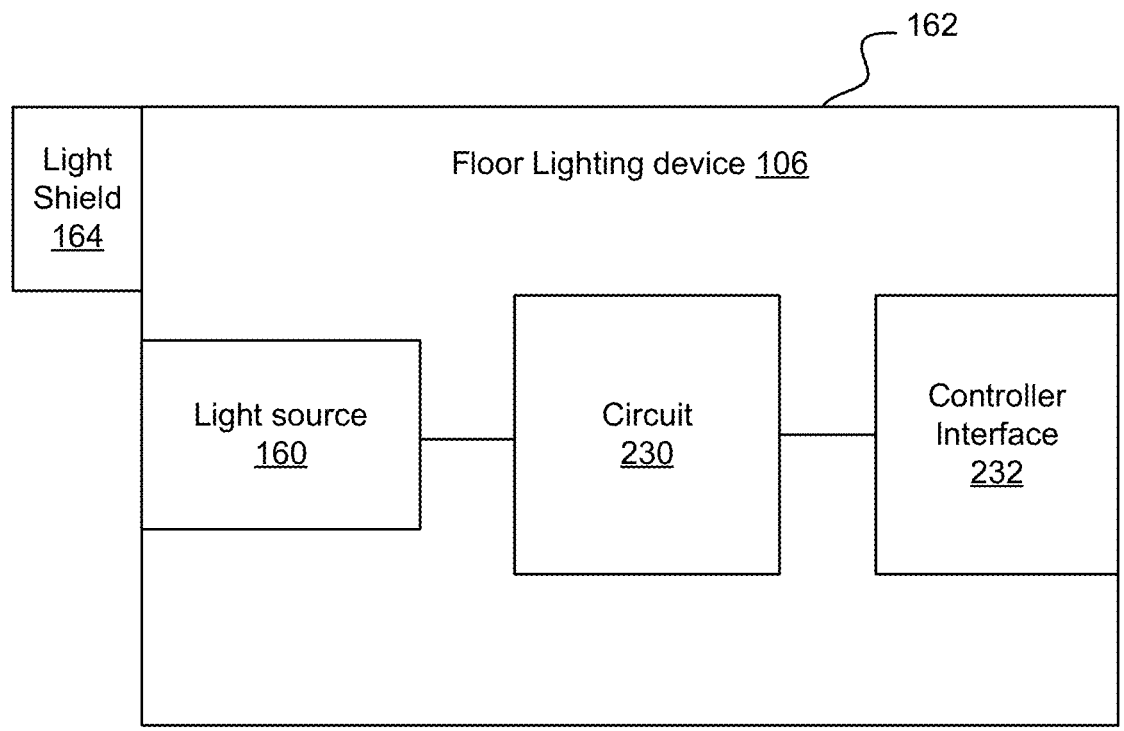
FIG. 5 is a schematic block diagram of a floor lighting device.

FIG. 5 is a schematic block diagram of the floor lighting device 106. The floor lighting device 106 includes the light source 160, the housing 162, the light shield 164, a circuit 230, and a controller interface 232.

The housing 162 is a structure that can retain or provide a coupling surface to one or more of the light source 160, the light shield 164, the circuit 230, and the controller interface 232. In some examples, the housing 162 can be a metal structure, such as an aluminum structure.

The light source 160 can include an LED or other similar light source that is operable to emit light and is capable of operating as a strobe light or a flash light. As discussed with reference to FIG. 3, the light source 160 can be comprised of a plurality of LEDs (e.g., positioned in one or more horizontal arrays). Additionally, although the floor lighting device 106 is shown as having a single light source 160, in other examples, the floor lighting device 106 can have two or more light sources (e.g., up to an n amount of light sources).

The light shield 164 can be coupled to the housing 162 or the light source 160 of the floor lighting device 106 and serves to concentrate the light emitted from the light source 160 in the horizontal direction and greatly reduces light intensity above a predetermined height from the floor (e.g., above about 1 foot from the floor).

The circuit 230 of the floor lighting device 106 can drive the emission of the light from the light source 160. In some examples, the circuit 230 is integrated with the floor lighting device 106 as illustrated. In other examples, the circuit 230 is a separate device from the floor lighting device 106. Additionally, when the circuit 230 is a separate device, the circuit 230 can operate to drive more than one floor lighting device 106 concurrently. In some examples, when the circuit 230 is a separate device, the circuit 230 can be built into one of the stands that supports and elevates the floor lighting device 106, such as stand 166 illustrated in FIG. 3. In other examples, the circuit 230 can be integrated with the controller 140 or other computing device of the photography station 102. The circuit 230 is shown and described in greater detail below with reference to FIG. 6.

The floor lighting device 106 is in wired or wireless communication with the controller 140 via the controller interface 232. In some examples, the controller 140 communicates directly with the circuit 230 to synchronize the emission of the light with a particular image capture of an image capture sequence performed by the camera 104 (e.g., with a background and floor-illuminated image capture), as described with more detail with reference to FIGS. 9 and 10.

Figure 6:
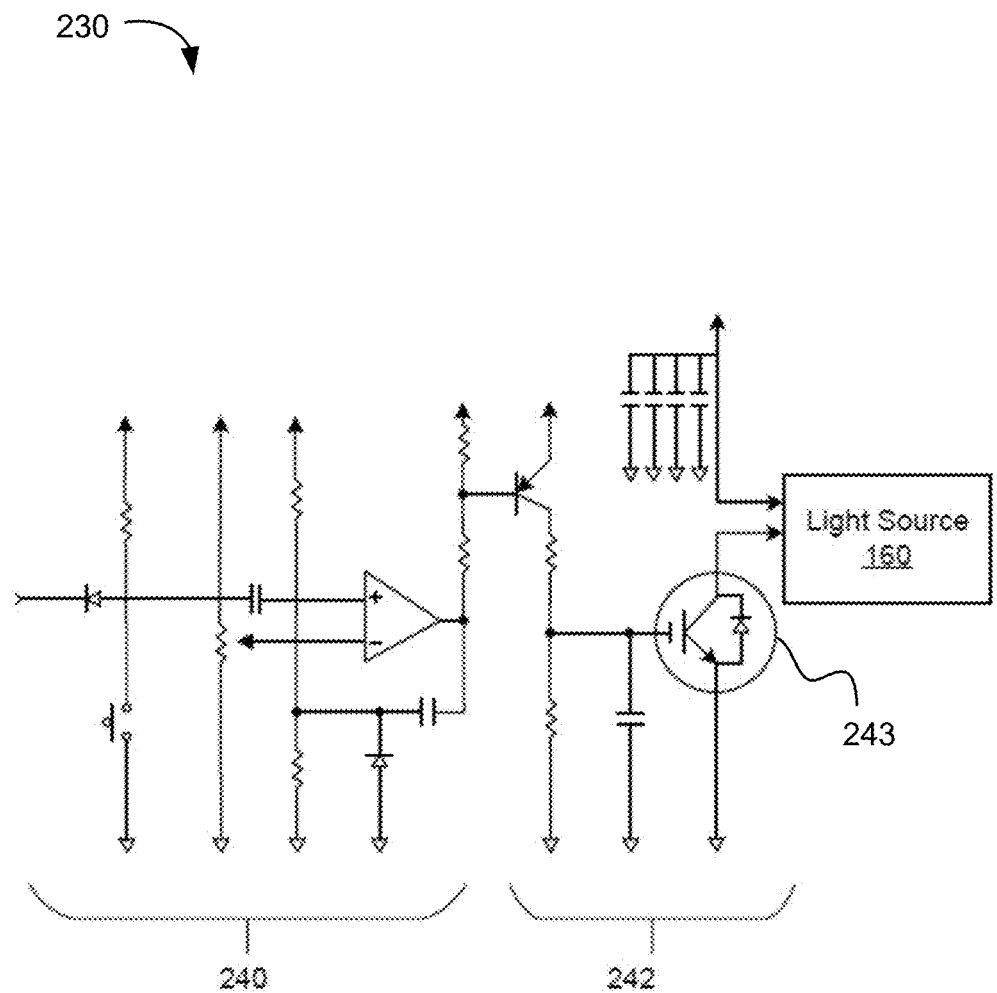
FIG. 6 is a schematic block diagram of a circuit that drives the floor lighting device.

FIG. 6 is an example of the circuit 230. The circuit 230 can include switch circuitry 240 and drive circuitry 242. The drive circuitry 242 includes a transistor 243 that drives the light source 160 of one or more floor lighting devices 106. One example transistor 243 includes the 1KW30N65ES5 soft switching insulated-gate bipolar transistor, available from Infineon Technologies AG of München, Germany.

In some examples, the switch circuitry 240 controls a time period during which the transistor 250 of the drive circuitry 242 remains on. As one example, an input signal can be received that causes the switch circuitry 240 to switch on the drive circuitry 242. When switched on, the transistor 243 of the drive circuitry 242 drives (e.g., powers on) the light source 160 of one or more floor lighting devices 106 to emit light. In some examples, the input signal is received at the switch circuitry 240 from the controller 140. The controller 140 can simultaneously send a signal to the background lights 144 such that the light from the light source 160 can be emitted synchronously with an illumination or flash of the background lights 144 during an image capture of the image capture sequence. The drive circuitry 242 drives the light source 160 for the time period controlled by the switch circuitry 240. Once the time period lapses, the switch circuitry 240 switches off the drive circuitry 242, which causes the light source 160 to power off and cease emitting the light.

In some examples, the light source 160 of the one or more floor lighting devices 106 can be overdriven for a short period of time to operate as a strobe light or flash light (e.g., to operate in a strobe light mode). The light source 160 can be overdriven by releasing electrical energy that has been saved and stored while the drive circuitry has been switched off. In some examples, the short period of time is about 16 milliseconds.

Figure 7:
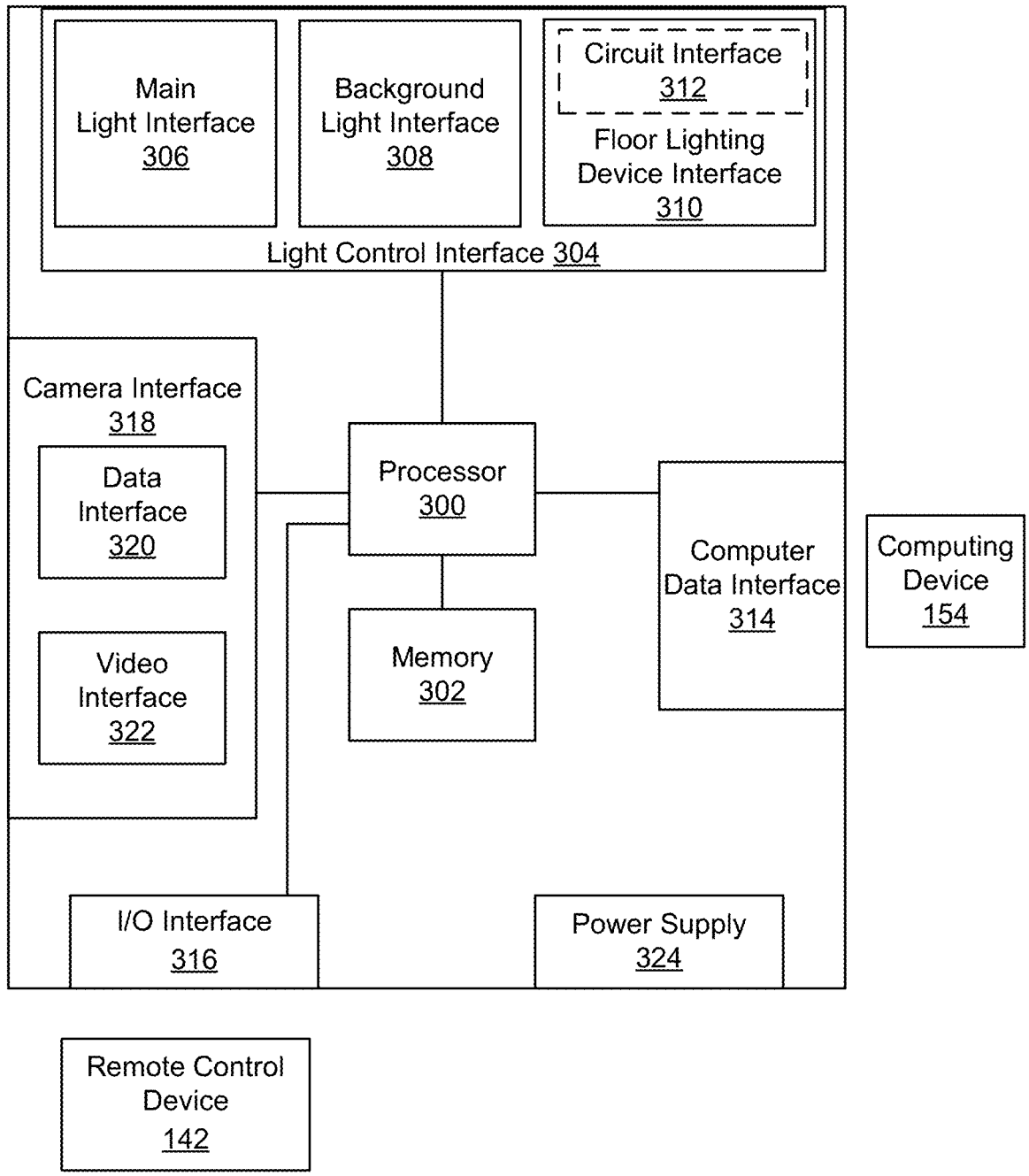
FIG. 7 is a schematic block diagram of an embodiment of a controller of a photography station.

FIG. 7 is a schematic block diagram of the controller 140 of the photography station 102. In this example, the controller 140 includes a processor 300, a memory 302, and a light control interface 304 including a main light interface 306, a background light interface 308 and a floor lighting device interface 310 that can include a circuit interface 312. The controller 140 also includes a computer data interface 314, an input/output interface 316, a camera interface 318 including a data interface 320 and a video interface 322, and a power supply 324.

The processor 300 can perform control operations of the controller 140, and interfaces with the memory 302. Examples of suitable processors and memory are described herein.

The light control interface 304 allows the controller 140 to control the operation of one or more lights of the photography station 102. For example, the main light interface 306 allows the controller 140 to control the operation of the main light 152 of the subject lighting system. The background light interface 308 allows the controller 140 to control the operation of the background lights 144 of the background lighting system. The floor lighting device interface 310 allows the controller 140 to control the operation of the light source 160 of the floor lighting device 106. In some examples, the floor lighting device interface 310 includes the circuit interface 312 to allow the controller 140 to directly drive the circuit 230 of the floor lighting device 106.

The connection between the controller 140 and the various lighting systems and devices is wired and/or wireless. In some examples, the light control interface 304 is a send only interface that does not receive return communications from the lighting systems and devices. Other examples permit bidirectional communication. In some examples, post-capture analysis is performed on the captured images to verify that lights of the various lighting systems illuminated during the appropriate image captures. The light control interface 304 is operable to selectively illuminate one or more lights at a given time. The controller 140 operates to synchronize the illumination of the lights with the operation of camera 104. For example, the illumination of the lights can be synchronized with an image capture sequence of the camera 104. In some examples, the controller 140 provides one or more triggers or pulses to the background lights 144, the main light 152, and the light source 160 of the one or more floor lighting devices 106. In other examples, the controller 140 communicates digital messages that are used to synchronize and control the various operations.

Figure 8:
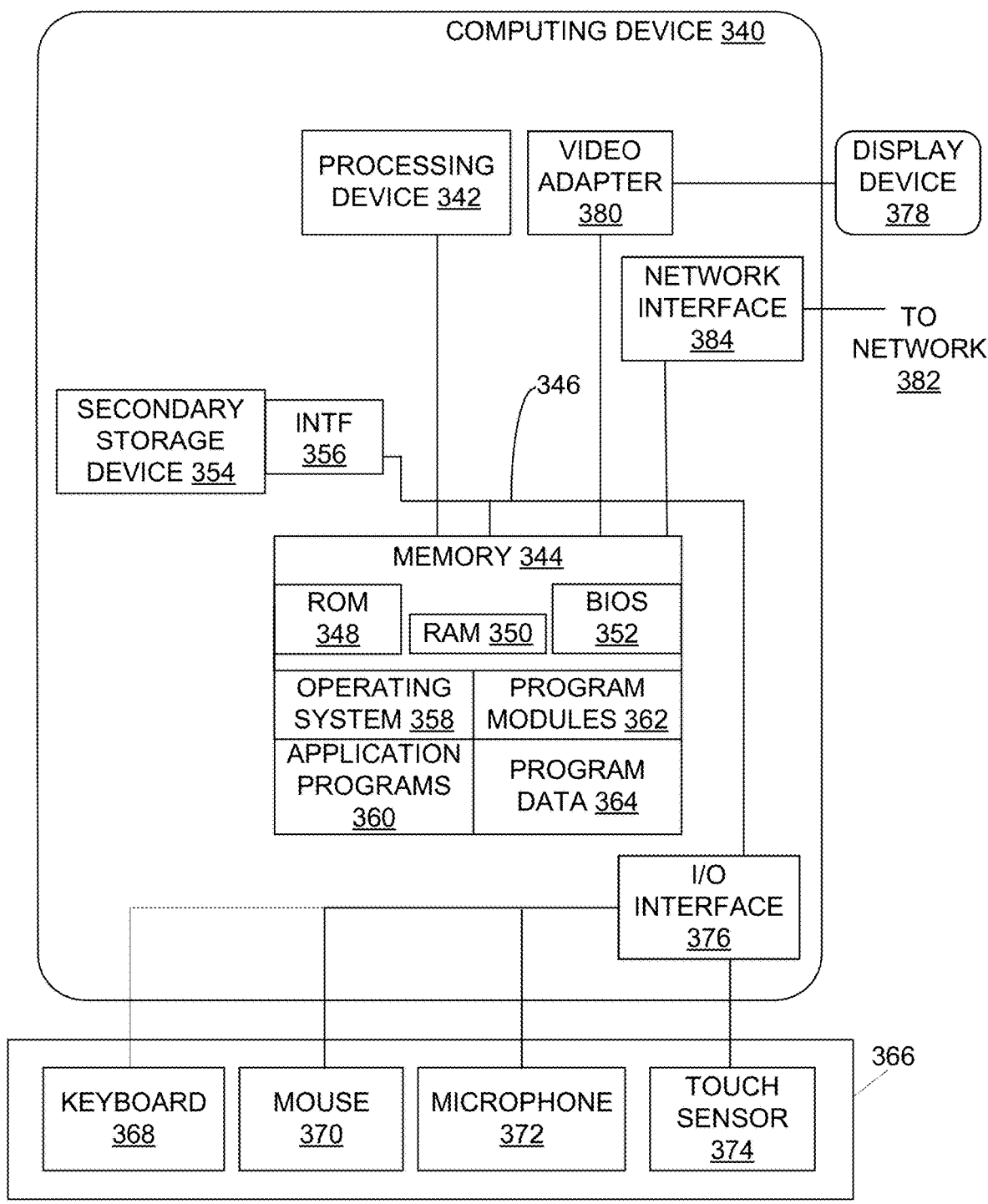
FIG. 8 is a schematic block diagram illustrating an architecture of an example computing device.

The computer data interface 314 allows the controller 140 to send and receive digital data with a computing device (e.g., computing device 340 described in FIG. 8). An example of the computer data interface 314 is a universal serial bus interface, although other communication interfaces are used in other embodiments, such as a wireless or serial bus interface.

One or more input devices, such as the remote control device 142, are coupled to the processor 300 through input/output interface 316. The input devices can be connected by any number of input/output interfaces 316 in various embodiments, such as a parallel port, serial port, game port, universal serial bus, or wireless interface.

The camera interface 318 allows the controller 140 to communicate with the camera 104. In some embodiments, camera interface 318 includes the data interface 320 that communicates with data interface 216 of the camera 104 (shown in FIG. 4), and a video interface 322 that communicates with video camera interface 214 of the camera 104 (also shown in FIG. 4). Examples of such interfaces include universal serial bus interfaces. Other embodiments include other interfaces.

In some examples, a power supply 324 is provided to receive power, such as through a power cord, and to distribute the power to other components of the photography station 102, such as through one or more additional power cords. Other embodiments include one or more batteries. Further, in some examples, the controller 140 receives power from another device.

The controller 140 is arranged and configured to synchronize the illumination of background lights 144, the main light 152, and the light sources of the floor lighting device 106 with the image captures, either through wired or wireless communication. In some examples, the controller 140 provides one or more triggers or pulses to the background lights 144, the main light 152, and the light source 160 of the one or more floor lighting devices 106. In other examples, the controller 140 communicates digital messages that are used to synchronize and control the various operations.

FIG. 8 is a schematic block diagram illustrating an architecture of a computing device that can be used to implement aspects of the present disclosure, including the camera 104, the image processing system 110, and the remote computing device 154, and will be referred to herein as the computing device 340.

The computing device 340 is used to execute the operating system, application programs, and software modules (including the software engines) described herein.

The computing device 340 includes, in some embodiments, at least one processing device 342, such as a central processing unit (CPU). A variety of processing devices are available from a variety of manufacturers, for example, Intel or Advanced Micro Devices. In this example, the computing device 340 also includes a system memory 344, and a system bus 346 that couples various system components including the system memory 344 to the processing device 342. The system bus 346 is one of any number of types of bus structures including a memory bus, or memory controller; a peripheral bus; and a local bus using any of a variety of bus architectures.

Examples of computing devices suitable for the computing device 340 include a desktop computer, a laptop computer, a tablet computer, a mobile device (such as a smart phone, an iPod® mobile digital device, or other mobile devices), or other devices configured to process digital instructions.

The system memory 344 includes read only memory 348 and random access memory 350. A basic input/output system 352 containing the basic routines that act to transfer information within the computing device 340, such as during start up, is typically stored in the read only memory 348.

The computing device 340 also includes a secondary storage device 354 in some embodiments, such as a hard disk drive, for storing digital data. The secondary storage device 354 is connected to the system bus 346 by a secondary storage interface 356. The secondary storage devices and their associated computer readable media provide nonvolatile storage of computer readable instructions (including application programs and program modules), data structures, and other data for the computing device 340.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media.

A number of program modules can be stored in the secondary storage device 354 or the memory 344, including an operating system 358, one or more application programs 360, other program modules 362, and program data 364.

In some embodiments, the computing device 340 includes input devices to enable a user to provide inputs to the computing device 340. Examples of input devices 366 include a keyboard 368, a pointer input device such as a mouse 370, a microphone 372, and a touch sensitive display 374. Other embodiments include other input devices 366. The input devices are often connected to the processing device 342 through an input/output interface 376 that is coupled to the system bus 346. These input devices 366 can be connected by any number of input/output interfaces, such as a parallel port, serial port, game port, or a universal serial bus. Wireless communication between input devices and interface 376 is possible as well, and includes infrared, Bluetooth® wireless technology, 802.11a/b/g/n, cellular, or other radio frequency communication systems in some possible embodiments.

In this example embodiment, a touch sensitive display device 378 is also connected to the system bus 346 via an interface, such as a video adapter 380. The touch sensitive display device 378 includes touch sensors for receiving input from a user when the user touches the display. Such sensors can be capacitive sensors, pressure sensors, or other touch sensors. The sensors not only detect contact with the display, but also the location of the contact and movement of the contact over time. For example, a user can move a finger or stylus across the screen to provide written inputs. The written inputs are evaluated and, in some embodiments, converted into text inputs.

In addition to the display device 378, the computing device 340 can include various other peripheral devices (not shown), such as speakers or a printer.

When used in a local area networking environment or a wide area networking environment (such as the Internet), the computing device 340 is typically connected to the network 382 through a network interface, such as a wireless network interface 384. Other possible embodiments use other communication devices. For example, some embodiments of the computing device 340 include an Ethernet network interface, or a modem for communicating across the network.

In some examples, the computing device 340 includes a power supply that provides electric power to several components and elements of the computing device 340. Examples of the power supply include AC power supplies, DC power supplies, and batteries, either disposable or rechargeable.

The computing device 340 typically includes at least some form of computer readable media. Computer readable media includes any available media that can be accessed by the computing device 340. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 340.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

Figure 9:
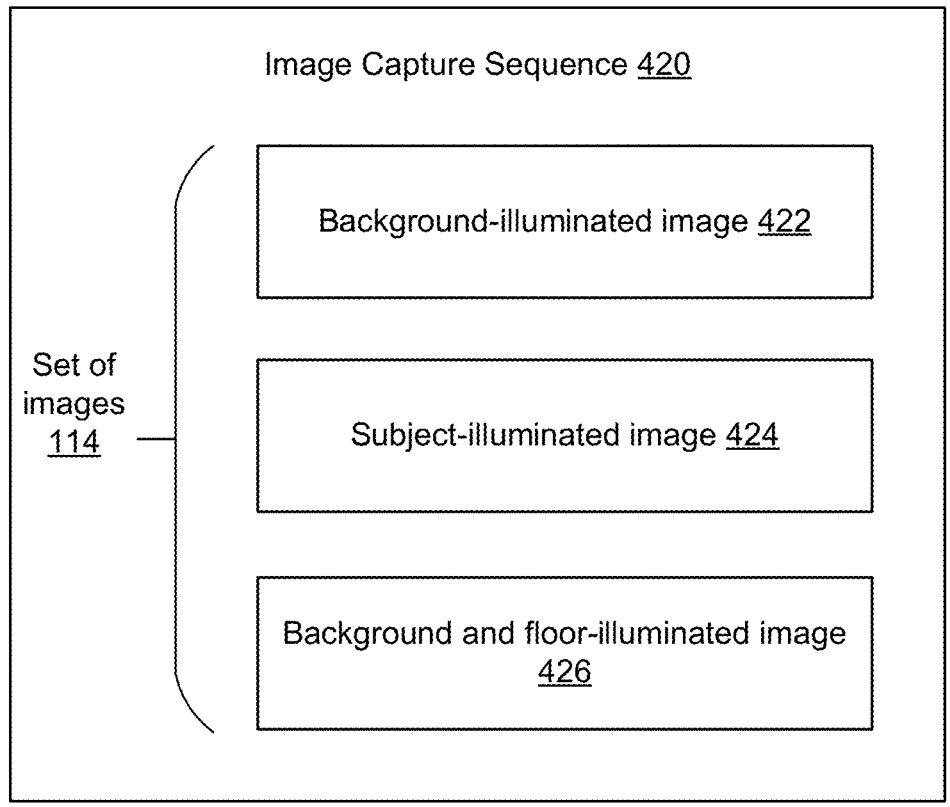
FIG. 9 illustrates an example image capture sequence.
Figure 10:
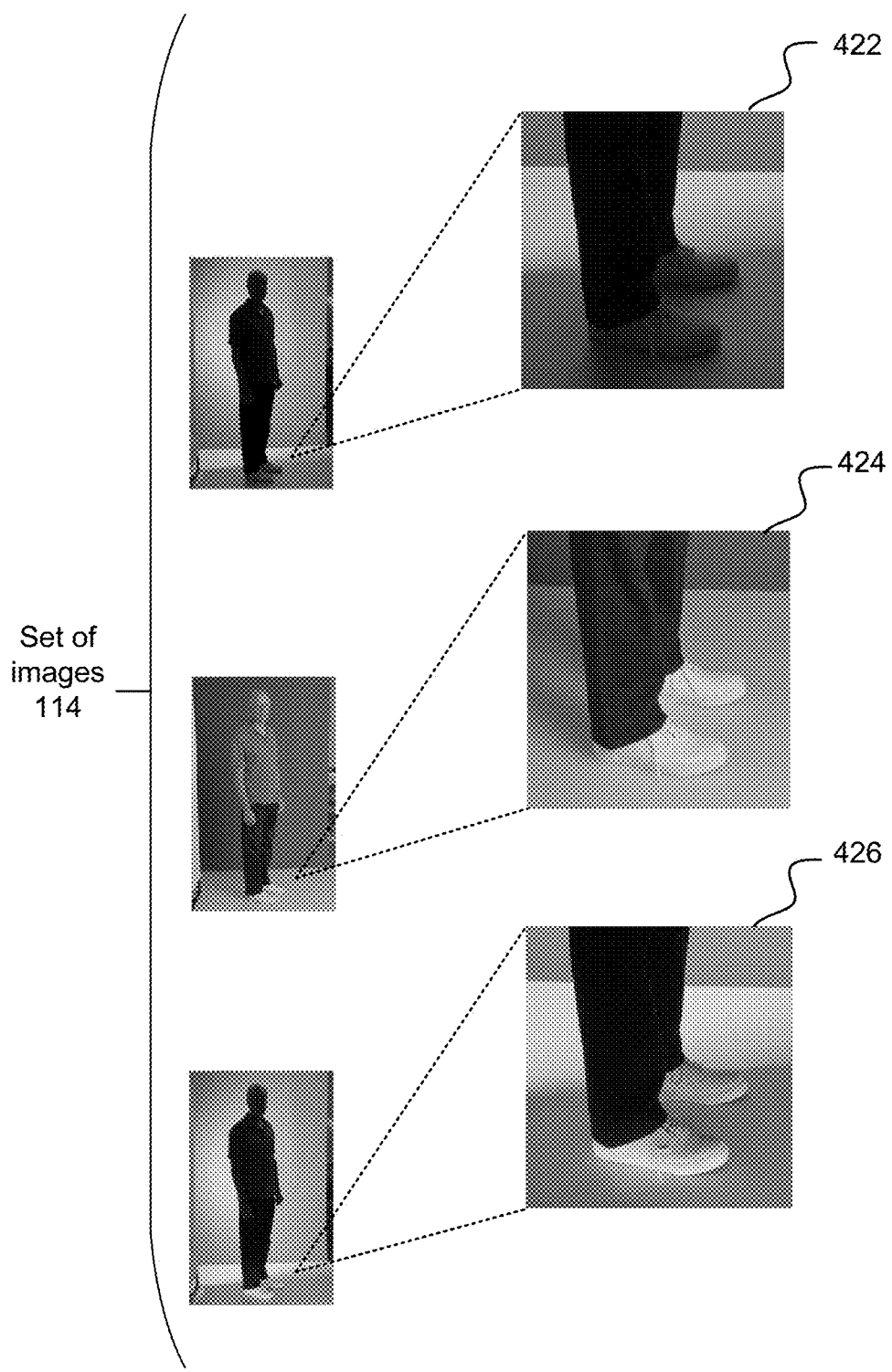
FIG. 10 illustrates an example set of images resulting from the image capture sequence.

FIG. 9 illustrates an example image capture sequence 420 performed by the camera 104. FIG. 10 illustrates example images resulting from the image capture sequence 420. To emphasize the contrast distinctions between each of the image captures caused by the various illumination conditions initiated during each capture, the images are further focused in on the foot portion of the subject S (e.g., the subject's lower legs and footwear) and the surrounding floor. Referring concurrently to FIG. 9 and FIG. 10, in some examples, the image capture sequence 420 includes at least three image captures yielding at least three images within the set of images 114.

A first image of the set of images 114 can include a background-illuminated image 422 that is captured under a first lighting or illumination condition where the background lights 144 are illuminating the background 146. In the background-illuminated image 422, both the subject S and the floor are dark due to the light block 150 preventing most or substantially all of the light from the background lights 144 from illuminating the subject S (and similarly the floor). Resultantly, there is limited local contrast between the subject and the floor in the area of the shoes.

A second image of the set of images 114 can include a subject-illuminated image 424 that is captured under a second lighting or illumination condition where the main light 152 is illuminating the subject S. The illumination of the main light 152 can be independent from any other illumination. In the subject-illuminated image 424, the floor and the shoes are at a similar brightness in many areas or the shoes can even be darker than the floor in some areas. Thus, there is more local contrast between the shoes and the floor in the subject-illuminated image 424 than the background-illuminated image 422, and particularly at a top of the shoes.

A third image of the set of images 114 can include at least a floor-illuminated image that is captured under a third lighting or illumination condition, where the light source 160 of the one or more floor lighting devices 106 are illuminating a foot portion of the subject (e.g., the subject's feet, socks, or footwear) and surrounding floor. In some examples, and as described hereafter, the third image can include a second background-illuminated image and the floor-illuminated image captured in a single frame (e.g., a background and floor-illuminated image 426), where the third image is captured under both the first and third lighting or illumination conditions (e.g., when the background lights 144 are illuminating the background 146 and the light source 160 of the one or more floor lighting devices 106 is illuminating the foot portion of the subject and surrounding floor). In the background and floor-illuminated image 426 image, the floor is much darker than the lower areas of the shoes because the light source 160 of the one or more floor lighting devices 106 are just above floor level and at a sizeable distance from the subject S. Thus, the background and floor-illuminated image 426 has more local contrast between the subject S and the floor than the background-illuminated image 422, and particularly at the bottom of the shoes. Different colors of shoes can cause the contrast to exhibit in different ways across the set of images 114.

The unique local contrast exhibited in each of the background-illuminated image 422, the subject-illuminated image 424, and the background and floor-illuminated image 426 can be added together to build contrast around the subject S, which defines or distinguishes the subject S from the background and the floor (e.g., provides a continuous outline of the subject S). This definition can be leveraged to generate a background mask and a floor mask that are combined and smoothly transitioned to yield a compiled mask for application to the subject-illuminated image 424. The compiled mask may be applied to enable background and floor replacement in the subject-illuminated image 424 and/or otherwise generate an extracted full-length subject image in which the background and the floor are removed such that only the subject S remains.

The set of images 114 described with reference to FIGS. 9 and 10 is a non-limiting, illustrative example. In other examples, the set of images can have a plurality of images (e.g., more than three images) comprising any combination of: a first background-illuminated image, a first subject-illuminated image via a main light 152 of the subject lighting system, a second subject-illuminated image via a fill light of the subject lighting system, a third subject-illuminated image via another light source having an artistic lighting shape, a fourth subject-illuminated image via a reflective lighting system, a floor-illuminated image, an image with no illumination (e.g., ambient lighting), a fiducially marked image, a second background-illuminated image, and a third background-illuminated image. Examples of these images are discussed below.

One of the images can include a fiducially marked image that is captured under a fourth lighting or illumination condition where the subject S is illuminated with collimated light from one or more fiducial light sources of a fiducial marking device of the photography station 102, as described in greater detail in U.S. patent application Ser. No. 16/731, 190. Alternatively, the third lighting or illumination condition may also include illumination of the subject S with collimated light from the fiducial light sources of the fiducial marking device. Thus, the third image captured may be a single image frame that is effectively a combination of the background and floor-illuminated image 426 and the fiducially marked image captured in a single frame. In some examples, the location of the fiducial markers formed on the subject S and captured in the fiducially marked image are used to determine pixel density of an image (e.g., affected by zoom factors applied by the camera 104) and a reference height of a subject. Such information can be useful for image processing techniques, including scaling, to generate an appropriately scaled individual subject photograph (e.g., where subject is appropriately scaled to any props in the photograph) or a group composite image that accurately represents the subjects of the group relative to one another.

In other examples, one of the images could be another background-illuminated image (or another background and floor-illuminated image) used to determine a subject's acceleration and generate a background mask accordingly to account for the movement. For example, when a subject is one or more persons and the one or more persons are in the act of jumping during image capture, the subject will have a non-linear rate of movement between the images.

In further examples, one of the images could include a second subject-illuminated image. In the initial subject-illuminated image 424, the subject S can be illuminated by the main light 152, whereas in the second subject-illuminated image, the subject S can be illuminated by the fill reflector 148 (e.g., when the fill reflector 148 is a light). Alternatively, the main light 152 can be used for both subject-illuminated image captures. As another example, in the second subject-illuminated image, the subject S can be illuminated by a reflecting lighting system, such as the reflective lighting system described in U.S. Pat. No. 9,353, 928, where the reflective lighting system can act as an edge light, and more specifically as a hair light to illuminate edge features, such as a top of the subject's head. As a further example, in the second subject-illuminated image or as a third subject-illuminated image, the subject S can be illuminated by another light source having an artistic lighting shape.

In yet further examples, one of the images can capture an image of the subject S when the background lights 144 and the subject lights (e.g., the main light 152 and/or fill reflector 148) are not illuminated. A purpose for capturing an image without any of the lighting elements illuminated is to measure and subtract ambient lighting from the images. This may be necessary as the f-stop value is lower and/or when capturing images in environments where the ambient lighting conditions cannot be fully or partially controlled.

The controller 140 can operate to synchronize the illumination of the various light sources with the respective image captures.

Figure 11:
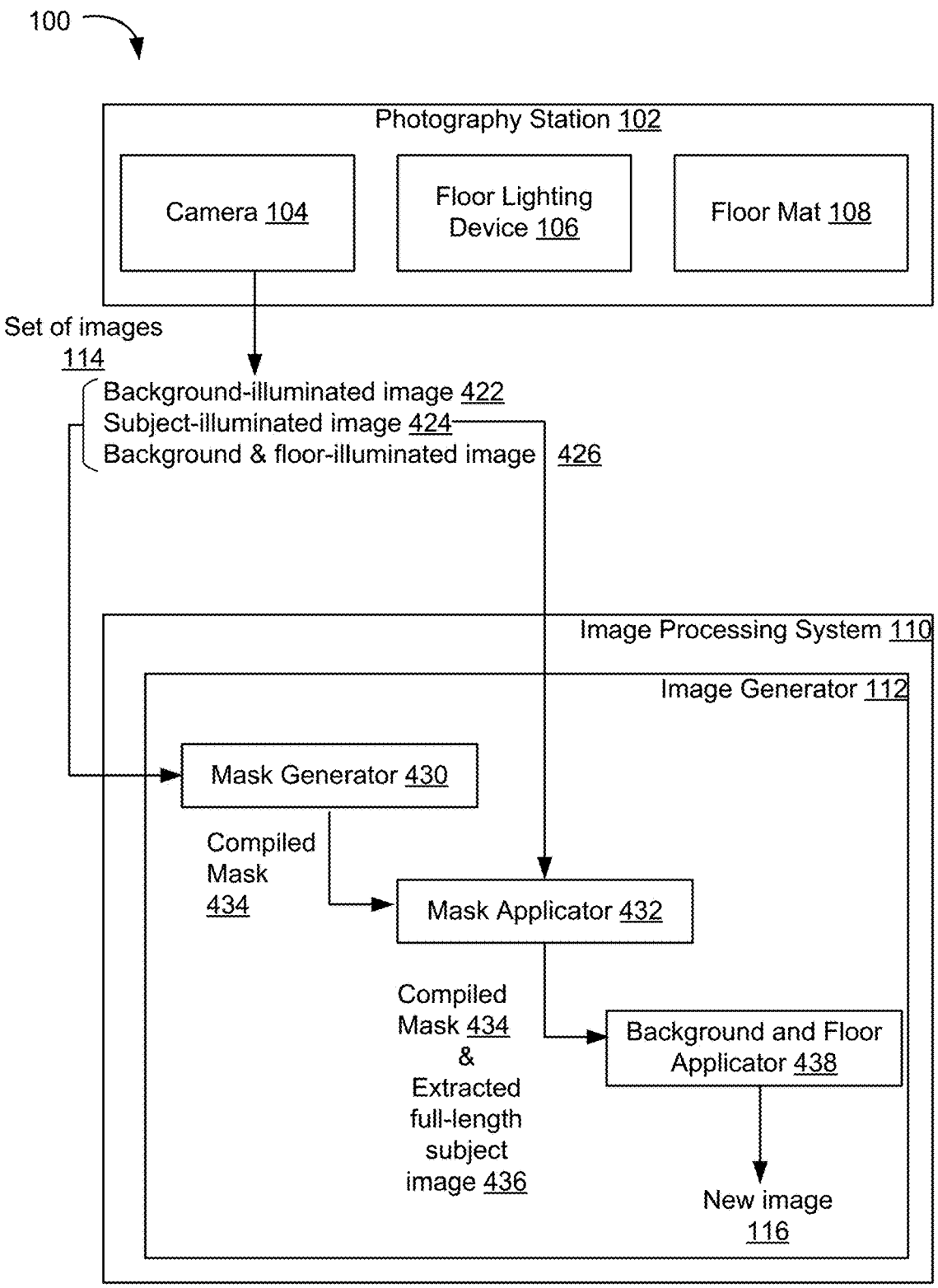
FIG. 11 is a process flow diagram for performing background and floor replacement to generate a new full-length subject image.

FIG. 11 is a system flow diagram for performing background and floor replacement to generate a new full-length subject image. The system 100 includes the photography station 102 and the image processing system 110 as described in FIG. 1. The camera 104 of the photography station 102 can perform an image capture sequence, such as the image capture sequence 420 described in FIG. 9, to capture a set of images 114 that include at least the background-illuminated image 422, the subject-illuminated image 424, and the background and floor-illuminated image 426.

Once captured by the camera 104, the set of images 114 can be transmitted from the camera 104 to the image processing system 110. The image generator 112 of the image processing system 110 described in FIG. 1 can include at least a mask generator 430, a mask applicator 432, and a background and floor applicator 438.

The mask generator 430 can receive the set of images 114 to generate a compiled mask 434 using each of the background-illuminated image 422, the subject-illuminated image 424, and the background and floor-illuminated image 426. As described in more detail with reference to FIG. 12, generation of the compiled mask 434 can involve preprocessing each image of the set of images 114, generation of a background mask and a floor mask, and generation of the compiled mask 434 by combining and seamlessly transitioning the background mask and the floor mask.

After the compiled mask 434 is generated, the mask applicator 432 can receive the compiled mask 434 along with the subject-illuminated image 424. The mask applicator 432 can then overlay the compiled mask 434 onto the subject-illuminated image 424. The compiled mask 434 should have equal to, or close to, a 1-to-1 correspondence in position with the subject S in the subject-illuminated image 424. For example, the compiled mask 434 has the same width and height dimensions in pixels as the subject-illuminated image 424. Thus, in one embodiment, one corner pixel of the compiled mask 434 can be aligned with the corresponding corner pixel of the subject-illuminated image 424. Then any portion of the subject-illuminated image 424 that is not covered by the compiled mask 434 (e.g., the background and the floor) can be removed such that only the subject S remains, hereinafter referred to as an extracted full-length subject image 436. In some examples, a new subject image is created from the subject-illuminated image 424 and the compiled mask 434 is overlaid onto the new subject image to generate the extracted full-length subject image 436.

In some examples, a new background and floor are to be inserted in order to generate the new image 116. In such examples, the mask applicator 432 may provide the extracted full-length subject image 436 and compiled mask 434 to the background and floor applicator 438, and the background and floor applicator 438 may apply the compiled mask 434 to the extracted full-length subject image 436 to insert the new background and floor. The compiled mask 434 can then be removed leaving, as the new image 116, the extracted full-length subject image 436 integrated with the new background and floor in a natural looking manner (e.g., as if the subject S was standing in front of and on the new background and floor when the image was captured). In an alternative example, the generated background mask and floor mask can be provided to the mask applicator 432 along with the subject-illuminated image 424. The background mask and floor mask can be used similarly to the compiled mask 434, but applied as separate masks, to generate the new image 116.

In some examples, edits or transformations can then be performed on the new image 116. For example, the new image 116 can be cropped, or vignettes and shadowing can be applied. Other example transformations can include a color correction, a dust correction, a brightness correction, a tilt, or other desired transformations or combinations of transformations. The new image 116 is then provided as output of the image processing system 110.

In some examples, the new image 116 (or alternatively the assembled composite group image) can be provided to a production system to produce one or more products. Examples of products include marketing or promotional material, a photo mug, a picture book, a photograph, a computer readable medium storing digital image data, and digital images delivered across a network. Other examples of products include a composite product (composed of multiple different images), a photo mouse pad, a collage, a key tag, a digital picture frame or digital key chain, a photo card (such as a student identification card, driver's license, holiday or greeting card, security badge, baseball or other sports card, luggage tag, etc.), a photo magnet, an ornament, a puzzle, a calendar, a tote bag, a photo keepsake box, a t-shirt, an apron, or a variety of other products including a photographic image. In some examples, the production system can include a web server that is configured to communicate data across a network, such as to send products in the form of digital data to a client computing system.

Figure 12:
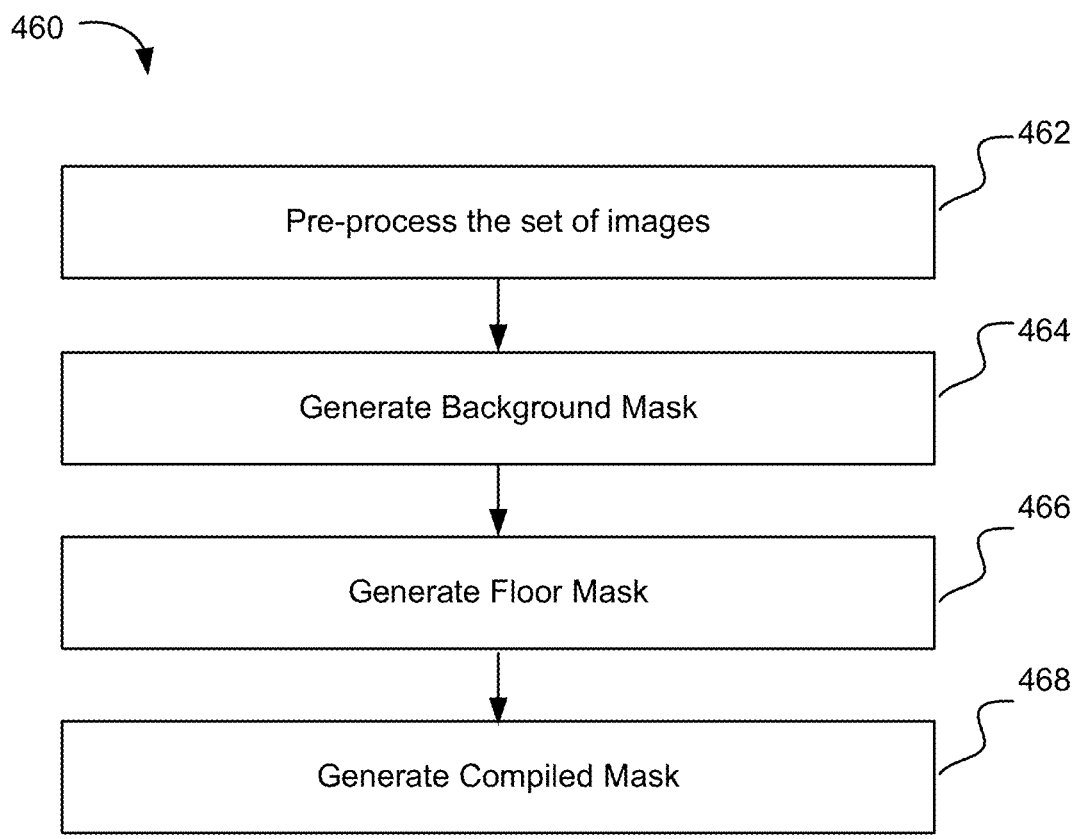
FIG. 12 is a flowchart of an example method for generating a mask.

FIG. 12 is a flowchart of an example method 460 for generating a compiled mask 434. The method 460 can be performed by the mask generator 430 of the image generator 112 described with reference to FIG. 11.

The method 460 can begin at operation 462, where the set of images 114 are received and preprocessed. The set of images 114 include at least the background-illuminated image 422, a subject-illuminated image 424, and a background and floor-illuminated image 426. As described in greater detail with reference to FIG. 13, pre-processing of the set of images 114 can include linearizing each image in the set, generating an overall local contrast image for the set of linearized images, identifying pure background and pure floor pixels for each linearized image in the set, generating a predictor image for each linearized image in the set, and generating a transition mixing image.

The method 460 then proceeds to operation 464, where a background mask is generated. In some examples, the background mask is generated using a single image from the set of images. Particularly, the single image used can be a grayscale version of the linearized background-illuminated image 422 or a grayscale version of the linearized background and floor-illuminated image 426. Details for generating the background mask based on a single image are described in U.S. Pat. No. 7,834,894, issued on Nov. 16, 2010, entitled METHOD AND APPARATUS FOR BACKGROUND REPLACEMENT IN STILL PHOTOGRAPHS, the entirety of which is hereby incorporated by reference. In some examples, a quality of the background mask can be enhanced by further utilizing the corresponding predictor image generated for the single image to generate the background mask.

In other examples, and as described in more detail with reference to FIGS. 25 and 26, the background mask can be generated using multiple images from the set of images. Particularly, the multiple images used can be a grayscale version of the linearized background-illuminated image 422 and a grayscale version of the linearized background and floor-illuminated image 426. By generating the background mask using both the linearized background-illuminated image 422 and linearized background and floor-illuminated image 426, any motion of the subject S between the first image capture and the third image capture can be determined and an intermediate position of the subject during the second image capture (e.g., the capture of the subject-illuminated image 424) is estimated. The background mask can then be generated at the estimated intermediate position. In some examples, the linearized subject-illuminated image 424 can also be utilized to facilitate generation of the background mask. Additional details for generating the background mask based on multiple images are described in U.S. Pat. No. 10,110,792, issued on Oct. 23, 2018, entitled BACKGROUND REPLACEMENT SYSTEM AND METHODS, the entirety of which is hereby incorporated by reference. In some examples, a quality of the background mask can be enhanced by further utilizing the corresponding predictor images generated for each of the multiple images to generate the background mask.

The method 460 then proceeds to operation 466, where a floor mask is generated. The floor mask is generated using the linearized subject-illuminated image 424 and the linearized background and floor-illuminated image 426. As described in more detail with reference to FIGS. 27 and 28, the corresponding predictor images generated for the linearized subject-illuminated image 424 and the linearized background and floor-illuminated image 426 during pre-processing at operation 462 can also be used to generate the floor mask. For example, the generation of the floor mask can include calculation of color differences between each image and its corresponding predictor image.

The method 460 ends at operation 468 where a compiled mask 434 is generated. As described in more detail with reference to FIGS. 29-31, the compiled mask 434 is generated by combining the background mask generated at operation 464 and the floor mask generated at operation 466 into a single mask. The transition mixing image generated during pre-processing at operation 462 is then utilized to provide a seamless transition between the combined background mask and the floor mask. In some examples, the compiled mask 434 is then further processed to fill in any edges with black if the edges do not come into contact with the subject S, and remove any artifacts in the compiled mask that are disconnected from the subject S, among other similar examples.

In other examples, the method 460 can end at operation 466, and the background mask and floor mask can remain as separate masks rather than being combined and smoothly transitioned into the single mask.

Figure 13:
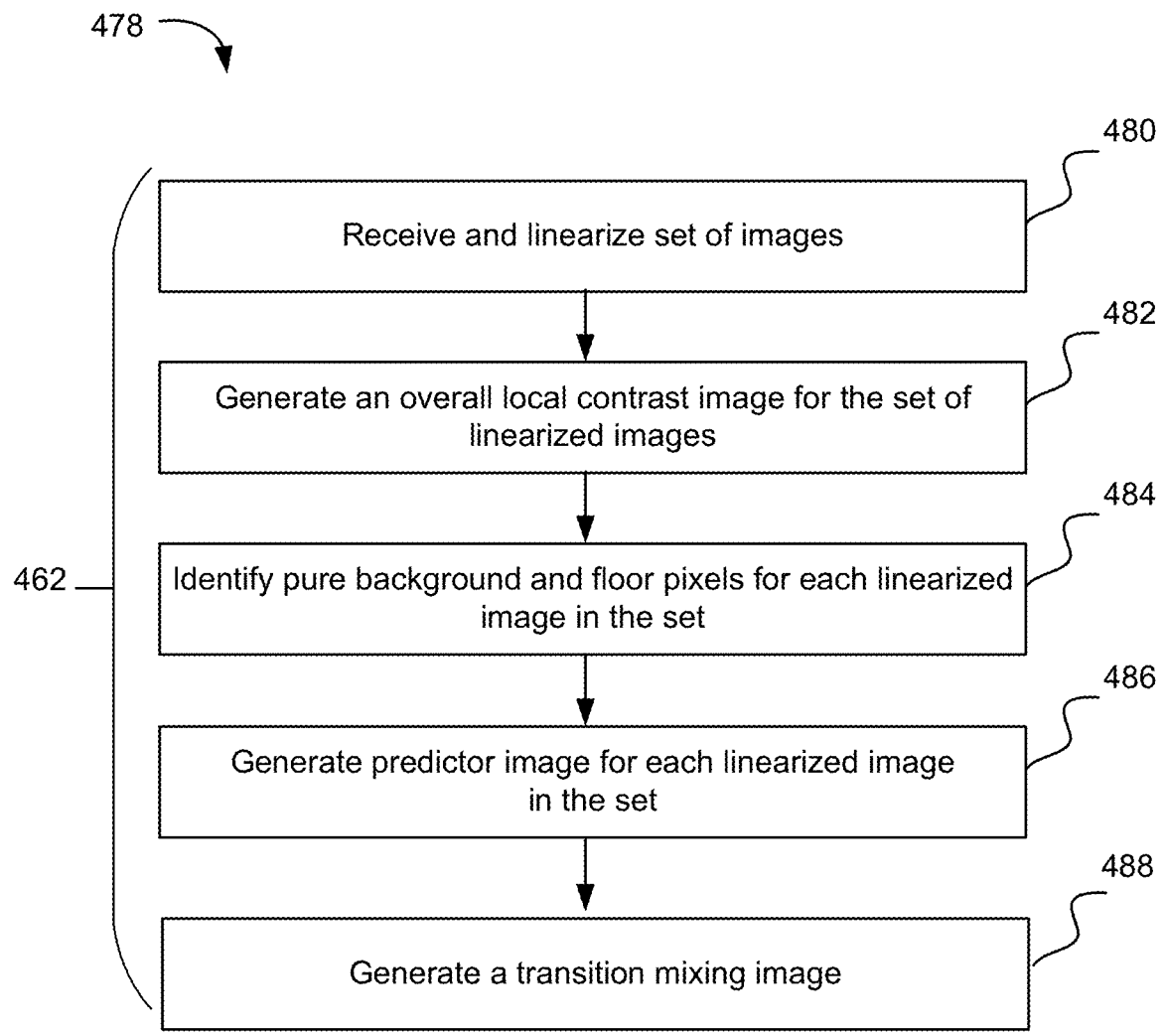
FIG. 13 is a flowchart of an example method for pre-processing the set of images for mask generation.

FIG. 13 is a flowchart of an example method 478 for pre-processing the set of images 114 for mask generation. The method 478 can be performed by the mask generator 430 of the image generator 112 described with reference to FIG. 11. In some examples, the method 478 can be used to at least partially perform the operation 462 of the method 460 shown in FIG. 12.

The method 478 begins at operation 480, where the set of images 114 are received and linearized. To linearize the set of images 114, each of the images is opened in random access memory (RAM) and rotated so that the subject S is vertical in the images. Pixel values in each of the images are adjusted (e.g., by applying a transformation) such that the pixel values are linearly related to an intensity of light that exposed the electronic image sensor 200 of the camera 104 (shown in FIG. 4). As a result, a linearized background-illuminated image 422, a linearized subject-illuminated image 424, and a linearized background and floor-illuminated image 426 are generated for use in subsequent processes of the method 460. Linearization provides more accurate calculations for measuring color difference, overall brightness, and local contrast, among other calculations.

The method 478 proceeds to operation 482, where an overall local contrast image is generated for the set of linearized images. As described in more detail with reference to FIGS. 14 and 15, generating the overall local contrast image includes determining a local contrast for each linearized image in the set and then combining the determined local contrast for each linearized image into the overall local contrast image for the set. The overall local contrast image for the set shows the overall local contrast between the subject and the floor (e.g., defines the subject from the floor).

The method 478 then proceeds to operation 484, where pure background pixels and pure floor pixels are identified for the set of linearized images. As described in more detail with reference to FIGS. 16-19, the identification includes generating a first image with identified background pixels (and some floor pixels near the background) and a second image with identified floor pixels, and combining the first image and the second image to yield an image of the pure background and pure floor pixels. As part of generating the second image, a seam between the background and floor is determined.

The method 478 then proceeds to operation 486, where a predictor image corresponding to each linearized image in the set is generated. As described in more detail with reference to FIGS. 20-22, generation of the predictor images include generation of images that predict what each linearized image in the set would have looked like had the subject S not been in the image. In other words, the predictor image extrapolates pure background pixels and pure floor pixels into the subject S. The predictor image is helpful in understanding a brightness of the background and the floor behind the subject S to enable a high quality replacement. For example, in an image in which the subject's shoes have shoelaces, the image predictor is helpful in understanding that a gap within one or more loops of the shoelaces comprises pure background or floor pixels that are to be replaced, for example, when removing a current background and floor to insert a new background and floor.

The method 478 then proceeds to operation 488, where a transition mixing image is generated. As described in more detail with reference to FIGS. 23 and 24, generation of the transition mixing image includes using the seam between the background and floor that is determined as part of the identification of pure background and pure floor pixels at operation 484, and setting each pixel above the seam line to a first value such that the pixel appears white and setting each pixel below the seam line to a second value such that the pixel appears black. In some examples, the transition mixing image is then blurred. The transition mixing image can be used to provide a seamless transition between the background mask and the floor mask when combined to generate the compiled mask.

Figure 14:
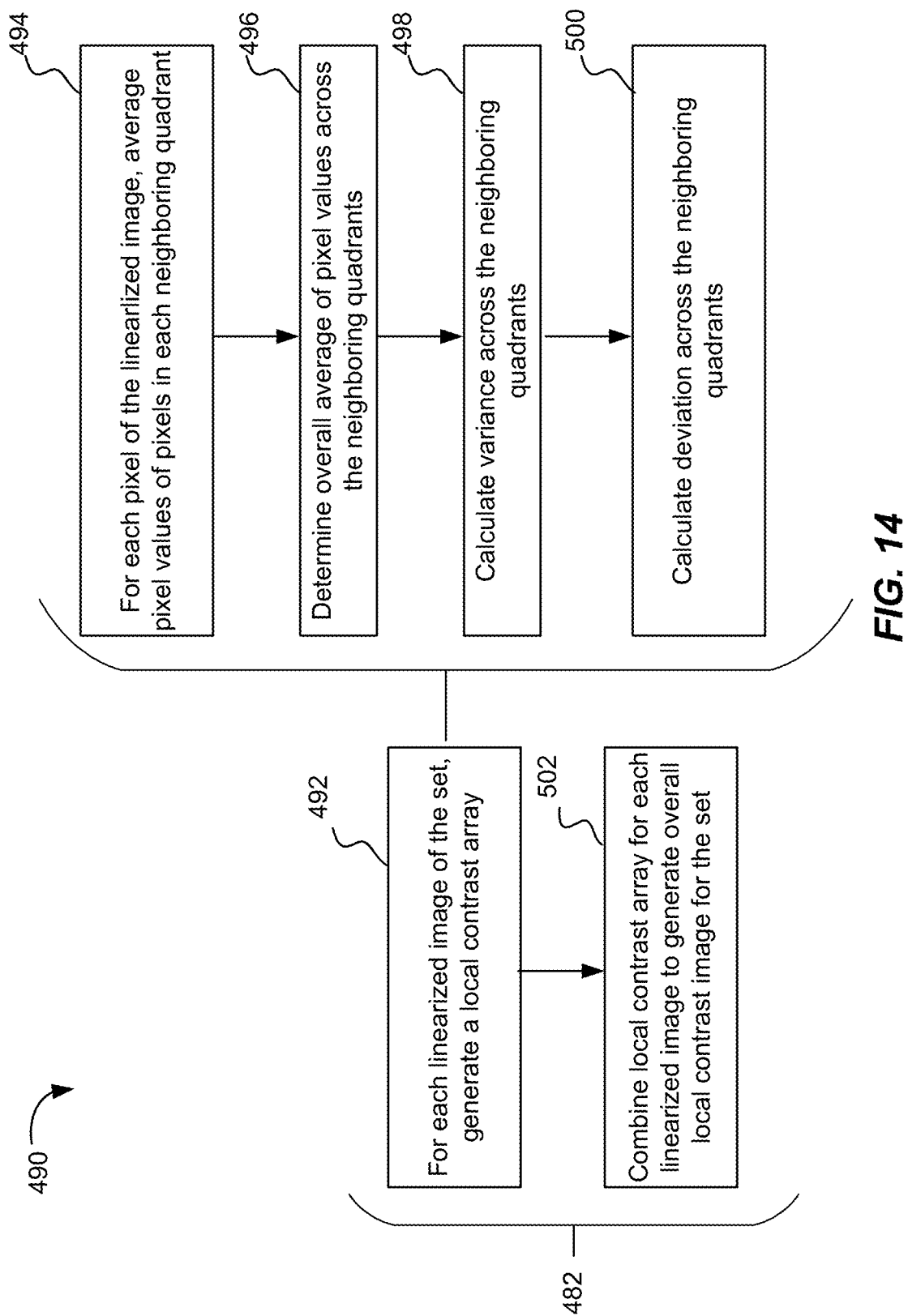
FIG. 14 is a flowchart of an example method for generating an overall local contrast image for the set of images.

FIG. 14 is a flowchart of an example method 490 for determining an overall local contrast image for a set of linearized images. The method 490 can be performed by the mask generator 430 of the image generator 112 described with reference to FIG. 11. In some examples, the method 490 can be used to at least partially perform the operation 482 of the method 478 shown in FIG. 13.

As previously discussed with reference to FIG. 12, the set of linearized images includes at least a linearized background-illuminated image 422, a linearized subject-illuminated image 424, and a linearized background and floor-illuminated image 426. The method 490 begins at operation 492, where for each image of the set of linearized images, a local contrast array is generated that represents a local contrast for each pixel of the image. For example, a first local contrast array is generated for the linearized background-illuminated image 422, a second local contrast array is generated for the linearized subject-illuminated image 424, and a third local contrast array is generated for the linearized background and floor-illuminated image 426.

Figure 15:
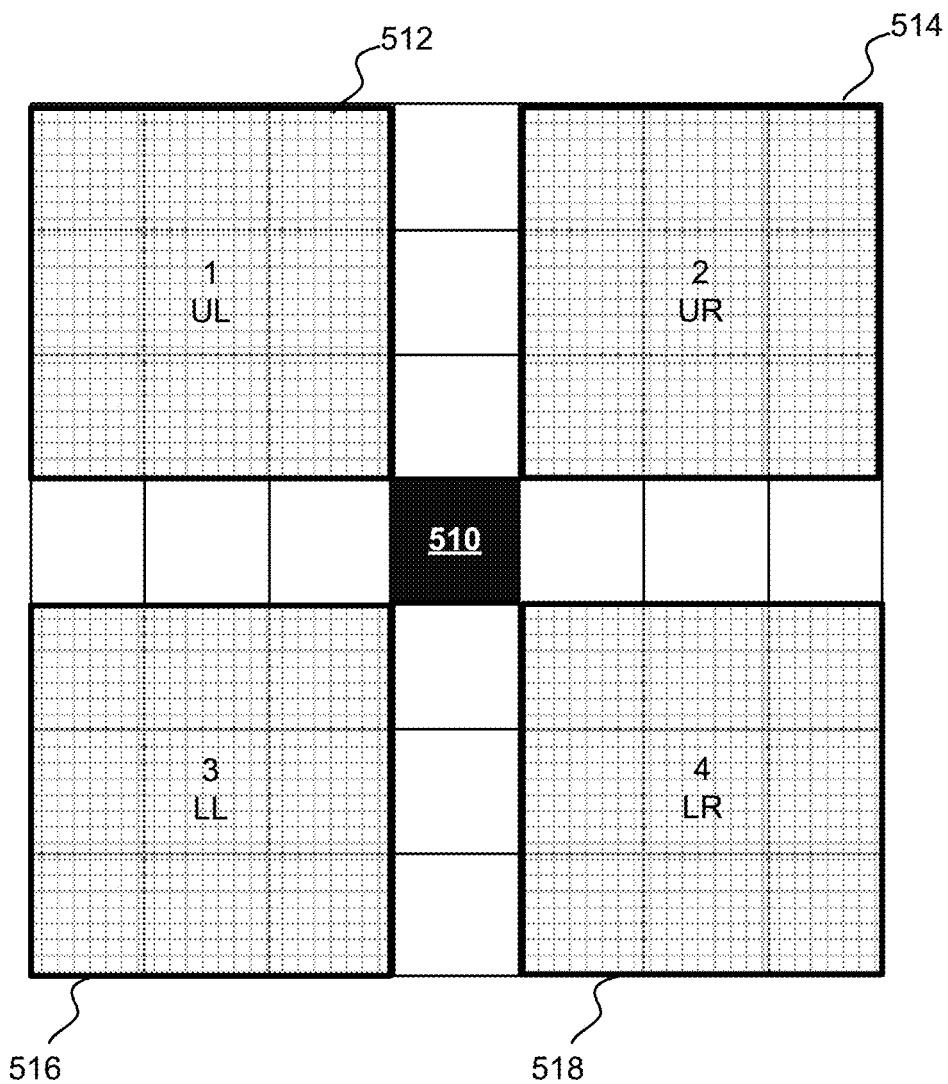
FIG. 15 conceptually illustrates determining local contrast for a pixel of an image from the set of images as part of the method described in FIG. 14.

In some examples, operations 494, 496, 498, and 500 can be used to at least partially perform the operation 492 to generate the local contrast array representing the local contrast for each pixel of the respective image of the set. FIG. 15 conceptually illustrates determining a local contrast for a pixel 510 of an image from the set. Referring to operations 494, 496, 498, and 500 and FIG. 15 concurrently, at operation 494, for the pixel 510, pixel values for pixels in each of neighboring quadrants 512, 514, 516, 518 are averaged. Relative to the pixel 510, quadrant 512 is an upper left (UL) quadrant, quadrant 514 is an upper right (UR) quadrant, quadrant 516 is a lower left (LL) quadrant, and quadrant 518 is a lower right (LR) quadrant. In one non-limiting example and as shown in FIG. 15, each of the neighboring quadrants 512, 514, 516, 518 comprise a set of 3×3 pixels. However, in other examples, the quadrants may defined such that they are of a different pixel size and one or more of the quadrants can further be defined such that they vary in size from the other quadrants.

To average the pixel values for the pixels in each of neighboring quadrants 512, 514, 516, 518, an average pixel value for each of the red, green, and blue channels is obtained. Table 1 below illustrates, for each linearized image of the set, the obtained average pixel values in each quadrant.

TABLE 1

Average pixel values obtained for each linearized image

| Quadrant | Background-illuminated | Subject-Illuminated | Background and floor-illuminated |
|---|---|---|---|
| Upper Left | averageULBackDrop1Red<br>averageULBackDrop1Green<br>averageULBackDrop1Blue | averageULSubjectRed<br>averageULSubjectGreen<br>averageULSubjectBlue | averageULBackDrop2Red<br>averageULBackDrop2Green<br>averageULBackDrop2Blue |
| Upper Right | averageURBackDrop1Red<br>averageURBackDrop1Green<br>averageURBackDrop1Blue | averageURSubjectRed<br>averageURSubjectGreen<br>averageURSubjectBlue | averageURBackDrop2Red<br>averageURBackDrop2Green<br>averageURBackDrop2Blue |
| Lower Right | averageLLBackDrop1Red<br>averageLLBackDrop1Green<br>averageLLBackDrop1Blue | averageLRSubjectRed<br>averageLRSubjectGreen<br>averageLRSubjectBlue | averageLLBackDrop2Red<br>averageLLBackDrop2Green<br>averageLLBackDrop2Blue |
| Lower Left | averageLRBackDrop1Red<br>averageLRBackDrop1Green<br>averageLRBackDrop1Blue | averageLRSubjectRed<br>averageLRSubjectGreen<br>averageLRSubjectBlue | averageLLBackDrop2Red<br>averageLLBackDrop2Green<br>averageLLBackDrop2Blue |

At operation 496, an overall average of pixel values for each of the red, green and blue channels across the neighboring quadrants 512, 514, 516, 518 is then determined based on the averages obtained at operation 494. For example, using Table 1 as a reference, Table 2 below shows, for each of the linearized images of the set, the calculations performed to determine the overall average at operation 496.

TABLE 2

| Linearized Image | Overall Average Calculations |
|---|---|
| Background-illuminated image | averageBackDrop1Red = (averageULBackDrop1Red + averageLLBackDrop1Red + averageURBackDrop1Red + averageLRBackDrop1Red)/4<br>averageBackDrop1Green = (averageULBackDrop1Green + averageLLBackDrop1Green + averageURBackDrop1Green + averageLRBackDrop1Green)/4<br>averageBackDrop1Blue = (averageULBackDrop1Blue + averageLLBackDrop1Blue + averageURBackDrop1Blue + averageLRBackDrop1Blue)/4 |
| Subject-illuminated image | averageSubjectRed = (averageULSubjectRed + averageLLSubjectRed + averageURSubjectRed + averageLRSubjectRed)/4<br>averageSubjectGreen = (averageULSubjectGreen + averageLLSubjectGreen + averageURSubjectGreen + averageLRSubjectGreen)/4<br>averageSubjectBlue = (averageULSubjectBlue + averageLLSubjectBlue + averageURSubjectBlue + averageLRSubjectBlue)/4 |
| Background and floor-illuminated image | averageBackDrop2Red = (averageULBackDrop2Red + averageLLBackDrop2Red + averageURBackDrop2Red + averageLRBackDrop2Red)/4<br>averageBackDrop2Green = (averageULBackDrop2Green + averageLLBackDrop2Green + averageURBackDrop2Green + averageLRBackDrop2Green)/4<br>averageBackDrop2Blue = (averageULBackDrop2Blue + averageLLBackDrop2Blue + averageURBackDrop2Blue + averageLRBackDrop2Blue)/4 |

At operation 498, a variance is calculated across the neighboring quadrants 512, 514, 516, 518 based on the average obtained at operation 494 and the overall average obtained at operation 496. Using Table 1 and Table 2 as a reference, Table 3 below shows example variance calculations for each of the linearized images in the set. The expression "+=" in the variance calculations means to add values on the right side of the equation to a previous value on the left side of the equation.

TABLE 3

| Linearized Image | Variance Calculations |
|---|---|
| Background-illuminated image | varianceBackDrop1 = (averageULBackDrop1Red − averageBackDrop1Red)$^2$ + (averageULBackDrop1Green − averageBackDrop1Green)$^2$ + (averageULBackDrop1Blue − averageBackDrop1Blue)$^2$<br>varianceBackDrop1 += (averageLLBackDrop1Red − averageBackDrop1Red)$^2$ + (averageLLBackDrop1Green − averageBackDrop1Green)$^2$ + (averageLLBackDrop1Blue − averageBackDrop1Blue)$^2$<br>varianceBackDrop1 += (averageURBackDrop1Red − averageBackDrop1Red)$^2$ + (averageURBackDrop1Green − averageBackDrop1Green)$^2$ + (averageURBackDrop1Blue − averageBackDrop1Blue)$^2$<br>varianceBackDrop1 += (averageLRBackDrop1Red − averageBackDrop1Red)$^2$ + (averageLRBackDrop1Green − averageBackDrop1Green)$^2$ + (averageLRBackDrop1Blue − averageBackDrop1Blue)$^2$ |

TABLE 3-continued

| Linearized Image | Variance Calculations |
|---|---|
| Subject-illuminated image | varianceSubject = (averageULSubjectRed − averageSubjectRed)$^2$ + averageULSubjectGreen − averageSubjectGreen)$^2$ + averageULSubjectBlue − averageSubjectBlue)$^2$<br>varianceSubject += (averageLLSubjectRed − averageSubjectRed)$^2$ + averageLLSubjectGreen − averageSubjectGreen)$^2$ + averageLLSubjectBlue − averageSubjectBlue)$^2$<br>varianceSubject += (averageURSubjectRed − averageSubjectRed)$^2$ + averageURSubjectGreen − averageSubjectGreen)$^2$ + averageURSubjectBlue − averageSubjectBlue)$^2$<br>varianceSubject += (averageLRSubjectRed − averageSubjectRed)$^2$ + averageLRSubjectGreen − averageSubjectGreen)$^2$ + averageLRSubjectBlue − averageSubjectBlue)$^2$ |
| Background and floor-illuminated image | varianceBackDrop2 = (averageULBackDrop2Red − averageBackDrop2Red)$^2$ + averageULBackDrop2Green − averageBackDrop2Green)$^2$ + averageULBackDrop2Blue − averageBackDrop2Blue)$^2$<br>varianceBackDrop2 += (averageLLBackDrop2Red − averageBackDrop2Red)$^2$ + averageLLBackDrop2Green − averageBackDrop2Green)$^2$ + averageLLBackDrop2Blue − averageBackDrop2Blue)$^2$<br>varianceBackDrop2 += (averageURBackDrop2Red − averageBackDrop2Red)$^2$ + averageURBackDrop2Green − averageBackDrop2Green)$^2$ + averageURBackDrop2Blue − averageBackDrop2Blue)$^2$<br>varianceBackDrop2 += (averageLRBackDrop2Red − averageBackDrop2Red)$^2$ + averageLRBackDrop2Green − averageBackDrop2Green)$^2$ + averageLRBackDrop2Blue − averageBackDrop2Blue)$^2$ |

At operation 500, a deviation is calculated across the neighboring quadrants 512, 514, 516, 518 based on the variance obtained at operation 498. The deviation serves as the measure of the local contrast of the pixel 510. Using Table 3 as a reference, Table 4 below shows example deviation calculations for each of the linearized images of the set.

TABLE 4

| Linearized Image | Deviance Calculations |
|---|---|
| Background-illuminated image | deviationBackDrop1 = (varianceBackDrop1/4.0)$^{1/2}$ |
| Subject-illuminated image | deviationSubject = (varianceSubject/4.0)$^{1/2}$ |
| Background and floor-illuminated image | deviationBackDrop2 = (varianceBackDrop2/4.0)$^{1/2}$ |

The local contrast array is generated for each linearized image of the set at operation 482 by repeating operations 494, 496, 498, and 500 to determine the local contrast for each pixel of each image. For example, the first local contrast array generated for the linearized background-illuminated image 422 includes an array of local contrast values determined for each pixel of the linearized background-illuminated image 422 using the above-described operations 494, 496, 498, and 500. The second local contrast array generated for the linearized subject-illuminated image 424 includes an array of local contrast values determined for each pixel of the linearized subject-illuminated image 424 using the above-described operations 494, 496, 498, and 500. The third local contrast array generated for the linearized background and floor-illuminated image 426 includes an array of local contrast values determined for each pixel of the linearized background and floor-illuminated image 426 using the above-described operations 494, 496, 498, and 500.

The method 480 then proceeds to operation 502, where the local contrast array generated for each linearized image of the set at operation 482 is combined to generate an overall local contrast image for the set. For example, the first, second, and third local contrast arrays generated for the linearized background-illuminated image 422, linearized subject-illuminated image 424, and linearized background and floor-illuminated image 426, respectively, are combined to provide an overall local contrast image for the set. The overall local contrast image for the set shows a contrast between the subject S and the floor, which defines the subject S as surrounded by the floor (e.g., provides a continuous outline of the subject S). An example of an overall local contrast image is shown below with reference to FIG. 18.

Figure 16:
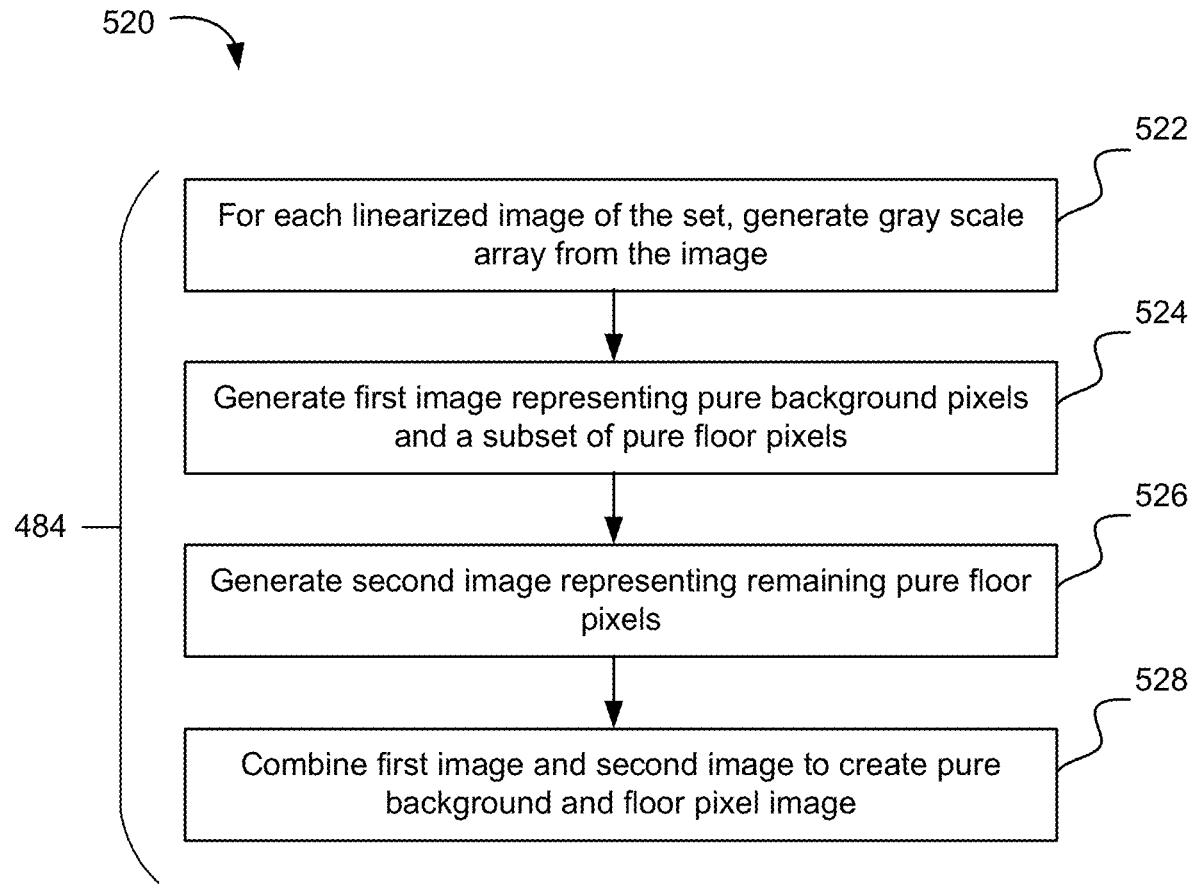
FIG. 16 is a flowchart of an example method for identifying pure background pixels and pure floor pixels for each image in the set of images.

FIG. 16 is a flowchart of an example method 520 for identifying pure background pixels and pure floor pixels for each linearized image in the set of images 114. The method 520 can be performed by the mask generator 430 of the image generator 112 described with reference to FIG. 11. In some embodiments, the method 520 can be used to at least partially perform the operation 484 of the method 478 shown in FIG. 13.

The method 520 begins at operation 522 by generating a gray scale array from each linearized image of the set. For example, at least three gray-scale arrays are generated from the linearized background-illuminated image 422, the linearized subject-illuminated image 424, and the linearized background and floor-illuminated image 426, respectively.

Figure 19:
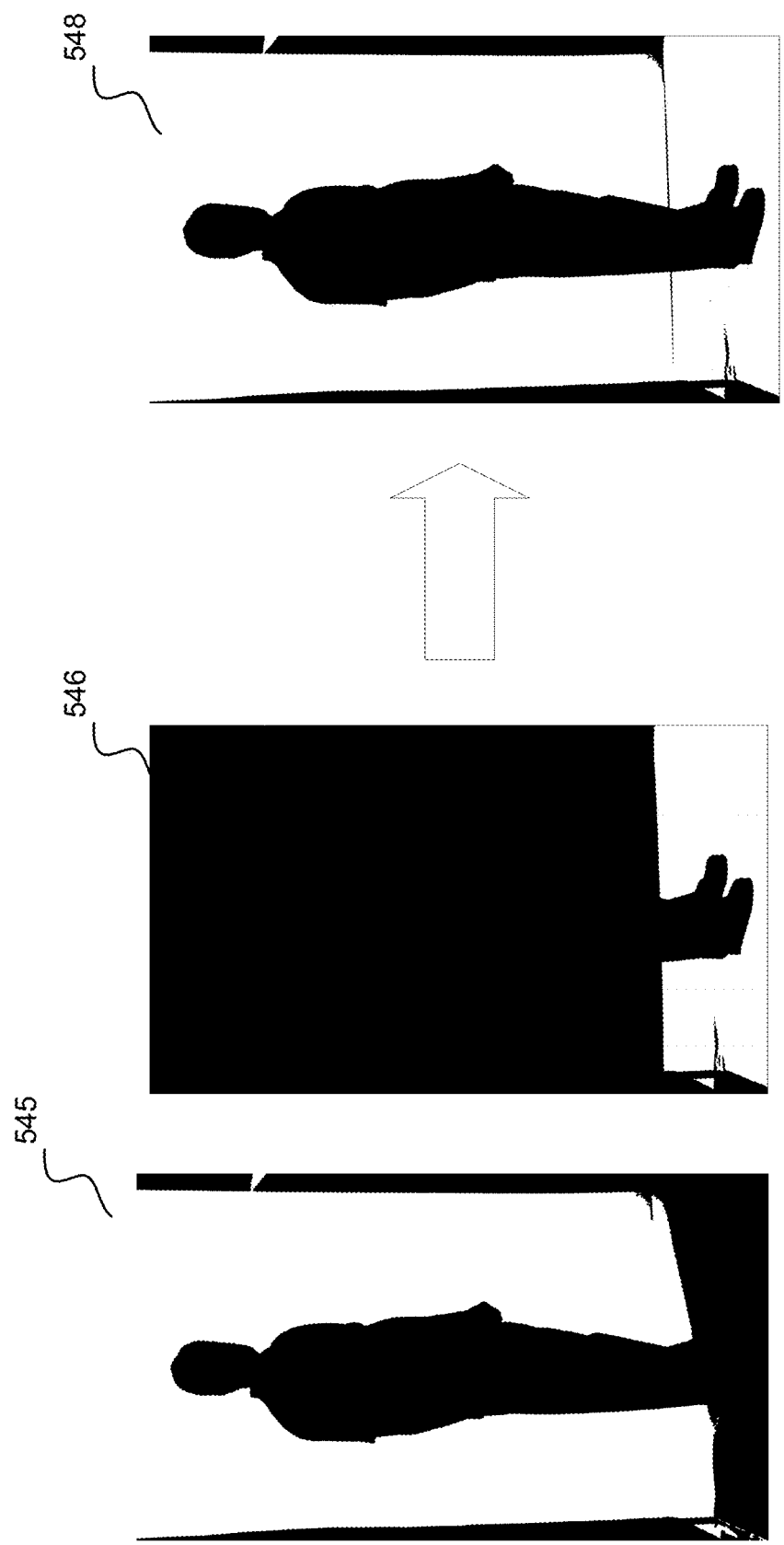
FIG. 19 illustrates example images generated as part of the method described in FIG. 16.

The method 520 proceeds to operation 524, where a first image is generated. An example of the first image is illustrated in FIG. 19 (e.g., first image 545). The first image 545 represents pure background pixels and a subset of pure floor pixels. The subset of pure floor pixels are floor pixels near the background pixels. To identify the pure background pixels and the subset of pure floor pixels, a comparison is made for each pixel to determine whether the pixel value in the gray-scale arrays generated from the linearized background-illuminated image 422 and the linearized background and floor-illuminated image 426 are brighter than the pixel value in the gray-scale array generated from the linearized subject-illuminated image 424. In response to a positive determination, the pixel is determined to be a pure background pixel or a floor pixel within the subset of pure floor pixels.

Figure 18:
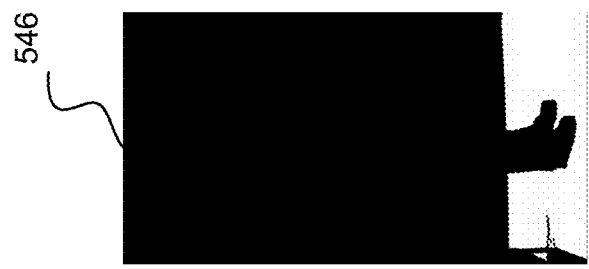
FIG. 18 is a conceptual illustration of flooding the overall local contrast image to identify remaining floor pixels as part of the method described in FIG. 16.
Figure 18:
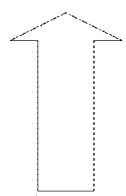
Figure 18:
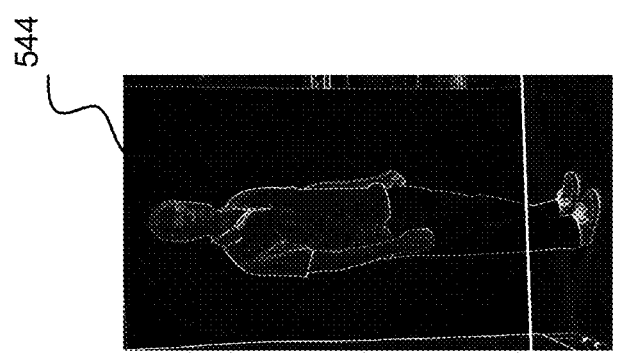
Figure 18:

The method 520 then proceeds to operation 526, where a second image is generated. An example of the second image is illustrated in FIGS. 18 and 19 (e.g., second image 546). The second image 546 represents remaining floor pixels (e.g., the remaining floor pixels not identified by the above-described comparison used to generate the first image 545). To identify the remaining floor pixels, a seam between the background and floor is determined. In a first area, where the subject is not covering the background and the floor, the seam between the background and floor can be easily measured. In a second area, where the subject is covering the background and floor, the seam between the background and the floor can be extrapolated into the subject using a linear regression.

Figure 17:
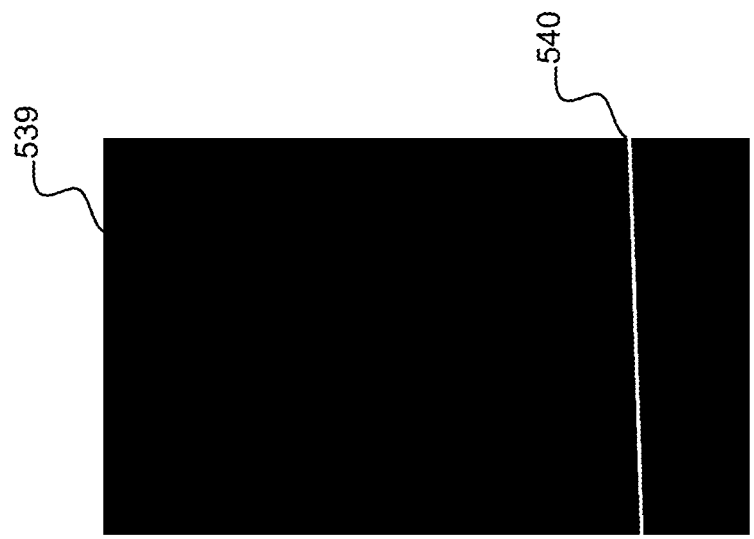
FIG. 17 is a conceptual illustration for extrapolating a seam between the background and the floor into the subject using linear regression as part of the method described in FIG. 16.
Figure 17:
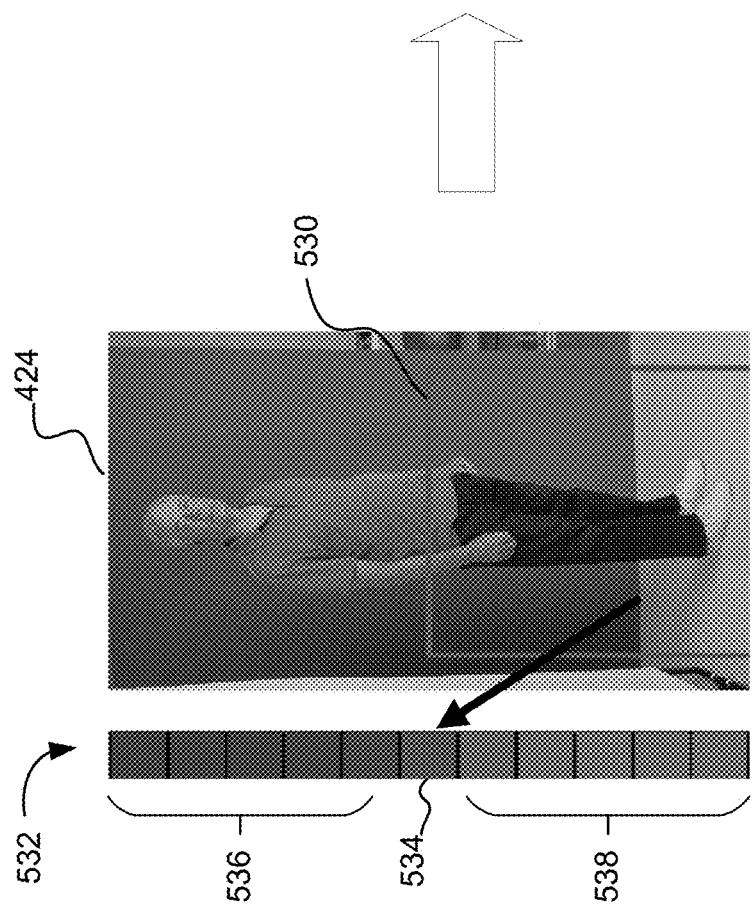

FIG. 17 is a conceptual illustration for extrapolating the seam between the background and the floor into the subject using the linear regression. Referring concurrently to FIG. 16 and FIG. 17, to gather samples for the linear regression, discontinuity in the linearized subject-illuminated image 424 is searched for starting at the top left corner of the defined area 530 of the linearized subject-illuminated image 424 down the image, and then across the image and down until the top right corner of the defined area 530 is reached.

To determine discontinuity, for each pixel column 532, a first average is calculated that averages values of n pixels 536 above the pixel 534 in each of red, blue, and green channels (e.g., upperAverageRed, upperAverageGreen, upperAverageBlue). A second average is calculated that averages values of n pixels 538 below the pixel 534 in each of red, blue, and green channels (e.g., lowerAverageRed, lowerAverageGreen, lower AverageBlue). In some examples and as illustrated in FIG. 17, n is five pixels. In other examples, n can equal more or less than five pixels, and the number of pixels above the pixel 534 and the number of pixels below the pixel 534 can be the same or different. A color difference in the first average and the second average is then calculated. The following is an example equation for determining the color difference:

$$colorDifference = ((upperAverageRed - lowerAverageRed)^2 + (upperAverageGreen - lowerAverageGreen)^2 + (upperAverageBlue - lowerAverageBlue)^2)^{1/2}.$$

If the color difference is greater than a defined threshold, the pixel 534 is determined to be on a seam 540 between the background and floor, and a location of the pixel 534 is used as part of the linear regression calculation to generate an image 539 that shows the seam 540.

For a pixel, such as pixel 534, to be used for the linear regression, the n pixels 536 above the pixel 534, the n pixels below 538 the pixel 534, and the pixel 534 itself must be pure background or floor pixels. Once all the samples are gathered, the linear regression is calculated and a seam slope and seam intercept are calculated to determine the seam 540.

The overall local contrast image 544 described with reference to FIGS. 14 and 15 is then flooded to identify the remaining pure floor pixels to generate the second image 546 at operation 526. FIG. 18 is a conceptual illustration of the flooding of the overall local contrast image 544 to identify remaining floor pixels to generate the second image 546. Referring to FIGS. 16 and 18 concurrently, to begin the flooding process a seed image 542 is generated by choosing pixels that are below the determined seam 540. The chosen pixels have low values in the overall local contrast image 544, and the chosen pixels are pure background pixels or floor pixels previously identified at operation 524. Using the seed image 542, flooding is then completed on the overall local contrast image 544 to generate the second image 546.

The method 520 ends at operation 528, where the first image 545 and the second image 546 are combined to create a pure background and floor pixel image 548. FIG. 19 illustrates the first image 545, the second image 546, and the pure background and floor pixel image 548 generated as part of the method 520 described in FIG. 16. The method 520 can be performed individually and repeated for each linearized image of the set such that a corresponding pure background and floor pixel image 548 is created for each linearized image. Examples of the pure background and floor pixel image 548 created for each linearized image of the set are shown and described in FIG. 22 below.

Figure 20:
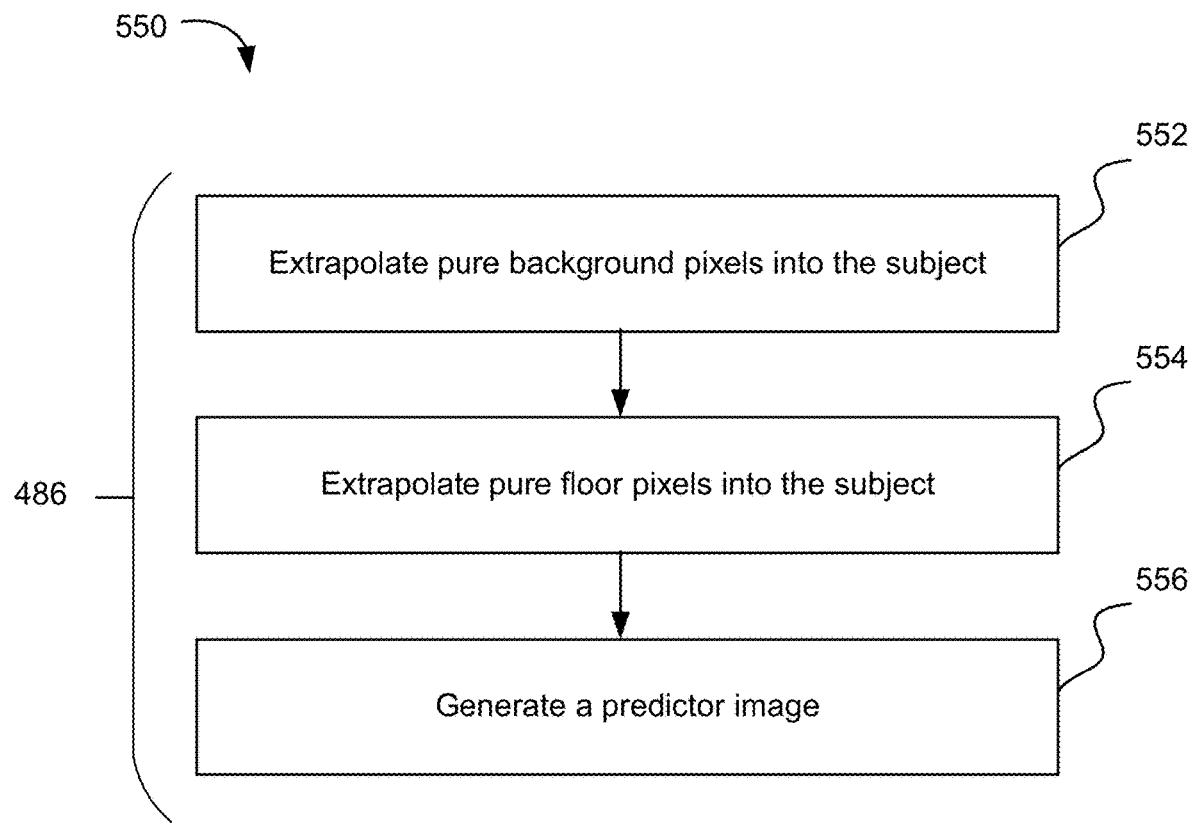
FIG. 20 is a flowchart of an example method for generating a predictor image for each image of the set of images.

FIG. 20 is a flowchart of an example method 550 for generating a predictor image for each image of the set of images. The method 550 can be performed by the mask generator 430 of the image generator 112 described with reference to FIG. 11. In some examples, the method 550 can be used to at least partially perform the operation 486 of the method 478 shown in FIG. 13.

A predictor image is an image that predicts what each linearized image in the set would have looked like had the subject S not been in the image (e.g., what color the pixels would have been if not covered by the subject). In other words, the predictor image extrapolates pure background and pure floor pixels into the subject S. As described in method 550, the extrapolation process is performed separately for the background area and the floor area. One reason for separating the extrapolation processes is because the background area can be completed faster due to a brightness across the background having a low pass or continuous appearance. Additionally, to further increase a speed of the extrapolation, the image can be separated into tiles such that the extrapolation is completed at a tile level as described in operations 552 and 554 of method 520.

Figure 21:
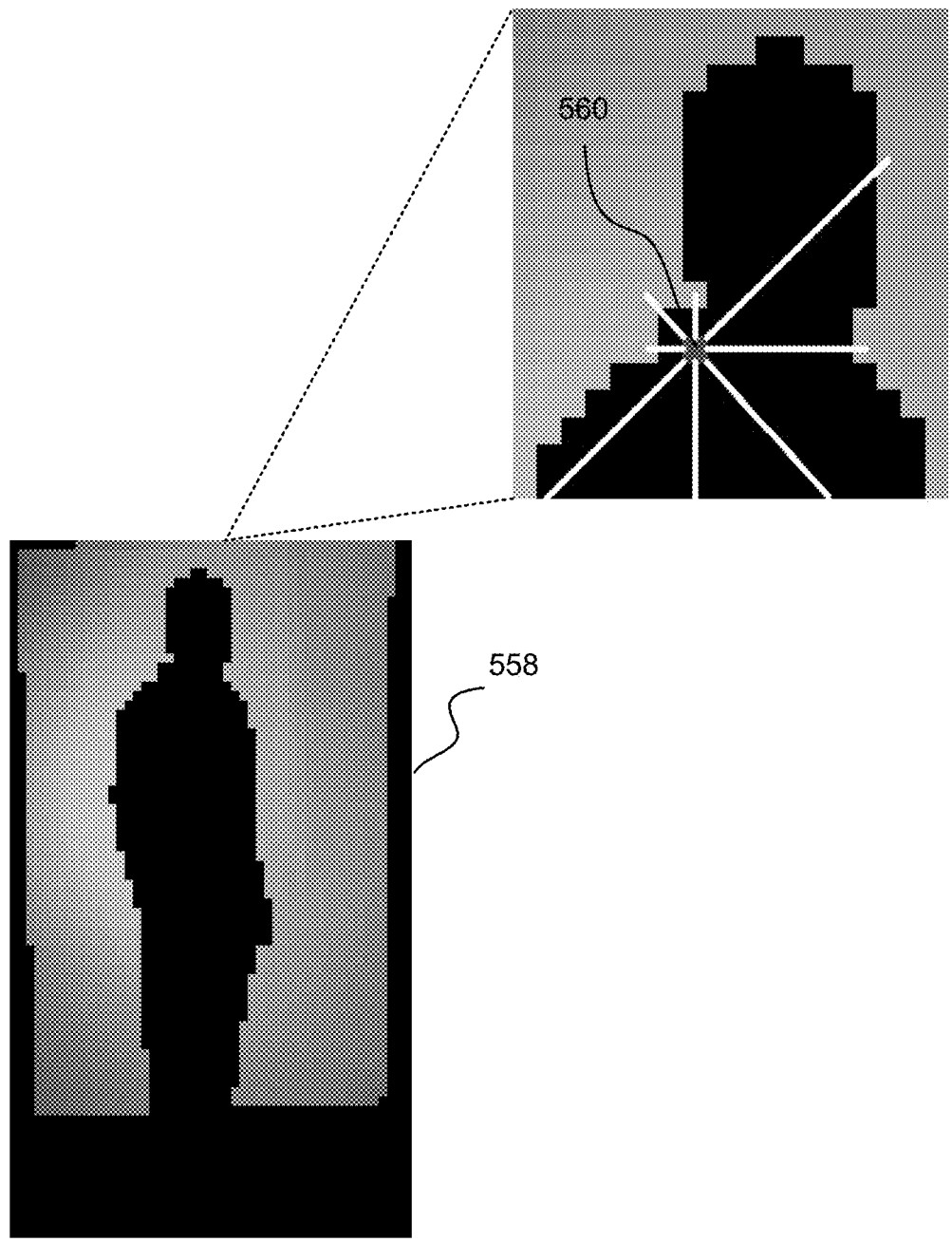
FIG. 21 conceptually illustrates an extrapolation process performed as part of the method described in FIG. 20.

The method 550 begins at operation 552, where for a linearized image of the set of the images 114, the corresponding pure background and floor pixel image 548 generated as described with reference to FIGS. 16-19 is used to extrapolate pure background pixels into the subject. FIG. 21 conceptually illustrates the extrapolation process performed at operation 552.

Referring to FIG. 20 and FIG. 21 concurrently, the pure background and floor pixel image 548 can be separated into a plurality of tiles, hereinafter referred to as a tiled image 558. As one non-limiting example, each tile may be set to 50×50 pixels. Tiles comprised entirely of pure background pixels are used in the extrapolation process. For example, within the tiled image 558 shown in FIG. 20, a tile can be used in the extrapolation process if the value of each pixel in the tile does not render the pixel black, hereinafter referred to as a non-black tiles. An interpolation process may then be performed to assign pixel values to all black tiles in the background area of the tiled image 558.

As part of the interpolation process, for each black tile, such as black tile 560, the nearest pure background tiles (e.g., non-black tiles) in eight directions of the black tile are determined for use as samples. A final value of the black tile 560 is assigned based on values of each of the eight samples as well as their distance from the tile. A neighboring tile's weight is determined by its distance. For instance, if one neighboring tile is half the distance from another neighboring tile to the black tile 560, it will have twice the weight.

The method 550 proceeds to operation 554, where the pure background and floor pixel image 548 is further used to extrapolate pure floor pixels into the subject. The process for extrapolating the pure floor pixels into the subject is similar to the process discussed above for the extrapolating the pure background pixels into the subject, except that a size of the tiles into which the pure background and floor pixel image 548 is separated to create a tiled image is smaller. As one non-limiting example, each tile may be set to 5×5 pixels. Because the floor area can change very quickly in brightness as the subject shadows the floor (e.g., particularly in areas of drop shadow near the subject's shoes), use of the smaller tile size when extrapolating pure floor pixels into the subject facilitates a more accurate prediction. An interpolation process may then be performed to assign pixel values to all black tiles in the floor area.

The method 550 ends at operation 556 where a predictor image is generated for the image based on the pixel values assigned to the black tiles in the background and the floor area as part of operations 552 and 554. For example, once the black tiles in the image are assigned values based on neighboring tiles, the tiles can then be resized to the original image size to complete the predictor image. Method 550 may be repeated for each linearized image of the set of images to generate at least three predictor images corresponding to the respective linearized images of the set.

Figure 22:
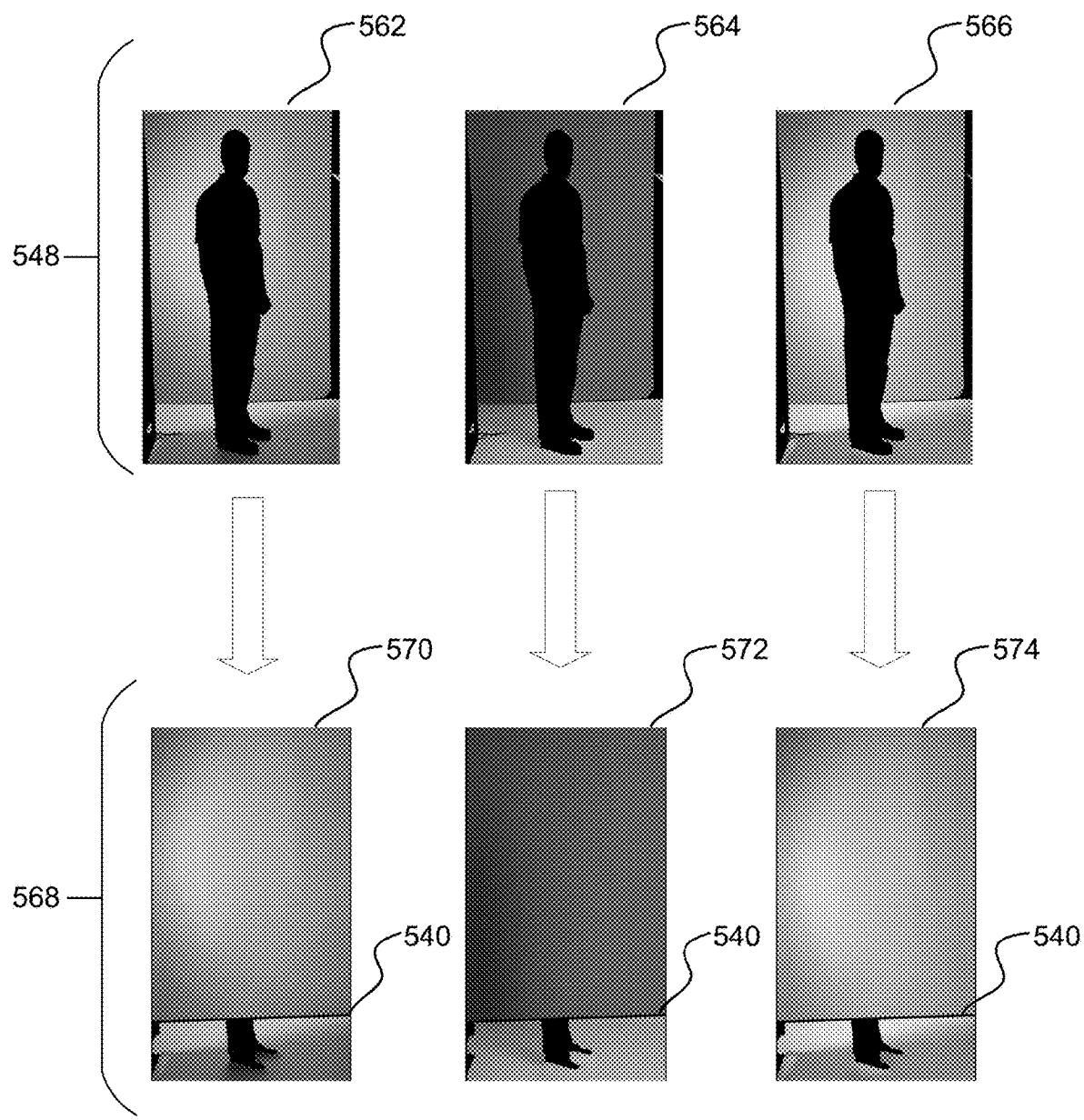
FIG. 22 illustrates example predictor images generated for each image of the set of images.

FIG. 22 illustrates example predictor images 568 generated for the set of images 114 by performing method 550 using the corresponding pure background and floor pixel image 548 for each linearized image. For example, referring to FIGS. 21 and 22 concurrently, for the background-illuminated image 422, a pure background and floor pixel image 562 corresponding to the background-illuminated image 422 is used to generate a first predictor image 570 for the background-illuminated image 422 by performing operations 552, 554, and 564 of method 550. Additionally, for the subject-illuminated image 424, a pure background and floor pixel image 564 corresponding to the subject-illuminated image 424 is used to generate a second predictor image 572 for the subject-illuminated image 424 by performing operations 552, 554, and 564 of method 550. Further, for the background and floor-illuminated image 426, a pure background and floor pixel image 566 corresponding to the background and floor-illuminated image 426 is used to generate a third predictor image 574 for the background-illuminated image 422 by performing operations 552, 554, and 564 of method 550.

In some examples, and as illustrated in each of the example predictor images 568 in FIG. 22, the determined seam 540 and some pixels well within the subject in the floor area remain black. In other words, the extrapolation process can selectively not be performed to extrapolate the background and/or floor pixels into the subject at the area of the seam 540 or particular areas of the floor. The extrapolation process is selectively not performed in these areas because it can be less accurate and these areas of the predictor images 568 are not used directly for the generation of the compiled mask 434.

Figure 23:
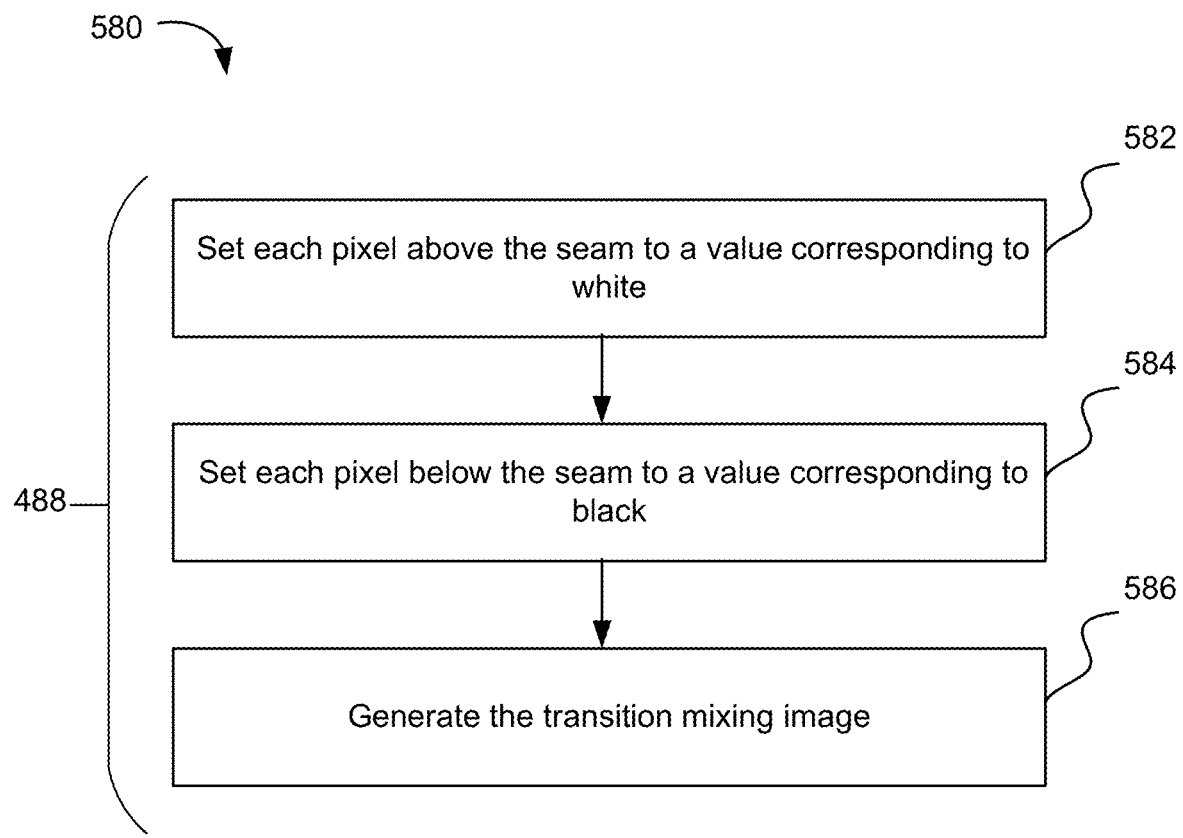
FIG. 23 is a flowchart of an example method for generating a transition mixing image.
Figure 24:
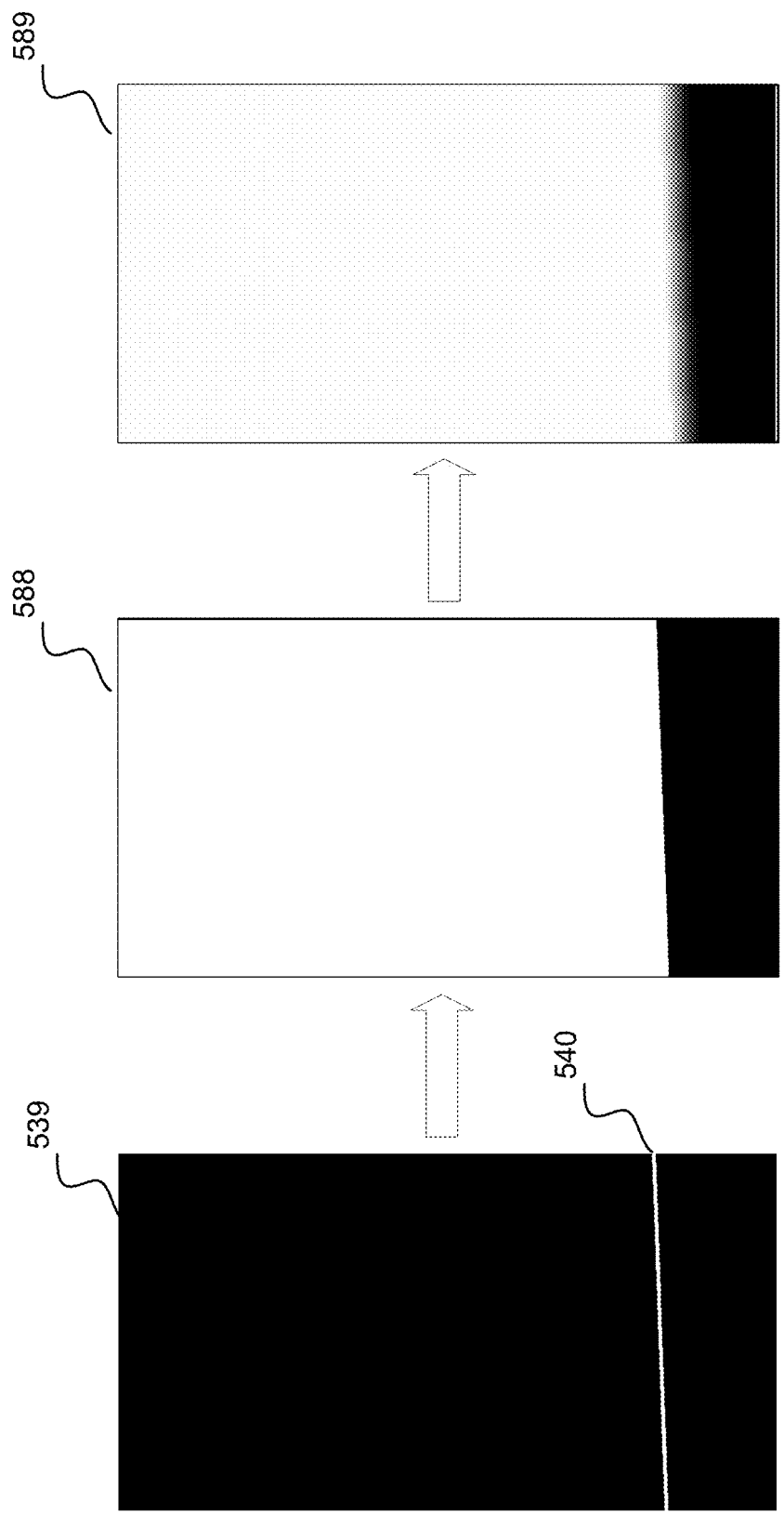
FIG. 24 conceptually illustrates generation of the transition mixing image according to the method described in FIG. 23.

FIG. 23 is a flowchart of an example method 580 for generating a transition mixing image. The method 580 can be performed by the mask generator 430 of the image generator 112 described with reference to FIG. 11. In some examples, the method 580 can be used to at least partially perform the operation 488 of the method 478 shown in FIG. 13. FIG. 24 conceptually illustrates generation of the transition mixing image according to the method described in FIG. 23.

Referring to FIGS. 23 and 24 concurrently, the seam 540 of image 539 determined as part of operation 526 of the method 520 shown in FIG. 16 is used to perform the method 580. For example, method 580 begins at operation 582, where each pixel in the image 539 above the seam 540 is set to a value corresponding to white (e.g., a pixel value of 255). The method 580 proceeds to operation 584, where each pixel in the image 539 below the seam 540 is set to a value corresponding to black (e.g., a pixel value of 0). As a result of operations 582 and 584, a transition mixing image 588 is generated from the image 539 at operation 586. In some examples, the transition mixing image 588 can be blurred to generate a blurred transition mixing image 589. As one example, the transition mixing image 588 is blurred by a Gaussian function to generate the blurred transition mixing image 589.

The transition mixing image 588 and/or blurred transition mixing image 589 is used to at least partially perform the operation 468 of the method 460 shown in FIG. 12 to generate the compiled mask 434 by generating a transition between the combined background mask and floor mask. The generation of the transition using the transition mixing image 588 and/or blurred transition mixing image 589 is described in more detail with reference to FIGS. 29-31.

Figure 25:
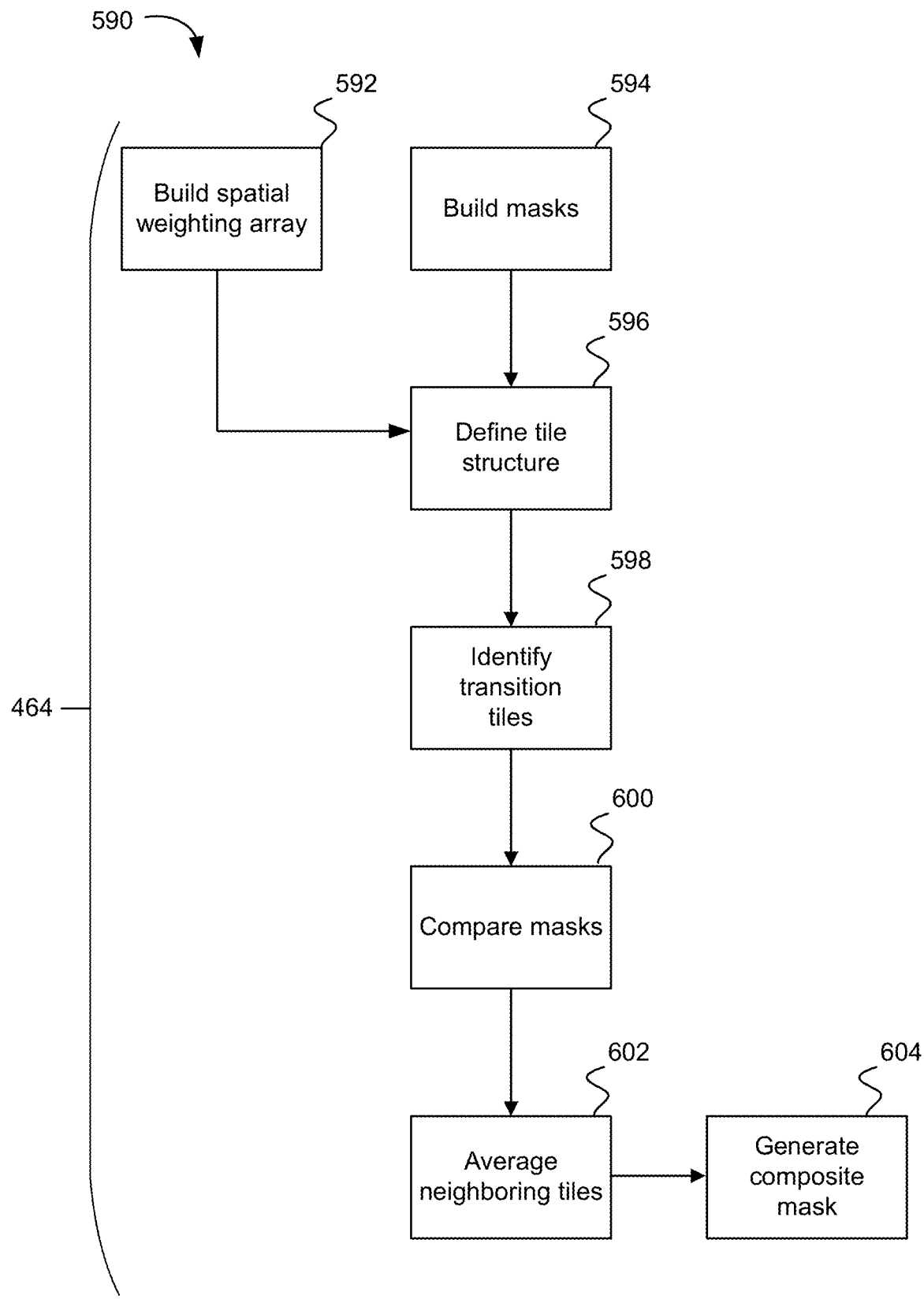
FIG. 25 is a flowchart of an example method for generating a background mask.
Figure 26:
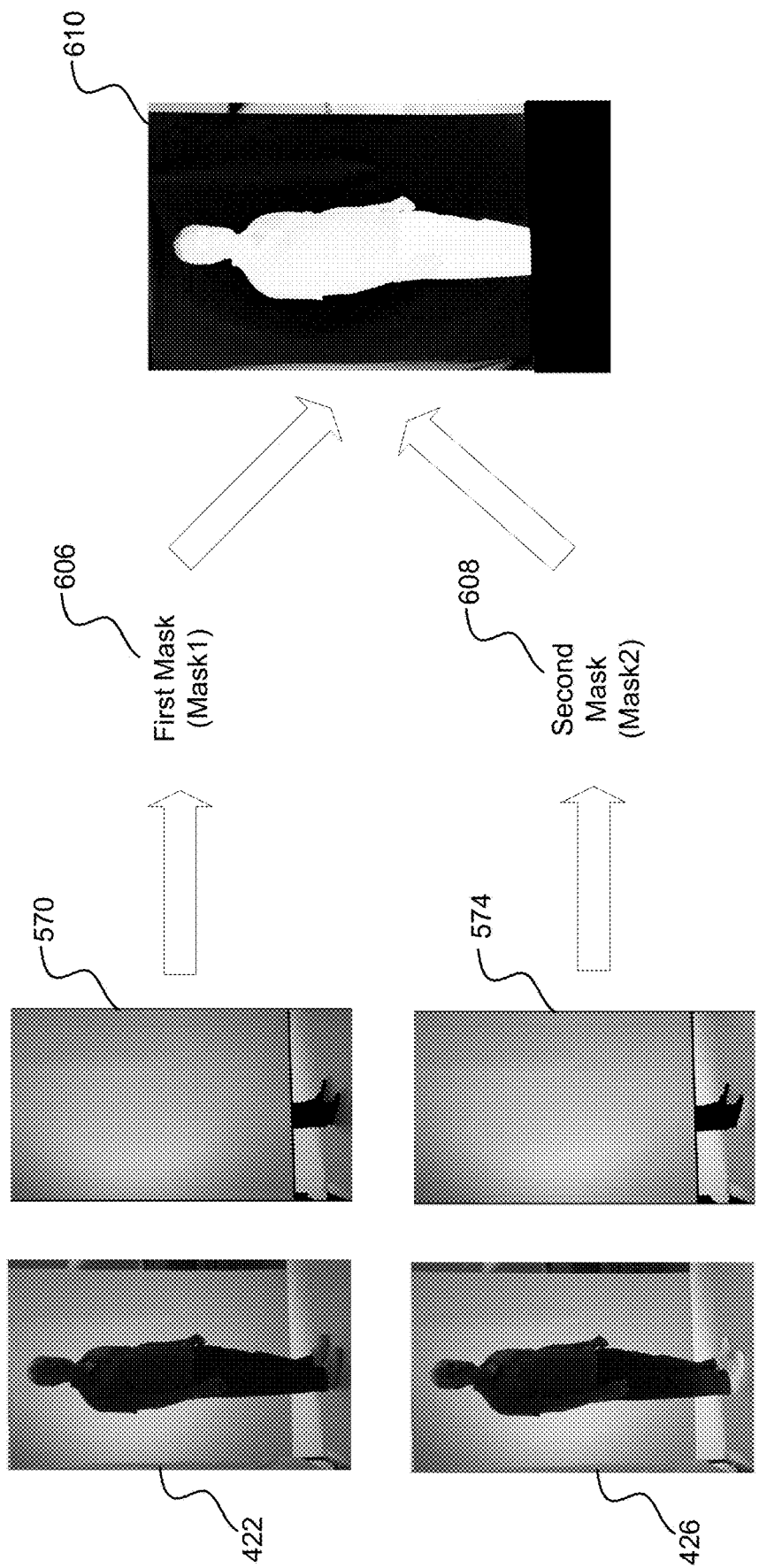
FIG. 26 illustrates example inputs and outputs of the process described in FIG. 25.

FIG. 25 is a flowchart of an example method 590 for generating a background mask. FIG. 26 illustrates the example inputs and output of the method 590. Referring to FIGS. 25 and 26 concurrently, the method 590 can be performed by the mask generator 430 of the image generator 112 described with reference to FIG. 11. In some examples, the method 590 can be used to at least partially perform the operation 464 of the method 460 shown in FIG. 12.

As described in detail with reference to FIG. 8 of U.S. Pat. No. 10,110,792, the method 590 includes building a spatial weighting array (operation 592), building masks (operation 594), defining a tile structure (operation 596), identifying transition tiles (operation 598), comparing the masks (operation 600), averaging neighboring tiles (operation 602), and generating a composite mask (operation 604).

At operation 594, the masks built include a first mask (e.g., Mask1) 606 and a second mask (e.g., Mask2) 608. Specific to the present disclosure herein, Mask1 606 is built using a grayscale version of the linearized background-illuminated image 422 and a grayscale version of its corresponding predictor image (e.g., the first predictor image 570). For example, a value for each pixel of Mask1 606 is determined by dividing a value of that pixel in the grayscale version of the linearized background-illuminated image 422 by the value of that pixel in the grayscale version of the first predictor image 570. Mask2 608 is built using a gray-scale version of the linearized background and floor-illuminated image 426 and a gray-scale version of its corresponding predictor image (e.g., third predictor image 574). For example, a value for each pixel of Mask2 is determined by dividing a value of that pixel in the grayscale version of the linearized background and floor-illuminated image 426 by the value of that pixel in the grayscale version of the third predictor image 574. Mask1 606 and Mask2 608 are then used in the subsequent operations to ultimately generate the composite mask at operation 604. The composite mask generated at operation 604 is a background mask 610. The background mask 610 distinguishes the subject S from the background. Additionally, the background mask 610 represents the location of the subject S within the subject-illuminated image 424. As discussed above, the subject-illuminated image 424 is captured at a midpoint in time between the background-illuminated image 422 and background and floor-illuminated image 426 used to build the masks (e.g., Mask1 and Mask 2) at operation 594. Thus, the background mask 610 roughly approximates a spatial average between the images used to build the masks at operation 594.

The background mask 610 is then subsequently used, among other inputs, to generate a compiled mask as described in greater detail with reference to FIGS. 29 to 31. In some examples, to facilitate a seamless transition when combining the background mask 610 with the other inputs to generate the compiled mask 434, an additional method can be performed prior to generating the background mask 610. As described in detail with reference to FIGS. 29 and 30, the additional method can include generating new pixel values for pixels in areas near or in the subject within a transition area in at least the first and the third predictor image to yield updated first and third predictor images. These updated first and third predictor images can then be used generate each of Mask1 606 and Mask2 608, respectively.

The method 590 is one example method for generating the background mask 610 using multiple images from the set of images 114. Use of at least two images accounts for subject motion in between image captures. In further examples, if the set of images 114 includes at least four images and three of those four images are background-illuminated (e.g., either just background-illuminated or background and floor—illuminated), a similar method to method 590 can be performed to determine a subject's acceleration and generate a background mask accordingly to account for more active subject motion in between image captures, such as the subject jumping.

Alternatively, and as previously discussed, a single image from the set of images 114 and its corresponding predictor image could be used to generate the background mask. For example, the single image used can be the grayscale version of the linearized background-illuminated image 422 or the grayscale version of the linearized background and floor-illuminated image 426. Details for generating the background mask based on a single image are described in U.S. Pat. No. 7,834,894.

Figure 27:
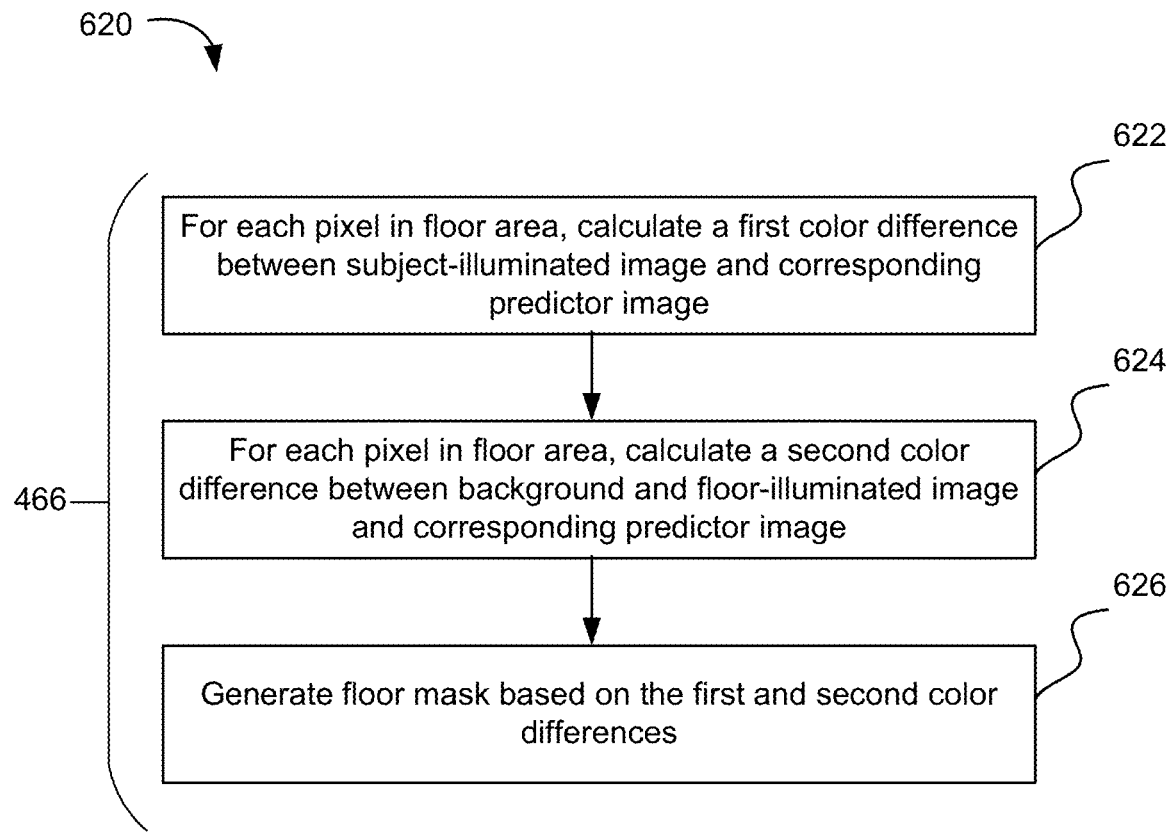
FIG. 27 is a flowchart of an example method for generating a floor mask.
Figure 28:
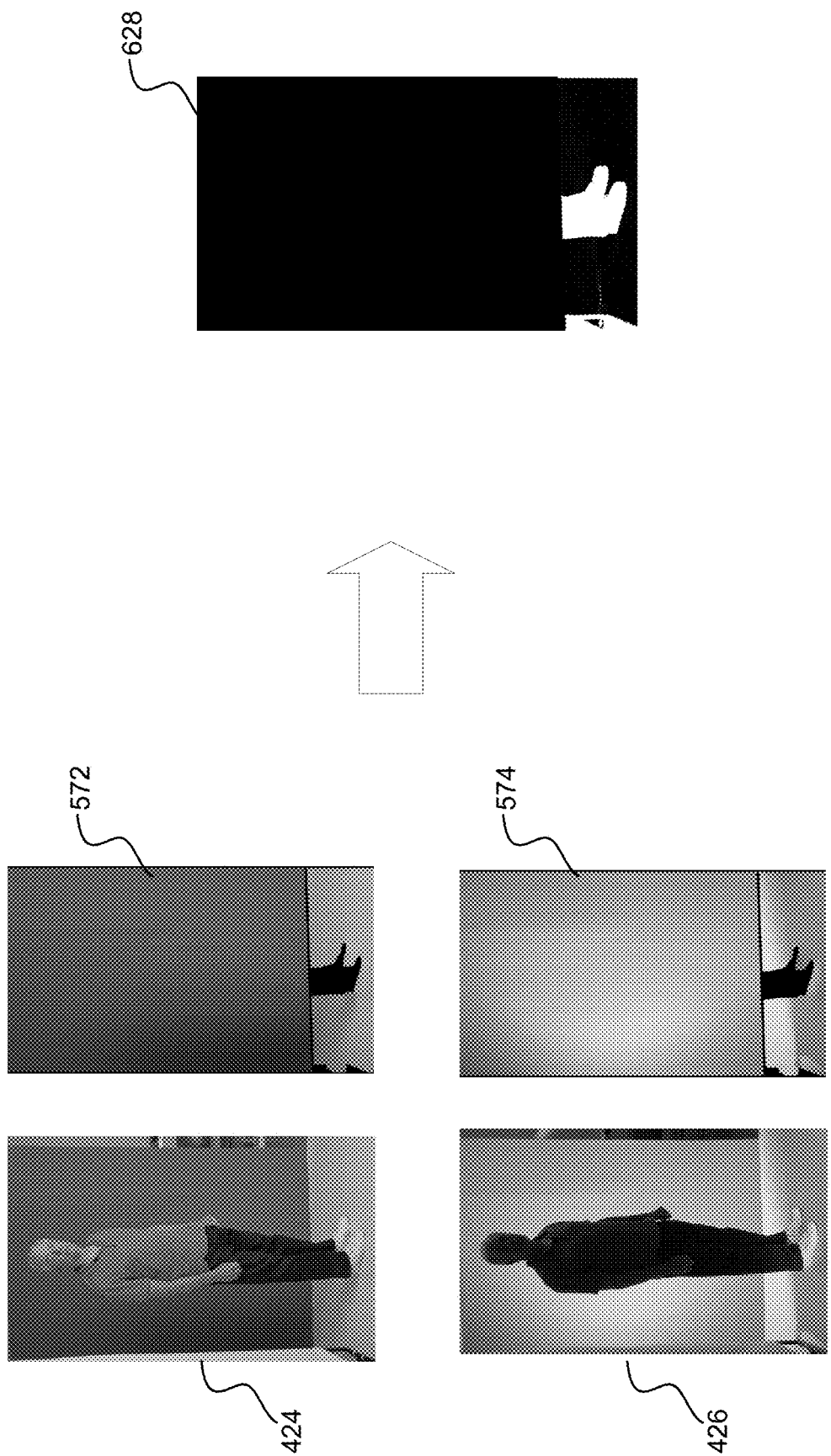
FIG. 28 illustrates example inputs and outputs of the process described in FIG. 27.

FIG. 27 is a flowchart of an example method 620 for generating a floor mask. FIG. 28 illustrates example inputs and outputs of the method 620 described in FIG. 27. Referring to FIGS. 27 and 28 concurrently, the method 620 can be performed by the mask generator 430 of the image generator 112 described with reference to FIG. 11. In some examples, the method 620 can be used to at least partially perform the operation 466 of the method 460 shown in FIG. 12.

The method 620 begins at operation 622, where, for each pixel in the floor area, a first color difference between the linearized subject-illuminated image 424 and its corresponding predictor image (e.g., second predictor image 572) is calculated. For example, for a pixel in the floor area, a first value of the pixel in each of the red, green, and blue channels is obtained from the linearized subject-illuminated image 424 (e.g., subjectRed, subjectGreen, and subjectBlue). A second value of the pixel in each of the red, green, and blue channels is obtained from the second predictor image 572 (e.g., subjectPredictorRed, subjectPredictorGreen, and subjectPredictorBlue). The first color difference (e.g., colorDistanceSubject) for the pixel is then calculated based on the obtained first and second values using the following equation:

$$\text{colorDistanceSubject} = ((\text{subjectRed} - \text{subjectPredictorRed}) + (\text{subjectGreen} - \text{subjectPredictorGreen}) + (\text{subjectBlue} - \text{subjectPredictorBlue})^2)^{1/2}.$$

The first and second pixel values are obtained and this calculation is repeated for each pixel in the floor area.

The method 620 proceeds to operation 624, where a second color difference between the linearized background and floor-illuminated image 426 and its corresponding predictor image (e.g., third predictor image 574) is calculated. For example, for a pixel in the floor area, a first value of the pixel in each of the red, green, and blue channels is obtained from the linearized background and floor-illuminated image 426 (e.g., backdrop2Red, backdrop2Green, and backdrop2Blue). A second value of the pixel in each of the red, green, and blue channels is obtained from the third predictor image 574 (e.g., backdrop2PredictorRed, backdrop2PredictorGreen, and backdrop2PredictorBlue). The second color difference (e.g., colorDistanceBackdrop2) for the pixel is then calculated based on the obtained first and second values using the following equation:

$$\text{colorDistanceBackdrop2} = ((\text{backdrop2Red} - \text{backdrop2PredictorRed})^2 + (\text{backdrop2Green} - \text{backdrop2PredictorGreen})^2 + (\text{backdrop2Blue} - \text{backdrop2PredictorBlue})^2)^{1/2}.$$

The method 620 ends at operation 626, where the floor mask 628 is generated based on the first and second color differences. For example, a value for each pixel of the floor mask 628 is calculated based on the first color difference determined for that pixel at operation 622 (e.g., colorDistanceSubject) and the second color difference determined for that pixel at operation 624 (e.g., colorDistanceBackdrop2). An example equation for calculating the value of the pixel follows:

$$(1.0 - \text{GAINVALUE} * \text{colorDistanceSubject} * \text{colorDistanceBackdrop2}).$$

In some examples and as shown in the above equation, a scalar, such as gainvalue, is used to scale the multiplication of the first and second color differences. To generate the floor mask 628, each pixel in the floor area is assigned the value calculated for that particular pixel using the above equation. In some examples, where the second predictor image 572 and third predictor image 574 are black in the floor area, the value of the corresponding pixel in the floor mask is set to 1.0 (causing the pixel to appear white in the floor mask).

The resulting floor mask 628 distinguishes the foot portion of the subject S from the surrounding floor.

Figure 29:
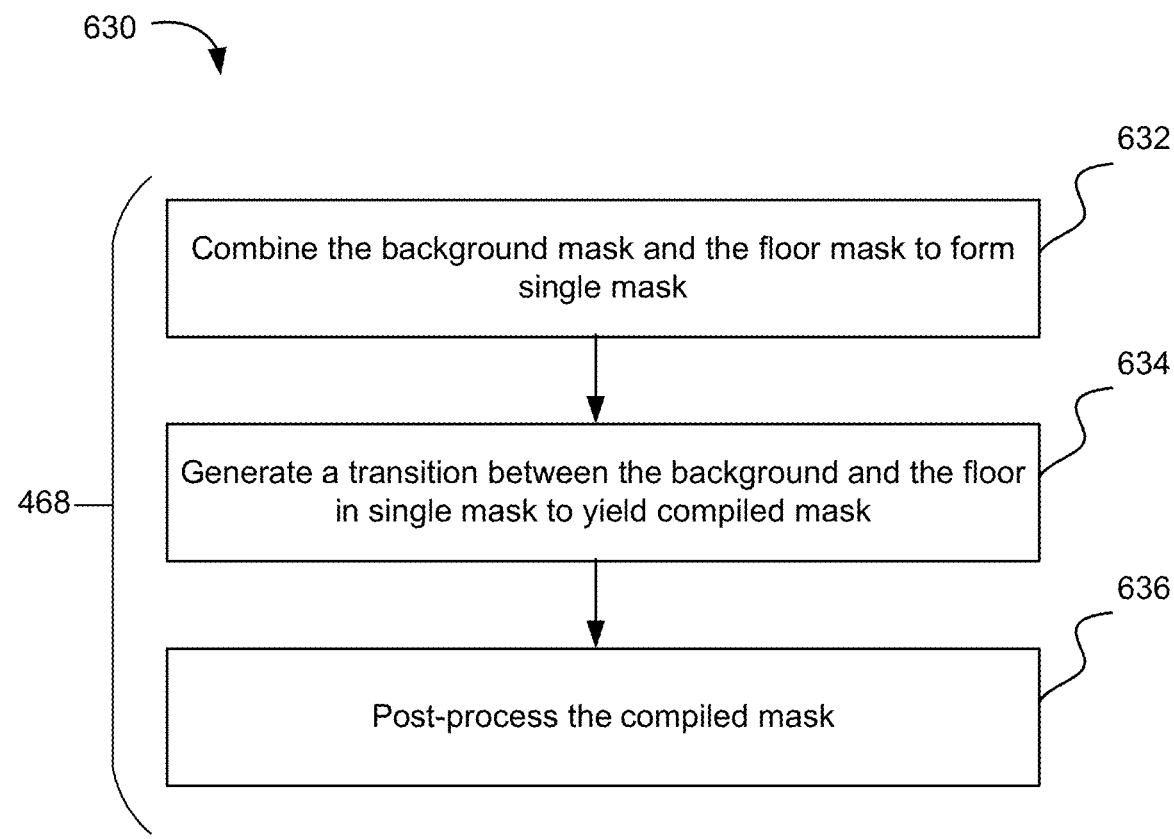
FIG. 29 is a flowchart of an example method for generating a compiled mask.

FIG. 29 is a flowchart of an example method 630 for generating a compiled mask 434. The method 630 can be performed by the mask generator 430 of the image generator 112 described with reference to FIG. 11. In some examples, the method 630 can be used to at least partially perform the operation 468 of the method 460 shown in FIG. 12.

Figure 31:
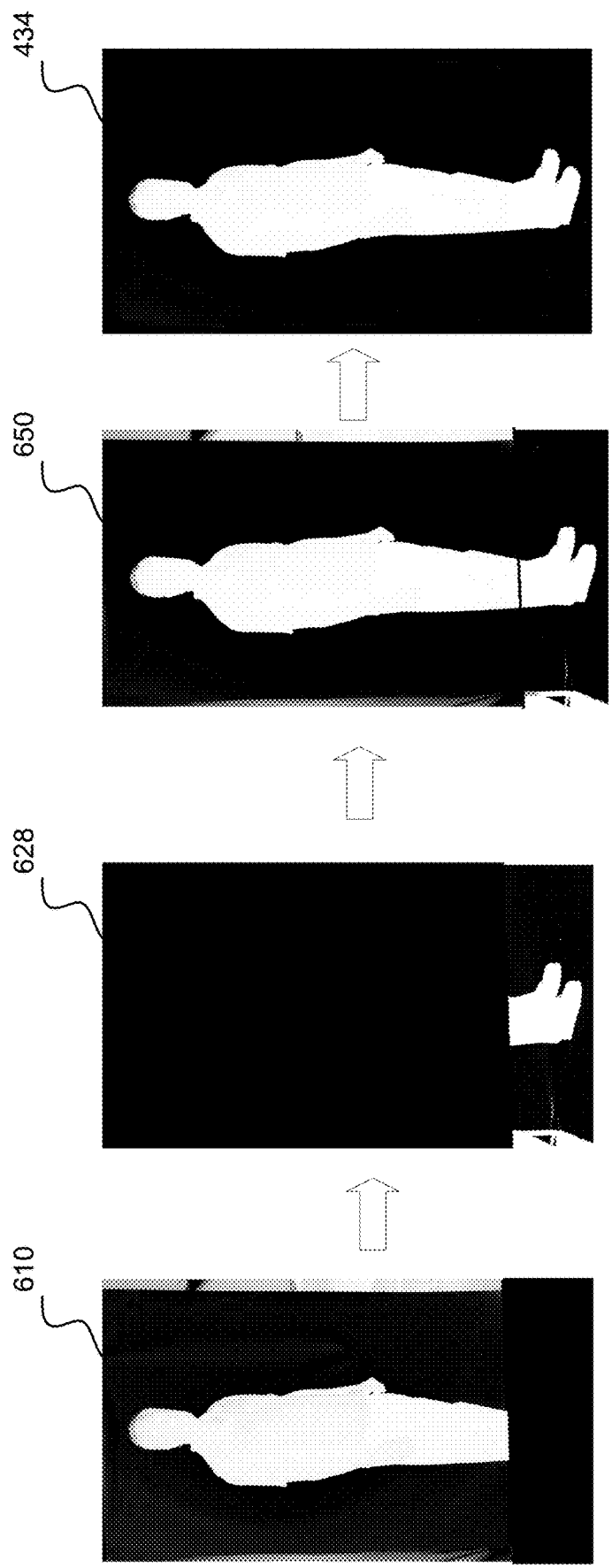
FIG. 31 illustrates example masks generated and combined to yield a compiled mask.

The method 630 begins at operation 632, where the background mask 610 and the floor mask 628 are combined to form a single mask 650 (shown in FIG. 31). When formed, the single mask 650 includes an undesirable seam where the background meets the floor.

Therefore, the method 630 proceeds to operation 634, where a transition between the background and the floor is generated within the single mask 650 to yield the compiled mask 434. In other words, the transition removes the undesirable seam from the single mask 650 such that there is a seamless transition between the background and the floor in the compiled mask 434.

The transition is generated using the transition mixing image 588 described with reference to FIGS. 23 and 24. As previously discussed, within the transition mixing image 588, each pixel above the seam 540 is set to a value corresponding to white and each pixel below the seam 540 is set to a value corresponding to black. Thus, to provide the seamless transition, the transition mixing image 588 is used to weight pixels of the background mask 610 and the floor mask 628 as they come close to each other in a transition area between the background and the floor in the single mask 650. For example, where the transition mixing image 588 is pure white above the seam 540, the corresponding pixels are weighted as pixels of the background mask 610 within the compiled mask 434 (e.g., the pixels are set to a value of 0). Continuing the same example, where the transition mixing image 588 is pure black below the seam 540, the corresponding pixels are weighted as pixels of the floor mask 628 within the compiled mask 434 (e.g., the pixels are set to a value of 1). In other examples, the value of 0 and 1 can be switched, whereas a value of 0 is applied to weight pixels of the floor mask 628 and a value of 1 is applied to weight pixels of the background mask 610. However, in a transition area along the seam 540, an additional method can be performed to determine whether to weight each pixel in the transition area as a pixel of the background mask 610 or as a pixel of the floor mask 628 within the compiled mask 434.

Figure 30:
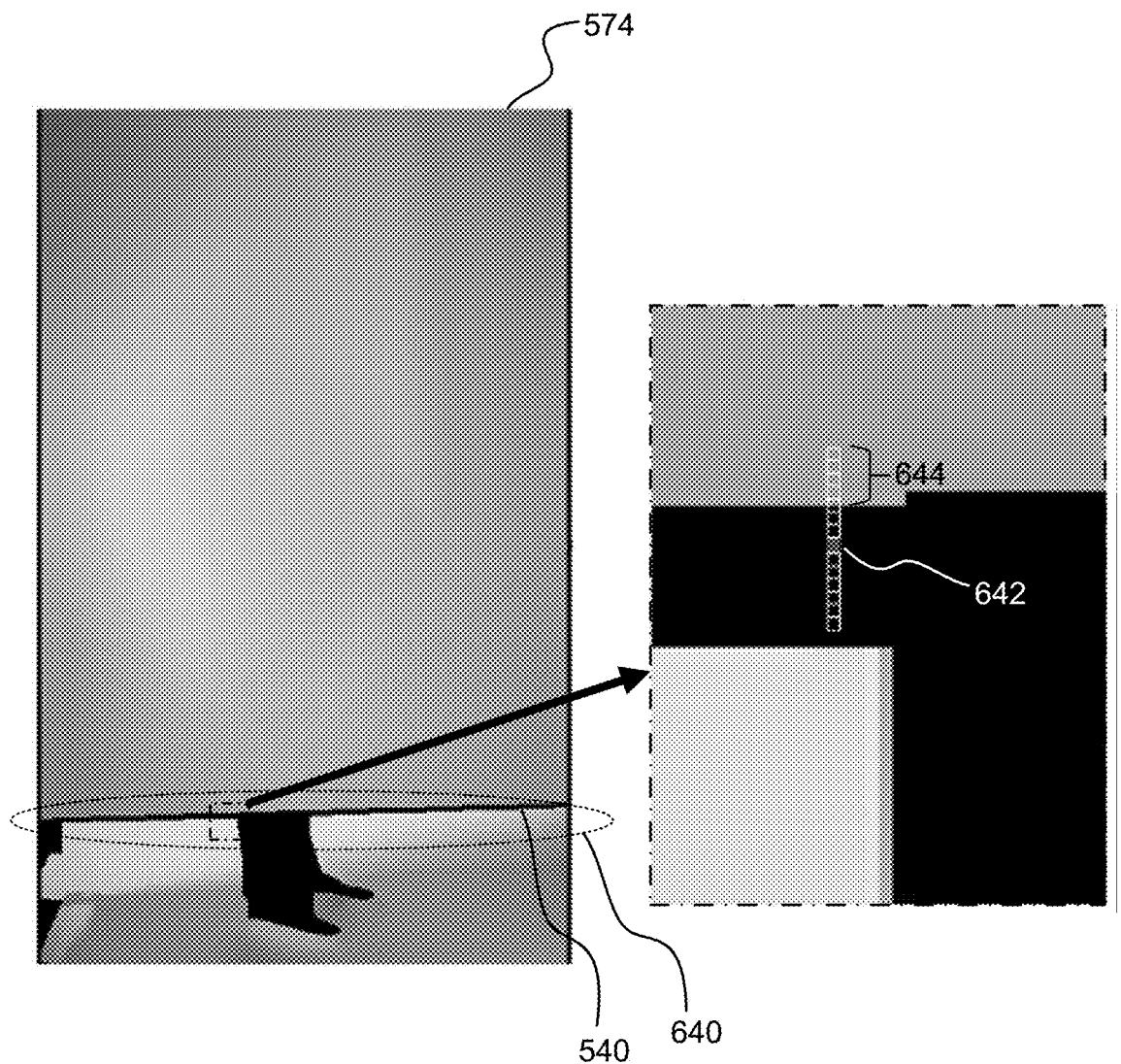
FIG. 30 conceptually illustrates a method for weighting pixels in a transition area between the background mask and the floor mask in the compiled mask.

FIG. 30 conceptually illustrates the method for weighting pixels in the transition area 640 along the seam 540. Referring to FIGS. 29 and 30 concurrently, the method is performed using a predictor image, such as the third predictor image 574 that corresponds to the background and floor-illuminated image 426. If a pixel in the seam 540 has already been defined as a pure background pixel or a pure floor pixel, the pixel is set to a value of 0 in the compiled mask 434. For areas near or in the subject, new predictor values of pixels in those areas of the third predictor image 574 are calculated based on an analysis of vertically-positioned, neighboring pixel predictor values that are not in the seam 540, yielding an updated third predictor image.

For example, for a pixel 642 near the subject in the transition area 640 along the seam 540, a new pixel predictor value is determined by obtaining and averaging pixel values for neighboring pixels that are positioned vertically above and/or below the pixel 642 and are not in the seam 540. In one example and as shown in FIG. 30, the pixel values for the set of four neighboring pixels 644 that are above the pixel 642 and not in the seam 540 can be obtained and averaged to determine a new predictor value for the pixel 642.

New predictor values for pixels in areas near or in the subject can be similarly determined for at least the first predictor image 570 that corresponds to the background-illuminated image 422 yielding an updated first predictor image. The updated first predictor image and the updated third predictor image can then be used to generate the background mask, as described with reference to FIGS. 25-26.

The method 630 then ends at operation 636, where post-processing is performed on the compiled mask 434. As one example, the compiled mask 434 is further processed to fill in any edges with black if the edges do not come into contact with the subject S. As another example, the compiled mask 434 is further processed to remove any artifacts that are disconnected from the subject S.

FIG. 31 illustrates the example masks generated and combined to yield the compiled mask 434. The example masks include the background mask 610 and the floor mask 628 that are combined to form the single mask 650. The background and floor are then seamlessly transitioned using the methods described with reference to FIGS. 29 and 30 to yield the compiled mask 434.

Figure 32:
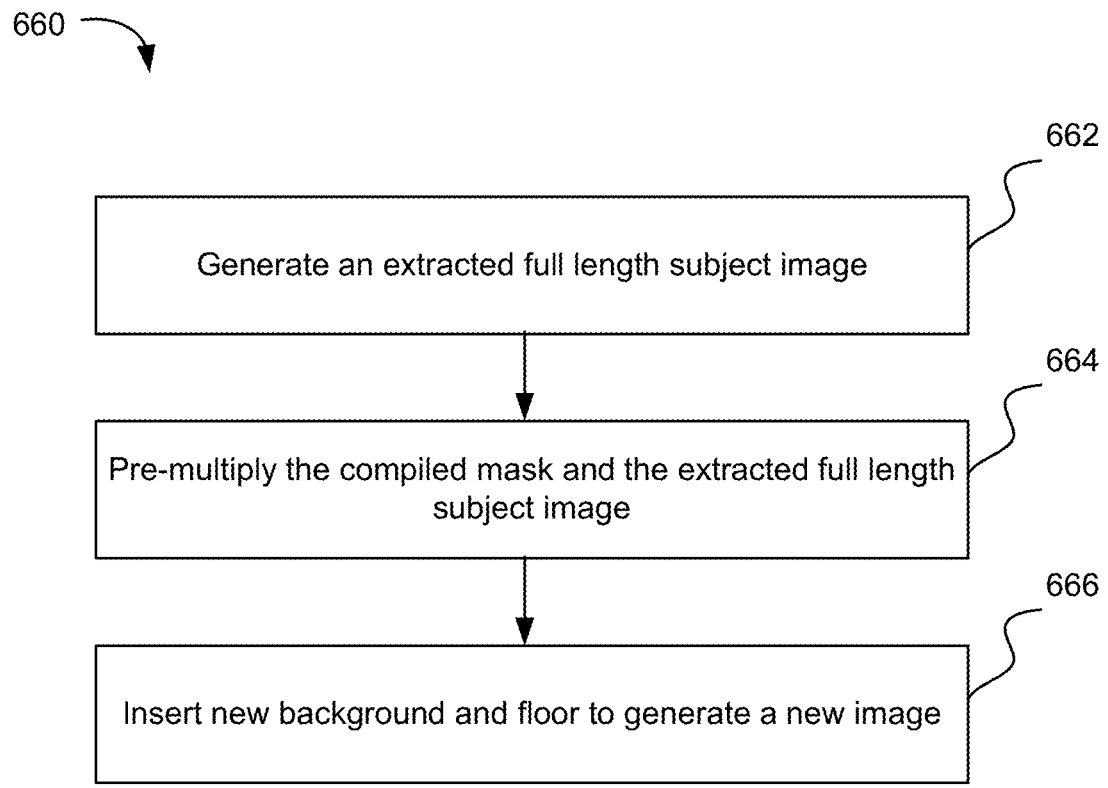
FIG. 32 is a flowchart of an example method for generating a new image using the compiled mask.

FIG. 32 is a flowchart of an example method 660 for generating a new image 116 using the compiled mask 434. The method 660 can be performed by one or more of the mask applicator 432 and the background and floor applicator 438 of the image generator 112 described with reference to FIG. 11.

Figure 33:
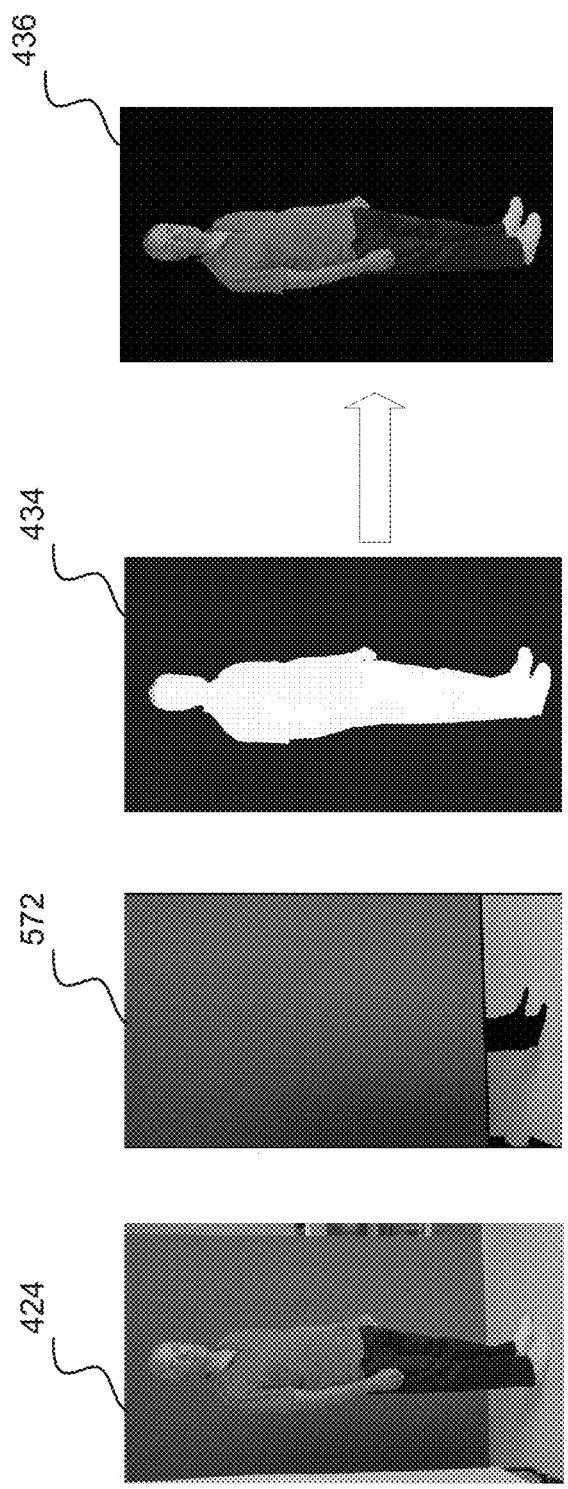
FIG. 33 is a conceptual illustration of extracting a full-length subject image as part of the method described in FIG. 32.

The method 660 begins at operation 662, where an extracted full-length subject image is generated. FIG. 33 is a conceptual illustration of generating the extracted full-length subject image 436. Referring to FIGS. 32 and 33 concurrently, the extracted full-length subject image 436 is generated using the linearized subject-illuminated image 424, the corresponding second predictor image 572 for subject-illuminated image, and the compiled mask 434.

For each pixel, the following pixel values are obtained: a pixel value in each of the red, green, and blue channels for the pixel in the linearized subject-illuminated image 424 (e.g., subjectRed, subjectGreen, subjectBlue), a pixel value in each of the red, green, and blue channels for the pixel in the second predictor image 572 (e.g., predictorRed, predictorGreen, predictorBlue), and a pixel value in the compiled mask 434 (e.g., mask).

Based on the above-described pixel values obtained, the following logic is applied to determine a pixel value in the red, green, and blue channels to set for the pixel in the extracted full-length subject image 436 (e.g., Background Removed Value Red, Background Removed Value Green, Background Removed Value Blue):

---

If the value of the mask is 0.0
   Background removed Value Red = 0
   Background removed Value Green = 0
   Background removed Value Blue = 0
Else
   Background Removed Value Red = subjectRed − (1.0 − mask) * predictorRed
   Background Removed Value Green = subjectGreen − (1.0 − mask) * predictorGreen
   Background Removed Value Blue = subjectBlue − (1.0 − mask) * predictorBlue.

---

This is repeated for each pixel to generate the extracted full-length subject image 436.

The method 660 proceeds to operation 664, where the compiled mask 434 and the extracted full-length subject image 436 are pre-multiplied. For pre-multiplication of the compiled mask 434, a multiplier value for each pixel of the compiled mask 434 is determined based on a value of that pixel (e.g., mask value) using the following logic:

---

If the mask value > .001
   multiplier value = 1.0 / (mask value)
Else
   multiplier value = 1000.0.

---

The determined multiplier values can then be applied to pixel values of the respective pixels of the compiled mask 434. A multiplier value determined for each pixel of the extracted full-length subject image 436 is further limited to prevent any color in the extracted full-length subject image 436 from becoming saturated. Also, each color is multiplied by a same multiplier value. The determined multiplier values can then be applied to pixel values of the respective pixels of the extracted full-length subject image 436. Pre-multiplication is performed to limit the influence of the pixel in the extracted full-length subject image 436 from becoming too small as the value of the pixel in the compiled mask 434 transitions toward zero.

Figure 34:
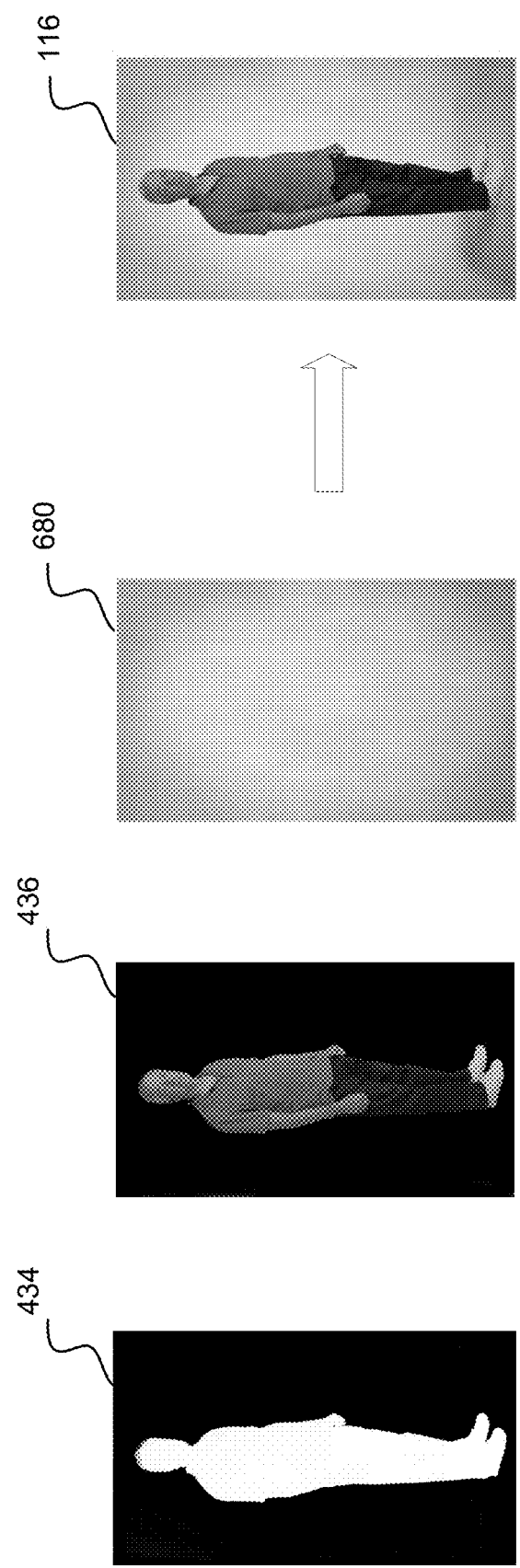
FIG. 34 is a conceptual illustration of generating a new image as part of the method described in FIG. 32.

The method 660 ends at operation 666, where a new background and floor are inserted to generate a new image 116. FIG. 34 is a conceptual illustration of generating the new image 116. Referring to FIGS. 32 and 34 concurrently, the new image 116 is generated using the pre-multiplied compiled mask 434, the pre-multiplied extracted full-length subject image 436, and an image of the new background and floor 680. Generation of the new image 116 includes determining and setting a pixel value for each pixel in the new image 116. To determine the pixel value for a pixel in the new image 116 (e.g., new image pixel), pixel values for the pixel in each of the compiled mask 434 (e.g., Mask Value Pixel), the extracted full-length subject image 436 (e.g., Subject Pixel), and an image comprising the new background and floor (e.g., New Background/Floor Pixel) are obtained and the following calculation is performed:

New Image Pixel=Mask Value Pixel*Subject Pixel+
(1.0−Mask Value Pixel)*New Background/Floor
Pixel.

This calculation is repeated for each pixel in the new image 116 to determine and set the respective values for each pixel in the new image 116.

While examples described herein include generating a new image by applying the compiled mask 434 to the subject-illuminated image 424 to extract a full-length subject image 436 for use in replacing a background and floor, there are other uses and applications for the compiled mask 434 (and the separate background and floor masks) generated as described herein. As one example, the compiled mask 434 and extracted full-length subject image 436 can be used for assembling the extracted full-length subject image 436 with other extracted full-length subject images in a group composite image. The assembly can be performed using techniques and processes described in the following patents and patent applications, the entireties of which are hereby incorporated by reference: U.S. Pat. No. 9,025,906, issued on May 5, 2015, entitled GENERATING AN ASSEMBLED GROUP IMAGE FROM SUBJECT IMAGES; U.S. Patent Publication No. 2014/0169697, filed on Mar. 14, 2013, entitled EDITOR FOR ASSEMBLED GROUP IMAGES; U.S. patent application Ser. No. 16/373,425 filed on Apr. 2, 2019, entitled COMPOSITE GROUP IMAGE; and U.S. patent application Ser. No. 16/731,190, filed on Dec. 31, 2019, entitled SYSTEM FOR ASSEMBLING COMPOSITE GROUP IMAGE FROM INDIVIDUAL SUBJECT IMAGES.

Additionally, generation of the new image 116 can include further processing to create a more realistic, natural image. For example, the new image 116 can be further processed to incorporate shadows that would naturally occur in captured images as a result of a lighting system and subject positions relative to the background and the floor. As one example, a shadow generation engine can generate a shadow image from shadows cast on the area behind the subject (e.g., shadows exhibited by the subject on the background) in the original captured images, as described in U.S. Pat. No. 9,838,661, issued on Dec. 5, 2017, entitled PHOTOGRAPHIC SCENE REPLACEMENT SYSTEM, the entirety of which is hereby incorporated by reference. Leveraging techniques or processes described in the present disclosure, additional methods can be performed to generate a shadow image based on shadows exhibited by the subject on the floor. These shadow images can then be overlaid on the new image 116.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A method of full-length subject photography, the method comprising:
   initiating an illumination sequence for an image capture sequence with a controller, including:
      initiating a first illumination condition while a first image of a set of images is captured by a camera by causing a background lighting system to illuminate a background;
      after capturing the first image, initiating a second illumination condition while a second image of the set of images is captured by the camera by causing a subject lighting system to illuminate a subject; and
      after capturing the second image, initiating a third illumination condition while a third image of the set of images is captured by the camera by causing a floor lighting device to illuminate a foot portion of the subject and surrounding floor without activating the subject lighting system, including a floor mat arranged under the subject, wherein the controller includes a light control interface configured to synchronize the camera, the background lighting system, the subject lighting system, and the floor lighting device to carry out the illumination sequence to capture the first image, the second image, and the third image during a photography session, and
   generating a predictor image for each image of the set of images, wherein the predictor images are predications of each image had the subject not been in the image; and
   generating, based on the set of images and the predictor images, a first mask distinguishing the subject from the background and a second mask distinguishing the foot portion of the subject from the surrounding floor to enable background replacement and floor replacement to generate a new image.

2. The method of claim 1, further comprising initiating the first illumination condition and the third illumination condition while the third image is captured.

3. The method of claim 1, wherein the first mask is generated using at least the first image.

4. The method of claim 1, wherein the first mask is generated using the first image and the third image when both the first illumination condition and the third illumination condition are initiated while the third image is captured.

5. The method of claim 1, wherein the second mask is generated using the second image and the third image.

6. The method of claim 1, further comprising:
   generating the new image using the first mask, the second mask, and the second image, wherein a background and floor of the second image is replaced with a new background and floor in the new image.

7. The method of claim 1, further comprising:
combining the first mask and the second mask to form a compiled mask.

8. The method of claim 7, further comprising:
generating a transition between a background and floor of the compiled mask when the first mask and the second mask are combined.

9. The method of claim 8, wherein generating a transition between a background and floor of the compiled mask when the first mask and the second mask are combined comprises generating a transition mixing image by:
based on the set of images, identifying a seam between the background and the floor;
setting each pixel above the seam to a value corresponding to a first color; and
setting each pixel above the seam to a value corresponding to a second color, wherein the first color and the second color are different.

10. The method of claim 7, further comprising:
generating the new image using the compiled mask and the second image, wherein a background and floor of the second image is replaced with a new background and floor in the new image.

11. The method of claim 10, wherein generating the new image further comprises:
extracting a full-length subject image by applying the compiled mask to the second image; and
generating the new image using the compiled mask, the full-length subject image, and an image of the new background and floor.

12. The method of claim 1, where the predictor images for the set of images extrapolate pure background pixels and pure floor pixels into the subject area of the images, and wherein the extrapolation to generate the predictor images is performed separately to extrapolate the background pixels and the floor pixels.

13. The method of 1, further comprising:
linearizing each image in the set of images; and
generating a grayscale version of each linearized image, wherein the predictor images are generated for each grayscale linearized image in the set of images.

14. A photography system:
a camera that captures a set of images of a subject;
a lighting system comprising:
a background lighting system;
a subject lighting system; and
a floor lighting device;
a controller having a light control interface to synchronize the camera and the lighting system;
a floor mat positioned under the subject as the set of images are captured by the camera, wherein the controller includes a non-transitory storage medium and one or more processors, the non-transitory storage medium storing instructions that, when executed by the processor, cause the controller to:
initiate a first illumination condition during capture of a first image of the set by the camera by causing the background lighting system to illuminate a background;
after capturing the first image, initiate a second illumination condition during capture of a second image of the set by the camera by causing the subject lighting system to illuminate the subject; and
after capturing the second image, initiate a third illumination condition during capture of a third image of the set by the camera by causing the floor lighting device to illuminate a foot portion of the subject and surrounding floor without activating the subject lighting system, including the floor mat, wherein the control interface is configured to synchronize the camera, the background lighting system, the subject lighting system, and the floor lighting device to carry out the illumination sequence to capture the first image, the second image, and the third image during a photography session; and
an image processing system, the image processing system including:
a processing device; and
memory storing instructions that, when executed by the processing device, cause the image processing system to:
receive the first image, the second image, and the third image;
generate a predictor image for each image of the set, wherein the predictor images are predications of each image had the subject not been in the image;
generate, based on the set of images and the predictor images, a background mask using at least the first image, the background mask distinguishing the subject from the background;
generate, based on the set of images and the predictor images, a floor mask using the second image and the third image, the floor mask distinguishing the foot portion of the subject from the surrounding floor; and
generate a new image using the background mask, the floor mask, and a full-length subject image, the full-length subject image extracted from an application of the background mask and the floor mask to the second image.

15. The system of claim 14, wherein one or more surfaces of the floor mat are Lambertian surfaces.

16. The system of claim 14, wherein the floor lighting device is positioned at a particular height above a surface on which the floor mat is positioned such that an angle created with respect to the floor mat is less than a predefined number of degrees.

17. The system of claim 14, wherein the controller is further caused to initiate both the first illumination condition and the third illumination condition during capture of the third image, and
when both the first illumination condition and the third illumination condition are initiated during capture of the third image, the image processing system is caused to generate the background mask using the first image and the third image.

18. The system of claim 14, wherein the image processing system is further caused to:
generate a compiled mask by combining the background mask and the floor mask.

19. The system of claim 18, wherein to generate the compiled mask, the image processing system is caused to:
generate a transition between a background and a floor when the background mask and the floor mask are combined.

20. The system of claim 18, the image processing system is further caused to:
generate the new image using the compiled mask and a full-length subject image, the full-length subject image extracted from an application of the compiled mask to the second image.

* * * * *